United States Patent
Rakib et al.

(10) Patent No.: US 10,938,613 B2
(45) Date of Patent: *Mar. 2, 2021

(54) ORTHOGONAL TIME FREQUENCY SPACE COMMUNICATION SYSTEM COMPATIBLE WITH OFDM

(71) Applicant: Cohere Technologies, Inc., Santa Clara, CA (US)

(72) Inventors: Shlomo Selim Rakib, Santa Clara, CA (US); Ronny Hadani, Austin, TX (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,485

(22) Filed: Sep. 3, 2019

(65) Prior Publication Data
US 2020/0145273 A1  May 7, 2020

Related U.S. Application Data

(63) Continuation of application No. 15/740,316, filed as application No. PCT/US2016/039662 on Jun. 27, 2016, now Pat. No. 10,404,514.
(Continued)

(51) Int. Cl.
*H04L 27/26* (2006.01)
*H04L 1/06* (2006.01)
(Continued)

(52) U.S. Cl.
CPC ........ *H04L 27/2639* (2013.01); *G06F 17/147* (2013.01); *H04L 1/06* (2013.01);
(Continued)

(58) Field of Classification Search
CPC ............ H04L 27/2639; H04L 27/2646; H04L 27/26; H04L 5/0023; H04L 1/06; G06F 17/147
See application file for complete search history.

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.
(Continued)

*Primary Examiner* — Siu M Lee
(74) *Attorney, Agent, or Firm* — Perkins Coie, LLP

(57) ABSTRACT

A system and method for orthogonal time frequency space communication and waveform generation. The method includes receiving a plurality of information symbols and encoding an N×M array containing the plurality of information symbols into a two-dimensional array of modulation symbols by spreading each of the plurality of information symbols with respect to both time and frequency. The two-dimensional array of modulation symbols is then transmitted using M mutually orthogonal waveforms included within M frequency sub-bands.

20 Claims, 52 Drawing Sheets

Related U.S. Application Data

(60) Provisional application No. 62/265,352, filed on Dec. 9, 2015, provisional application No. 62/191,468, filed on Jul. 12, 2015, provisional application No. 62/185,643, filed on Jun. 28, 2015, provisional application No. 62/185,617, filed on Jun. 27, 2015.

(51) Int. Cl.
*G06F 17/14* (2006.01)
*H04L 5/00* (2006.01)

(52) U.S. Cl.
CPC ............ *H04L 5/0023* (2013.01); *H04L 27/26* (2013.01); *H04L 27/2646* (2013.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 9,912,507 B2 * | 3/2018 | Rakib ................. H04L 27/2627 |
| 10,003,487 B2 * | 6/2018 | Rakib ................. H04L 27/2627 |
| 10,090,972 B2 * | 10/2018 | Hadani ............... H04L 27/2639 |
| 10,090,973 B2 * | 10/2018 | Hadani ................ H04L 5/0023 |
| 10,158,394 B2 * | 12/2018 | Hadani ................ H04L 1/0071 |
| 10,411,843 B2 * | 9/2019 | Rakib ................. H04L 5/0007 |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0138058 A1 * | 7/2003 | Agrawal ................. H04B 7/04 375/267 |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 * | 11/2004 | Varshney ............. H04B 7/2631 370/208 |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |

(56) References Cited

U.S. PATENT DOCUMENTS

| | | |
|---|---|---|
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1* | 9/2014 | Arambepola ......... H04L 1/0071 370/330 |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

International Search Report and Written Opinion for International Application No. PCT/US2013/047723, dated Oct. 29, 2013, 17 pages.

International Preliminary Report on Patentability for International Application No. PCT/US2013/047723, dated Dec. 31, 2014, 15 pages.

Notice of Allowance for U.S. Appl. No. 13/927,088, dated Feb. 18, 2015, 7 pages.

Office Action for U.S. Appl. No. 13/927,088, dated Nov. 28, 2014, 13 pages.

Notice of Allowance for U.S. Appl. No. 13/927,086, dated Dec. 26, 2014, 8 pages.

Supplemental Notice of Allowability for U.S. Appl. No. 13/927,086, dated Mar. 19, 2015, 4 pages.

Office Action for U.S. Appl. No. 13/927,086, dated Oct. 14, 2014, 10 pages.

Office Action for U.S. Appl. No. 13/927,089, dated Dec. 24, 2014, 13 pages.

Office Action for U.S. Appl. No. 13/927,089, dated Aug. 14, 2015, 7 pages.

Supplemental Notice of Allowability for U.S. Appl. No. 13/927,091, dated Jun. 11, 2015, 4 pages.

Notice of Allowance for U.S. Appl. No. 13/927,091, dated Apr. 24, 2015, 8 pages.

Office Action for U.S. Appl. No. 13/927,091, dated Jan. 27, 2015, 15 pages.

Office Action for U.S. Appl. No. 13/927,092, dated Oct. 8, 2014, 5 pages.

Notice of Allowance for U.S. Appl. No. 13/927,092, dated Oct. 24, 2014, 7 pages.

Office Action for U.S. Appl. No. 13/927,095, dated Apr. 30, 2015, 11 pages.

Office Action for U.S. Appl. No. 13/927,095, dated Nov. 4, 2015, 9 pages.

Office Action for U.S. Appl. No. 13/927,095, dated Jun. 1, 2016, 10 pages.

Office Action for U.S. Appl. No. 14/717,886, dated Apr. 19, 2016, 10 pages.

Office Action for U.S. Appl. No. 14/709,377, dated Dec. 11, 2015, 12 pages.

(56) References Cited

OTHER PUBLICATIONS

Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
CATT, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

\* cited by examiner

Trajectory of Time Varying
Impulse Response for Accelerating Reflector

Conceptual Implementation of the Heisenberg Transform in the Transmitter and the Wigner Transform in the Receiver Transformation of the Time-Frequency Plane to the Doppler-Delay Plane Different Basis Functions, Assigned to Different Users, Span the Whole Time-Frequency Frame

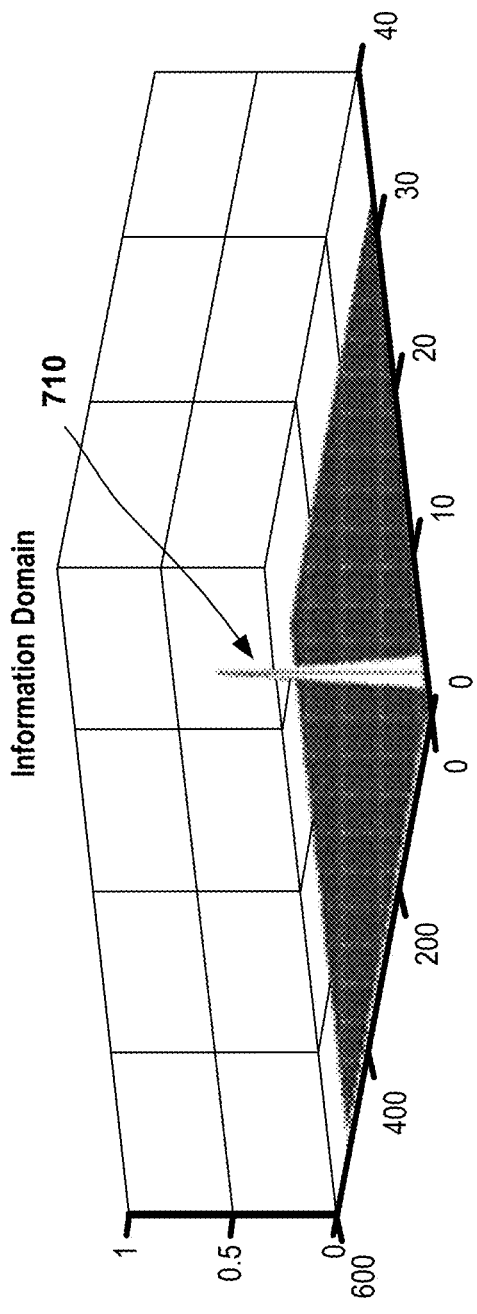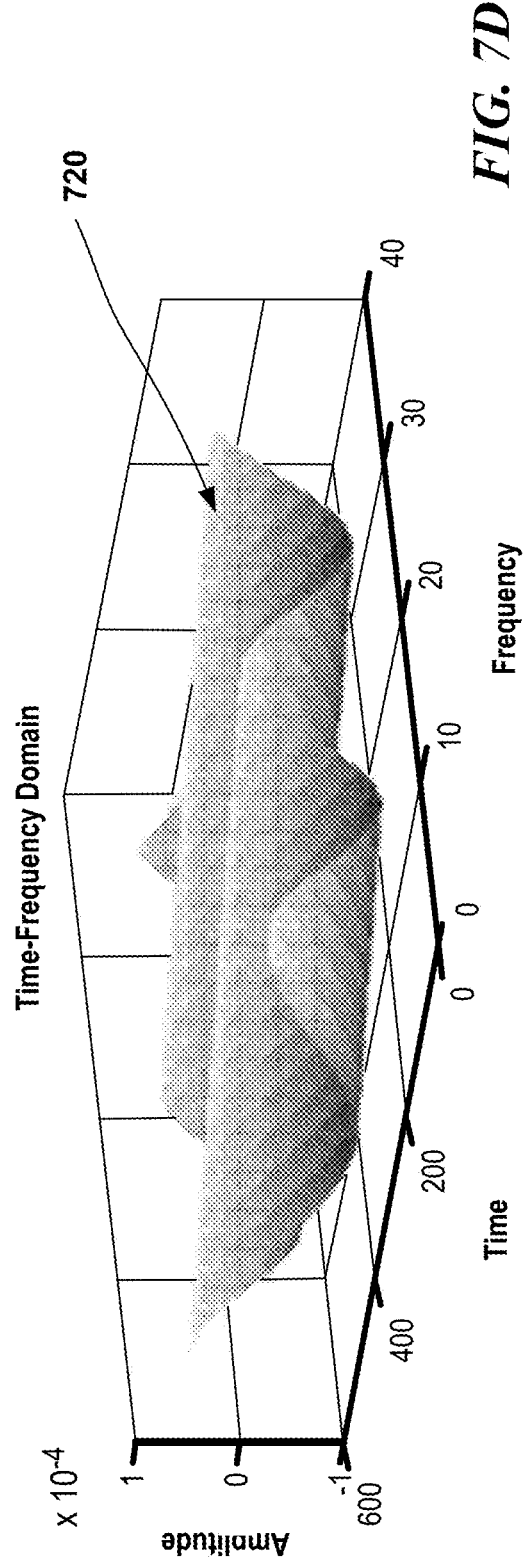

Multiplexing Three Users in the Time-Frequency Domain with Interleaving

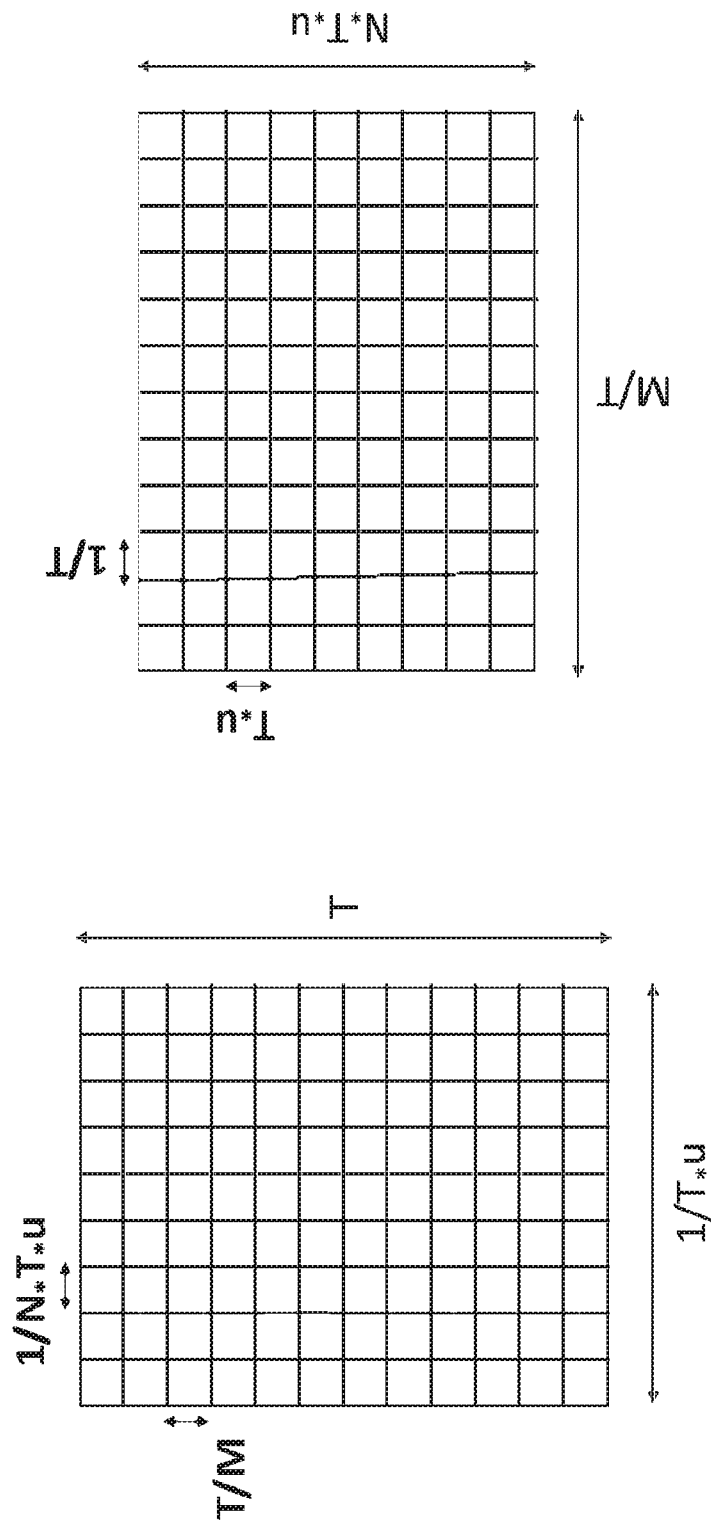

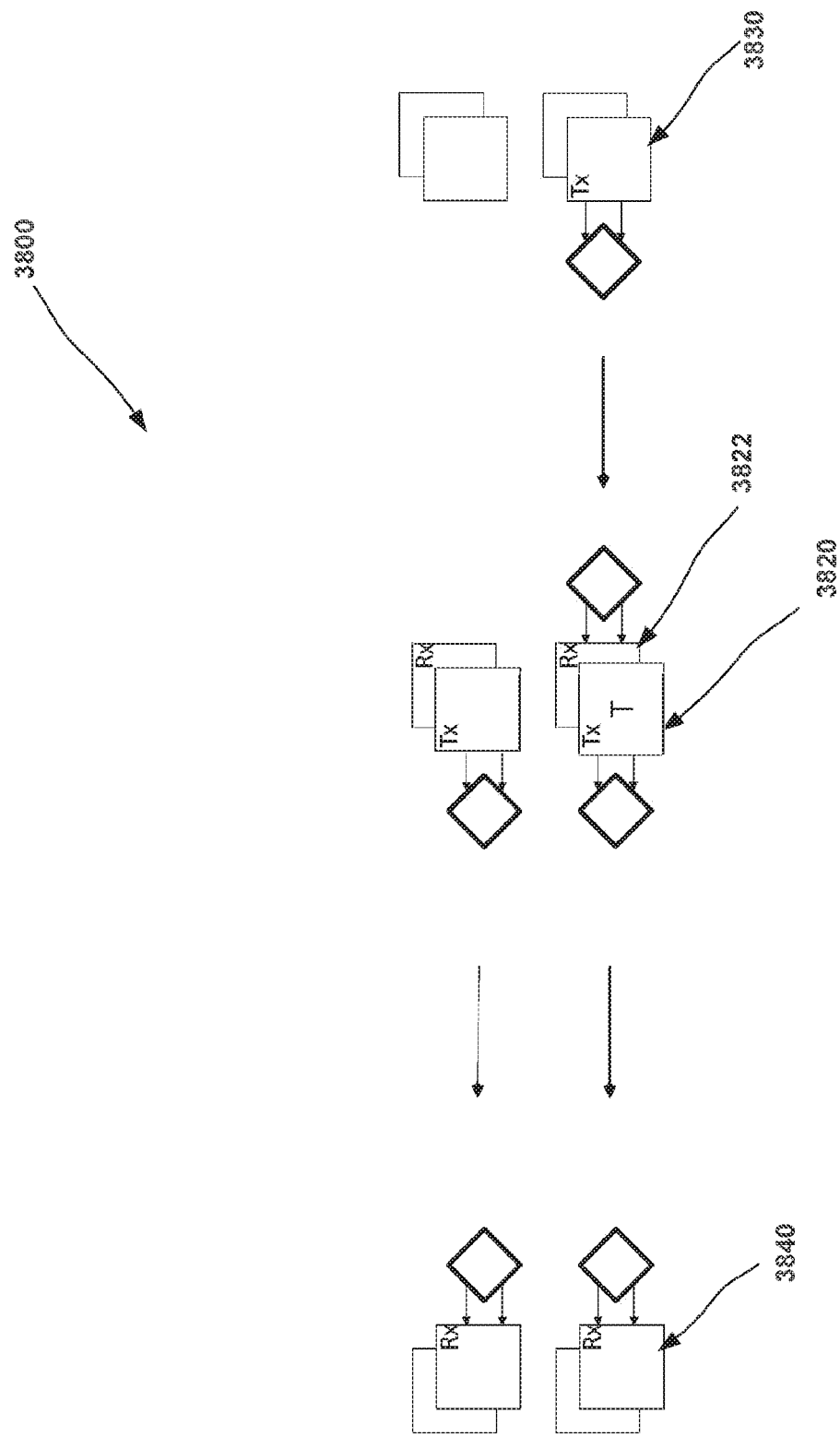

ORTHOGONAL TIME FREQUENCY SPACE COMMUNICATION SYSTEM COMPATIBLE WITH OFDM

CROSS-REFERENCE TO RELATED APPLICATIONS

The present application is a continuation of U.S. patent application Ser. No. 15/740,316, entitled "ORTHOGONAL TIME FREQUENCY SPACE COMMUNICATION COMPATIBLE WITH OFDM" filed Dec. 27, 2017, which is a 371 National Phase Application of PCT Application No. PCT/US2016/039662, entitled ORTHOGONAL TIME FREQUENCY SPACE COMMUNICATION SYSTEM COMPATIBLE WITH OFDM, filed Jun. 27, 2016, which claims the benefit of priority under 35 U.S.C. § 119(e) of U.S. Provisional Application No. 62/185,617, entitled ORTHOGONAL TIME FREQUENCY SPACE MODULATION, filed Jun. 27, 2015, of U.S. Provisional Application No. 62/185,619, entitled ORTHOGONAL TIME FREQUENCY SPACE MODULATION, filed Jun. 27, 2015, of U.S. Provisional Application No. 62/185,643, entitled ORTHOGONAL TIME FREQUENCY SPACE MODULATION, filed Jun. 28, 2015, and of U.S. Provisional Application No. 62/265,352, entitled OTFS COMMUNICATION SYSTEM USING MULTICARRIER MODULATORS AND DEMODULATORS, filed Dec. 9, 2015, and of U.S. Provisional application No. 62/191,468, filed Jul. 12, 2015. The contents of each of which are hereby incorporated by reference in their entirety for all purposes. The present application is a continuation-in-part of U.S. application Ser. No. 15/188,946, entitled SYMPLECTIC ORTHOGONAL TIME FREQUENCY SPACE MODULATION SYSTEM, filed Jun. 21, 2016, which is a continuation-in-part of U.S. application Ser. No. 15/152,464, entitled ORTHOGONAL TIME FREQUENCY SPACE MODULATION SYSTEM, filed May 11, 2016, which claims the benefit of priority under 35 U.S.C. § 119(e) of U.S. Provisional Application No. 62/159,853, entitled ORTHOGONAL TIME FREQUENCY SPACE OTFS MODULATION, filed May 11, 2015, of U.S. Provisional Application No. 62/160,257, entitled SYSTEMS AND METHODS FOR SYMPLECTIC ORTHOGONAL TIME FREQUENCY SHIFTING MODULATION AND TRANSMISSION OF DATA, filed May 12, 2015, of U.S. Provisional Application No. 62/173,801, entitled SYSTEMS AND METHODS FOR SYMPLECTIC ORTHOGONAL TIME FREQUENCY SHIFTING MODULATION AND TRANSMISSION OF DATA, filed Jun. 10, 2015, of U.S. Provisional Application No. 62/182,372, entitled OTFS A NEW MODULATION FOR 5G, filed Jun. 19, 2015, and of U.S. Provisional Application No. 62/215,663, entitled ORTHOGONAL TIME FREQUENCY SPACE COMMUNICATION SYSTEM AND METHOD, filed Sep. 8, 2015, the contents of each of which are hereby incorporated by reference in their entirety for all purposes. The present application is also a continuation-in-part of U.S. application Ser. No. 14/709,377, entitled MODULATION AND EQUALIZATION IN AN ORTHONORMAL TIME-FREQUENCY SHIFTING COMMUNICATIONS SYSTEM, filed May 11, 2015, which is a continuation of U.S. patent application Ser. No. 13/927,086, entitled MODULATION AND EQUALIZATION IN AN ORTHONORMAL TIME-FREQUENCY SHIFTING COMMUNICATIONS SYSTEM, filed on Jun. 25, 2013, which claims the benefit of priority under 35 U.S.C. § 119(e) of U.S. Provisional Application Ser. No. 61/664,020, entitled MODULATION AND EQUALIZATION IN AN ORTHONORMAL TIME-FREQUENCY SHIFTING COMMUNICATIONS SYSTEM, filed Jun. 25, 2012, of U.S. Provisional Application Ser. No. 61/801,398, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,366, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,435, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,495, entitled MODULATION AND EQUALIZATION IN AN ORTHONORMAL TIME-FREQUENCY SHIFTING COMMUNICATIONS SYSTEM, filed Mar. 15, 2013, of U.S. Provisional Application Ser. No. 61/801,994, entitled MODULATION AND EQUALIZATION IN AN ORTHONORMAL TIME-FREQUENCY SHIFTING COMMUNICATIONS SYSTEM, filed Mar. 15, 2013, and of U.S. Provisional Application Ser. No. 61/801,968, entitled MODULATION AND EQUALIZATION IN AN ORTHONORMAL TIME-FREQUENCY SHIFTING COMMUNICATIONS SYSTEM, filed Mar. 15, 2013, the contents of each of which are hereby incorporated by reference in their entirety for all purposes.

FIELD

This disclosure generally relates to communications protocols and methods, and more particularly relates to methods for modulation and related processing of signals used for wireless and other forms of communication.

BACKGROUND

Fourth generation (4G) wireless networks have served the public well, providing ubiquitous access to the Internet and enabling the explosion of mobile apps, smartphones and sophisticated data intensive applications like mobile video. This continues the evolution of cellular technologies, where each new generation brings substantial benefits to the public, enabling significant gains in productivity, convenience, and quality of life.

Looking ahead to the demands that the ever increasing and diverse data usage is placing on existing networks, it is becoming clear to the industry that current 4G networks will not be able to support the foreseen needs in data usage. This is in part because data traffic volume has been, and continues to, increase at an exponential rate. Moreover, new applications such as, for example, immersive reality and remote robotic operation, coupled with the ongoing expansion of mobile video, are expected to overwhelm the carrying capacity of current network systems. One of the goals of 5G system design is to be able to economically scale the capabilities of networks in dense urban settings (e.g., to 750 Gbps per sq. Km), which is not possible using technology which has been commercially deployed.

In addition to being able to handle larger volumes of data, next generation systems will need to improve the quality of data delivery in order to support desired future applications. The public is increasingly coming to expect that wireless networks provide a near "wireline" experience to the untethered user. This may translate to, for example, a requirement of 50+ Mbps throughout coverage areas (i.e., even at cell edges), which will require advanced interference mitigation technologies to be realized.

Another aspect of the quality of user experience is mobility. The throughput of current wireless networks tends to be dramatically reduced in tandem with increased mobile speeds due to Doppler effects. Future 5G systems aim to not only increase supported speeds up to 500 Km/h for high speed trains and aviation, but to also support a host of new automotive applications for vehicle-to-vehicle and vehicle-to-infrastructure communications.

While the support of increased and higher quality data traffic is necessary for wireless networks to continue supporting user needs, carriers are also exploring new applications that will enable new revenues and innovative use cases. These include the automotive and smart infrastructure applications discussed above. Other desired applications include the deployment of public safety ultra-reliable networks, the use of cellular networks to support the sunset of the PSTN, and the like. Moreover, it is anticipated the 5G networks will usher in the deployment of large numbers of Internet connected devices, also known as the Internet of Things (IoT). However, existing networks are not designed to support a very large number of connected devices with very low traffic per device.

SUMMARY

In one aspect the disclosure is directed to a method of transmitting data over a communication channel. The method includes receiving a plurality of information symbols. The method further includes encoding an N×M array containing the plurality of information symbols into a two-dimensional array of modulation symbols by spreading each of the plurality of information symbols with respect to both time and frequency. The two-dimensional array of modulation symbols is then transmitted using M mutually orthogonal waveforms included within M frequency sub-bands.

The encoding may further include transforming the N×M array into an array of filtered OFDM symbols using at least one Fourier transform and a filtering process and transforming the array of filtered OFDM symbols into an array of OTFS symbols using at least one two-dimensional Fourier transform.

The encoding may also be performed in accordance with the following relationship:

$$X[n, m] = \frac{1}{MN} W_{tr}[n, m] \sum_{k=0}^{N-1} \sum_{l=0}^{M-1} x[l, k] b_{k,l}[n, m]$$

$$b_{k,l}[n, m] = e^{j2\pi\left(\frac{ml}{M} - \frac{nk}{N}\right)}$$

where x[l,k], k=0, . . . , N−1, l=0, . . . , M−1 represents the N×M array containing the plurality of information symbols, X[n,m], n=0, . . . , N−1, m=0, . . . , M−1 represents the two-dimensional array of modulation symbols, $W_{tr}$[n,m] is a windowing function, and $b_{k,l}$[n,m] represent a set of basis functions.

The disclosure also pertains to an automated method of wireless communication over an impaired data channel. The method includes receiving a plurality of data symbols. The method further includes encoding an N×M two-dimensional array containing the plurality of data symbols into a two-dimensional array of modulation symbols by spreading each of the plurality of data symbols using a set of cyclically time-shifted and frequency-shifted basis functions. The two-dimensional array of modulation symbols is transmitted using M mutually orthogonal wireless waveforms included within M frequency sub-bands.

The encoding may further include transforming the N×M array into an array of filtered OFDM symbols using at least one Fourier transform and a filtering process and transforming the array of filtered OFDM symbols into an array of OTFS symbols using at least one two-dimensional Fourier transform.

The encoding may further include encoding the at least one N×M two-dimensional array of data symbols onto at least one symplectic-like analysis compatible manifold distributed over a column time axis of length T and row frequency axis of length F, thereby producing at least one Information manifold. In addition, the encoding may include transforming the at least one Information manifold in accordance with a two-dimensional symplectic-like Fourier transform, thereby producing at least one two-dimensional Fourier transformed Information manifold.

In another aspect the disclosure relates to a method of generating a waveform for transmission over a communication channel. The method includes receiving a plurality of information symbols and creating a plurality of modulation symbols by using each of the plurality information symbols to modulate one of a plurality of two-dimensional basis functions on a time-frequency plane Each of the plurality of two-dimensional basis functions is uniquely associated with one of the plurality of information symbols. The method further includes generating a transmit waveform comprised of a plurality of pulse waveforms, each of the plurality of pulse waveforms corresponding to a combination of one of the plurality of modulation symbols and one of a plurality of time-translated and frequency-modulated versions of a fundamental transmit pulse.

In one implementation each of the plurality of time-translated and frequency-modulated versions of the fundamental transmit pulse is associated with a time translation by one of N multiples of T and a frequency modulation by one of M multiples of Δf, where the transmit waveform is of a total duration of NT seconds and a total bandwidth of MΔf Hz. The fundamental transmit pulse may have the property of being orthogonal to translations by a multiple of time T and modulation by a multiple of Δf.

In another aspect the disclosure relates to a communication device including a wireless transmitter, a processor and a memory including program code executable by the processor. The program code includes code for causing the processor to receive a plurality of information symbols. The program code further includes code for causing the processor to create a plurality of modulation symbols by using each of the plurality information symbols to modulate one of a plurality of two-dimensional basis functions on a time-frequency plane. Each of the plurality of two-dimensional basis functions is uniquely associated with one of the plurality of information symbols. The program code further causes the processor to generate a transmit waveform comprised of a plurality of pulse waveforms, each of the plurality of pulse waveforms corresponding to a combination of one of the plurality of modulation symbols and one of a plurality of time-translated and frequency-modulated versions of a fundamental transmit pulse. The program code further includes code for causing the processor to provide the transmit waveform to the wireless transmitter.

The disclosure is also directed to a method for receiving, at a communication receiver, one or more modulated waveforms. The method further includes performing matched filtering of samples of the one or more modulated waveforms with respect to a receive pulse to produce estimated time-frequency modulation symbols. Each of the estimated time-frequency modulation symbols corresponds to modulation of one of a plurality of orthogonal two-dimensional basis functions by one of a plurality of information symbols. The method further includes projecting the estimates of the time-frequency modulation symbols on the plurality of orthogonal two-dimensional basis functions in order to obtain estimates of the plurality of information symbols.

In one implementation the method may further include performing windowing and periodization operations with respect to the estimated time-frequency modulation symbols. In addition, the projecting operation may include performing a symplectic Fourier transform operation with respect to a periodic sequence comprised of the estimates of the time-frequency modulation symbols.

In yet another aspect the disclosure pertains to a communication device including a wireless receiver configured to receive one or more modulated waveforms, a processor and a memory including program code executable by the processor. The program code includes code for causing the processor to receive, from the wireless receiver, samples of one or more modulated waveforms. The code further includes code for causing the processor to matched filter samples of the one or more modulated waveforms with respect to a receive pulse to produce estimated time-frequency modulation symbols. Each of the estimated time-frequency modulation symbols corresponds to modulation of one of a plurality of orthogonal two-dimensional basis functions by one of a plurality of information symbols. The program code further includes code for causing the processor to project the estimated time-frequency modulation symbols on the plurality of orthogonal two-dimensional basis functions in order to obtain estimates of the plurality of information symbols.

In one implementation the program code may further include code for performing windowing and periodization operations with respect to the estimated time-frequency modulation symbols. In addition, the code may include code for causing the processor to perform a symplectic Fourier transform operation with respect to a periodic sequence comprised of the estimated time-frequency modulation symbols.

The disclosure is further directed to a method of providing a modulated signal useable in a signal transmission system. The method includes performing a two dimensional time-frequency transformation of a data frame including a plurality of information symbols into a plane of time-frequency modulation symbols. The method further includes generating the modulated signal by performing a Heisenberg transform using the plane of time-frequency modulation symbols. In one implementation performing the two dimensional time-frequency transformation entails performing an inverse time-frequency symplectic transformation and a windowing operation.

In another aspect the disclosure pertains to a signal modulation method in which a data frame including a plurality of information symbols is transformed into a plane of time-frequency modulation symbols using a two dimensional time-frequency transformation. The method includes generating the modulated signal based upon the plane of time-frequency modulation symbols using an OFDM modulator. In one implementation performing the two dimensional time-frequency transformation entails performing an inverse time-frequency symplectic transformation and a windowing operation.

The disclosure also pertains to a method of providing a modulated signal useable in a signal transmission system. The method includes performing a two dimensional time-frequency transformation of a data frame including a plurality of information symbols into a plane of time-frequency modulation symbols. The method further includes generating the modulated signal based upon the plane of time-frequency modulation symbols using a multicarrier filter bank (MCFB) modulator. In one implementation performing the two dimensional time-frequency transformation includes performing an inverse time-frequency symplectic transformation and a windowing operation.

In another aspect, the disclosure describes a transmitter apparatus including an OTFS pre-processing unit. The OTFS pre-processing unit is configured to perform a two dimensional time-frequency transformation of a data frame including a plurality of information symbols into a plane of time-frequency modulation symbols. The transmitter apparatus includes an OFDM or multicarrier filter bank modulator configured to generate the modulated signal based upon the plane of time-frequency modulation symbols. In one implementation the two dimensional transformation comprises an inverse time-frequency symplectic transformation and a windowing operation.

The disclosure further pertains to a method of receiving a modulated signal. The method includes receiving a plurality of signal components of the modulated signal and generating, by performing an OFDM demodulation operation using the plurality of signal components, a plane of estimated time-frequency modulation symbols. The method further includes providing an estimated data frame by performing an inverse of a two dimensional time-frequency transformation with respect to the plane of estimated time-frequency modulation symbols. In one implementation performing the inverse of the two dimensional time-frequency transformation includes performing a windowing operation and a symplectic Fourier transform.

In a further aspect the disclosure is directed to a method of receiving a modulated signal. The method includes receiving a plurality of signal components of the modulated signal and generating, by performing one of an OFDM and MCFB demodulation operation using the plurality of signal components, a plane of estimated time-frequency modulation symbols. The method further includes providing an estimated data frame by performing an inverse of a two dimensional time-frequency transformation with respect to the plane of estimated time-frequency modulation symbols. In one implementation performing the inverse of the two dimensional time-frequency transformation includes performing a windowing operation and a symplectic Fourier transform.

In an additional aspect the disclosure relates to a receiver apparatus including a receiver front end configured to receive a plurality of signal components of a modulated signal. The receiver includes one of an OFDM and MCFB demodulator configured to generate a plane of estimated time-frequency modulation symbols based upon the plurality of signal components. An OTFS post-processing unit is operative to provide an estimated data frame by performing an inverse of a two dimensional time-frequency transformation with respect to the plane of estimated time-frequency modulation symbols. In one implementation the inverse of the two dimensional time-frequency transformation corresponds to a windowing operation and a symplectic Fourier transform.

BRIEF DESCRIPTION OF THE DRAWINGS

For a better understanding of the nature and objects of various embodiments of the invention, reference should be made to the following detailed description taken in conjunction with the accompanying drawings, wherein.

5B indicates relationships between sampling rate, delay resolution and time resolution in an OTFS communication system.

Figure 5A:
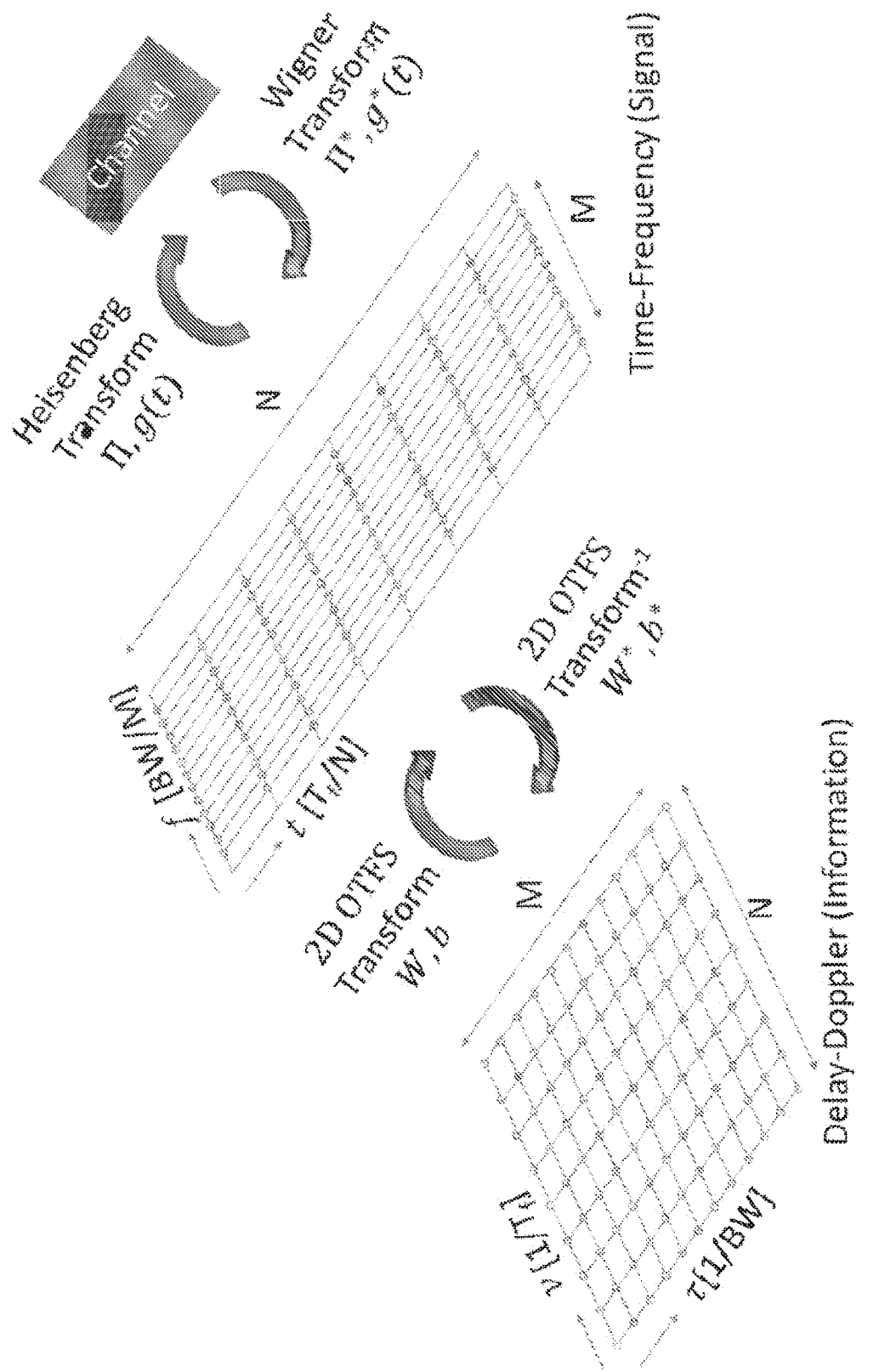
FIG. 5A illustratively represents an exemplary embodiment of OTFS modulation, including the transformation of the time-frequency plane to the Doppler-delay plane.
Figure 5B:
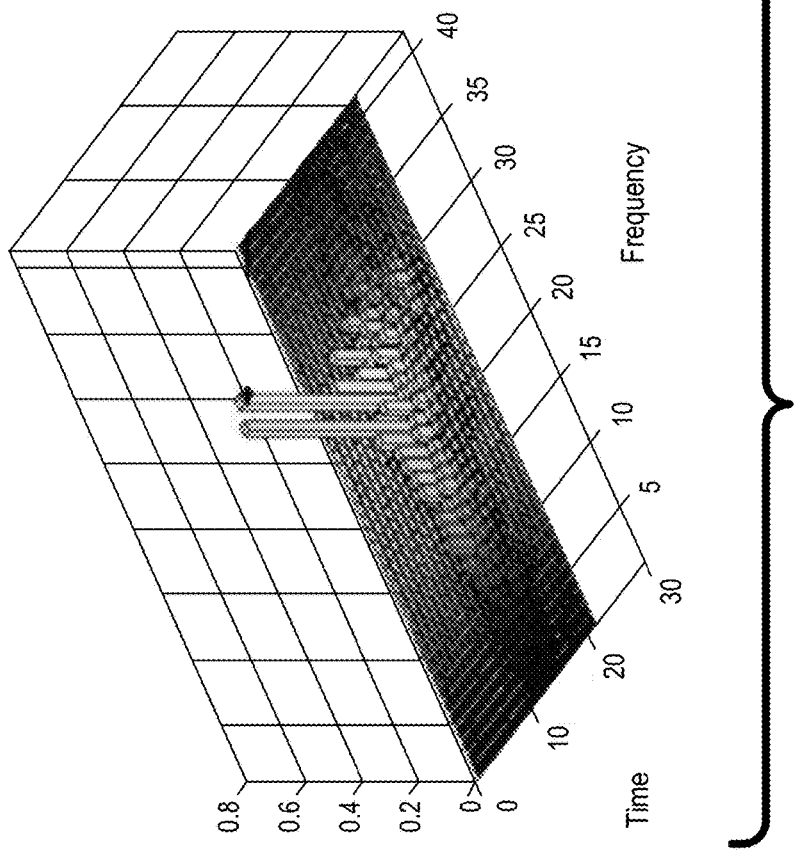
Figure 5C:
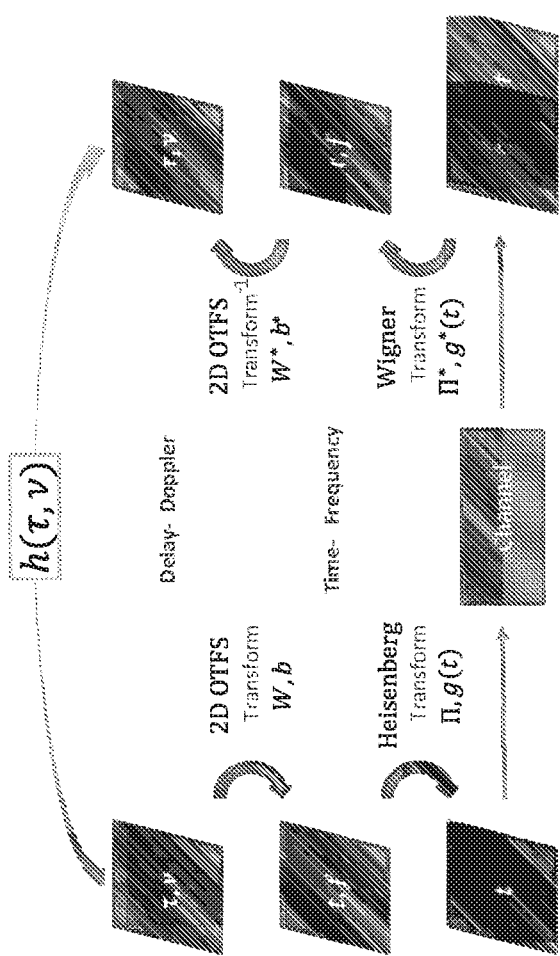

FIG. 5C illustrates signaling between various domains in an OTFS communication system.

Figure 5D:
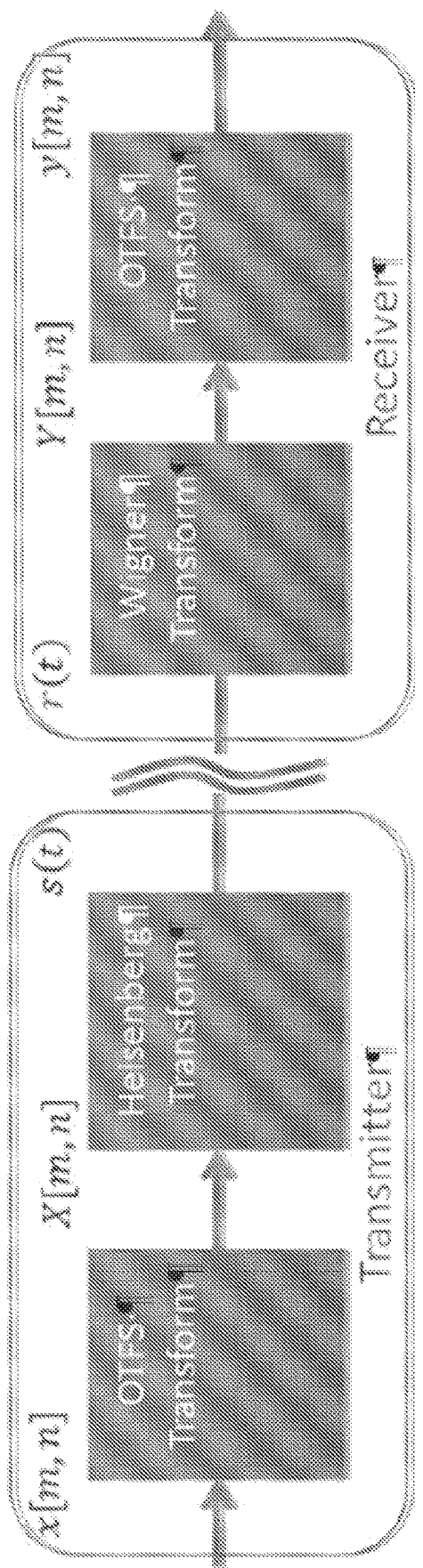

FIG. 5D depicts exemplary notations used in denoting signals present at various stages of processing in an OTFS transmitter and receiver.

Figure 6:
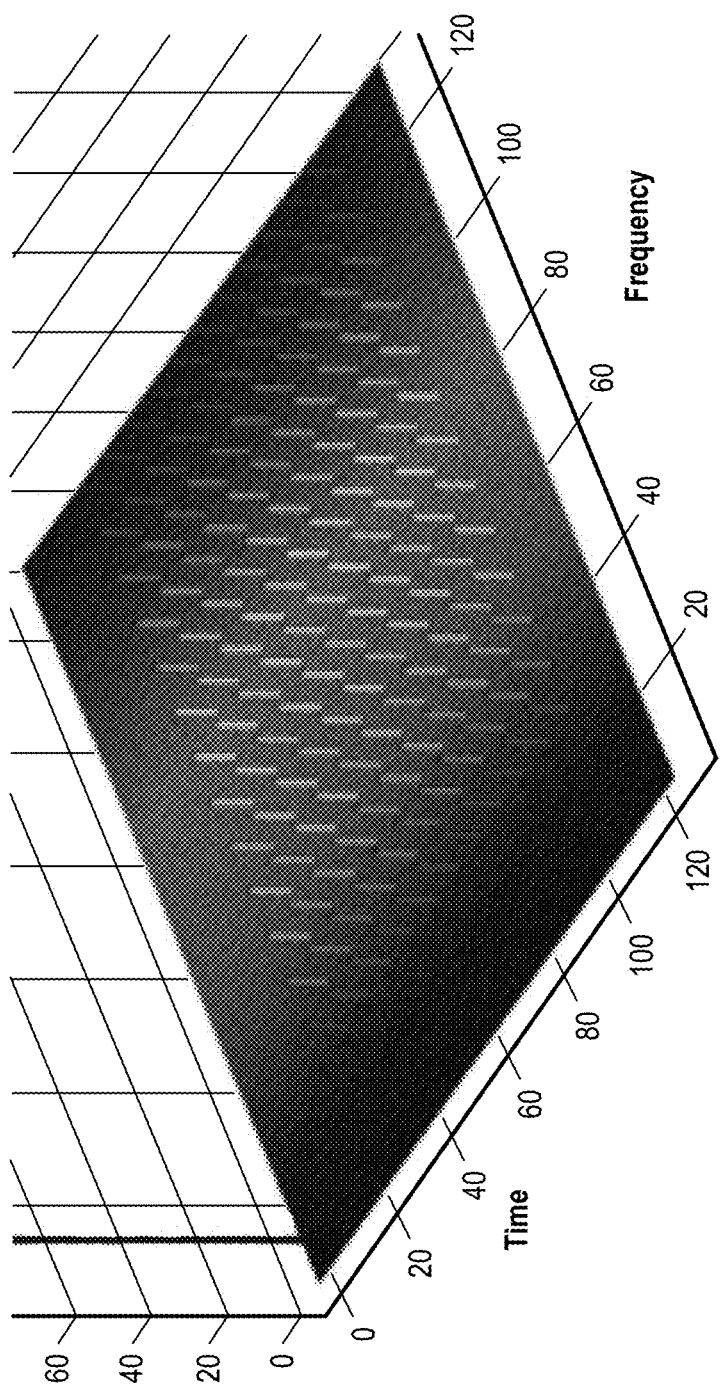

FIG. 6 shows a discrete impulse in the OTFS domain which is used for purposes of channel estimation.

Figure 7A:
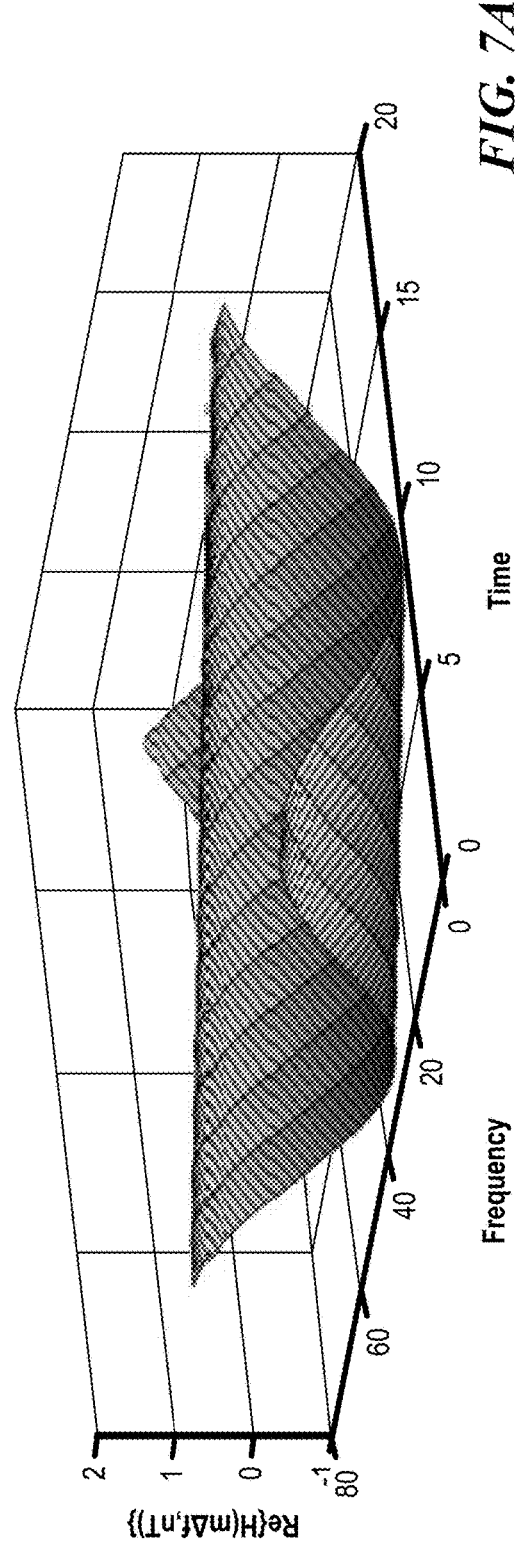
Figure 7B:
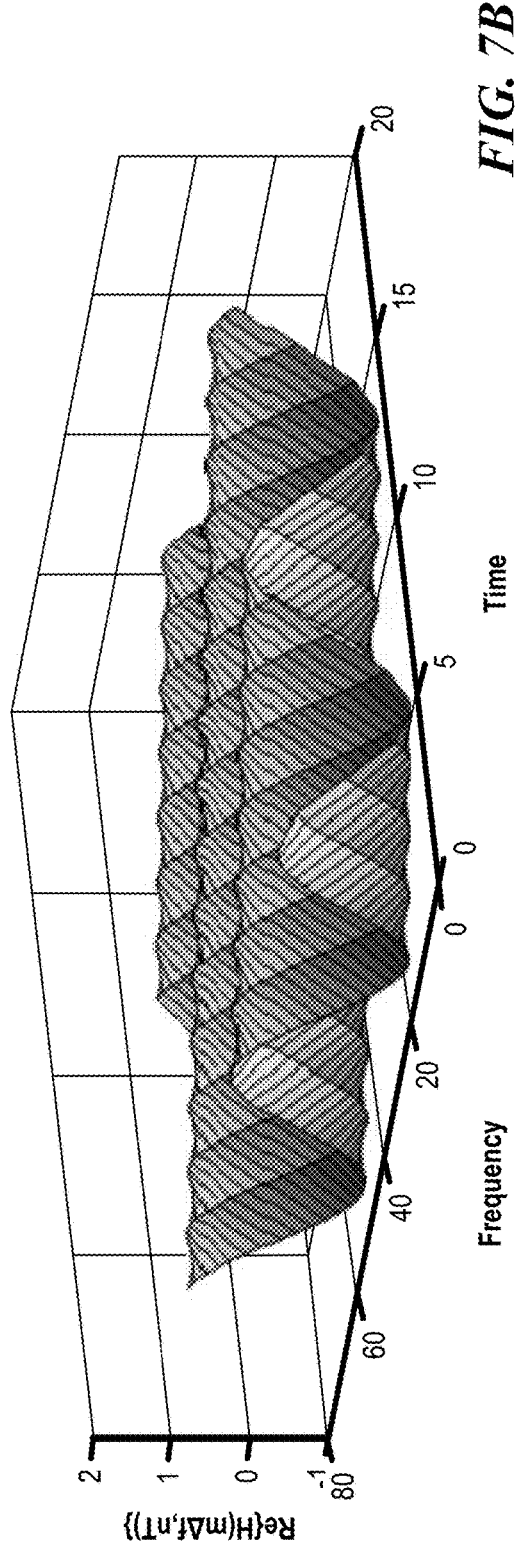

FIGS. 7A and 7B illustrate two different basis functions belonging to different users, each of which spans the entire time-frequency frame.

FIGS. 7C and 7D provide an illustration of two-dimensional spreading with respect to both time and frequency in an OTFS communication system.

Figure 7E:
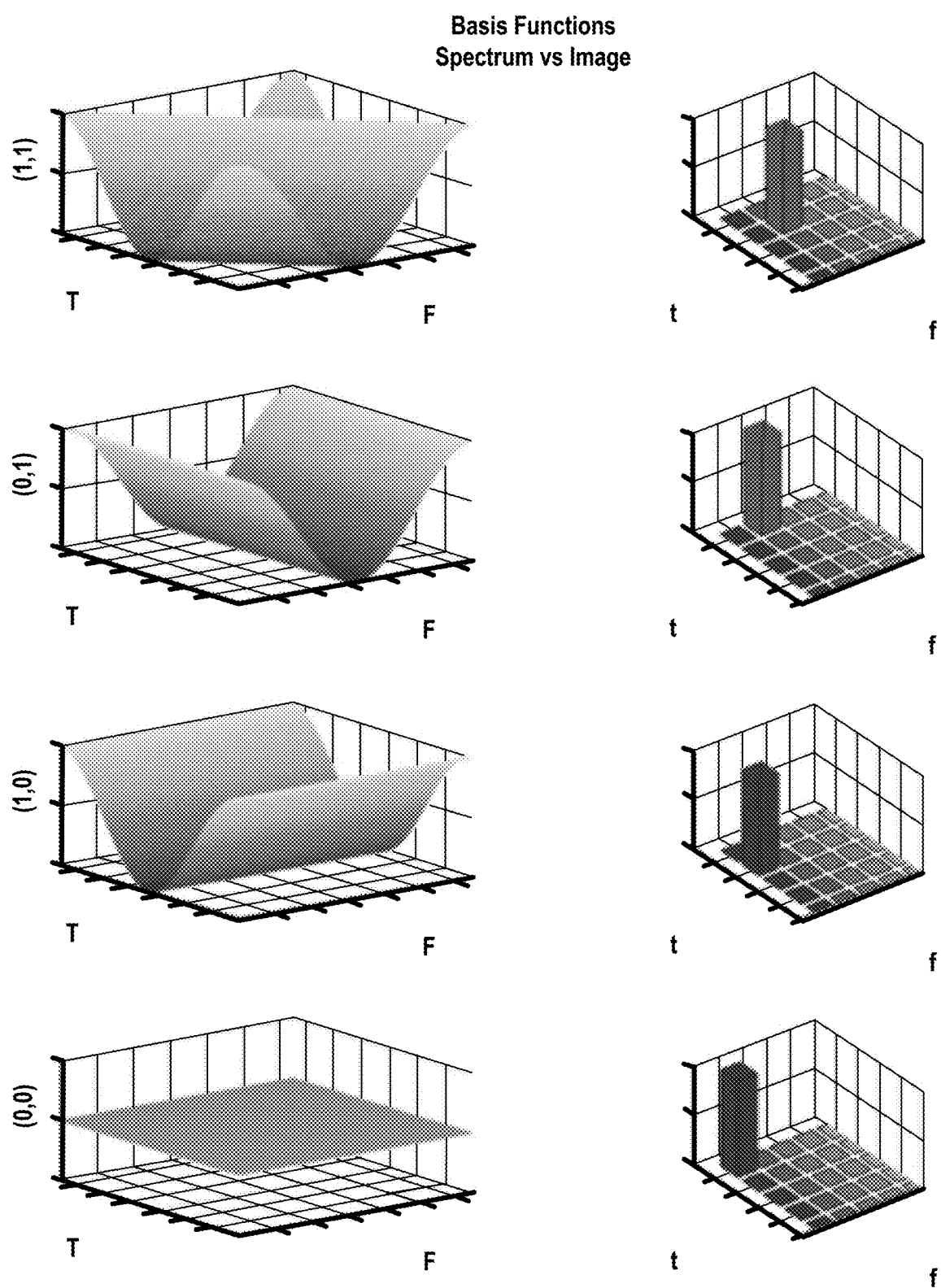

FIG. 7E illustrates members of a potential set of such mutually orthogonal two-dimensional basis functions.

Figure 8:
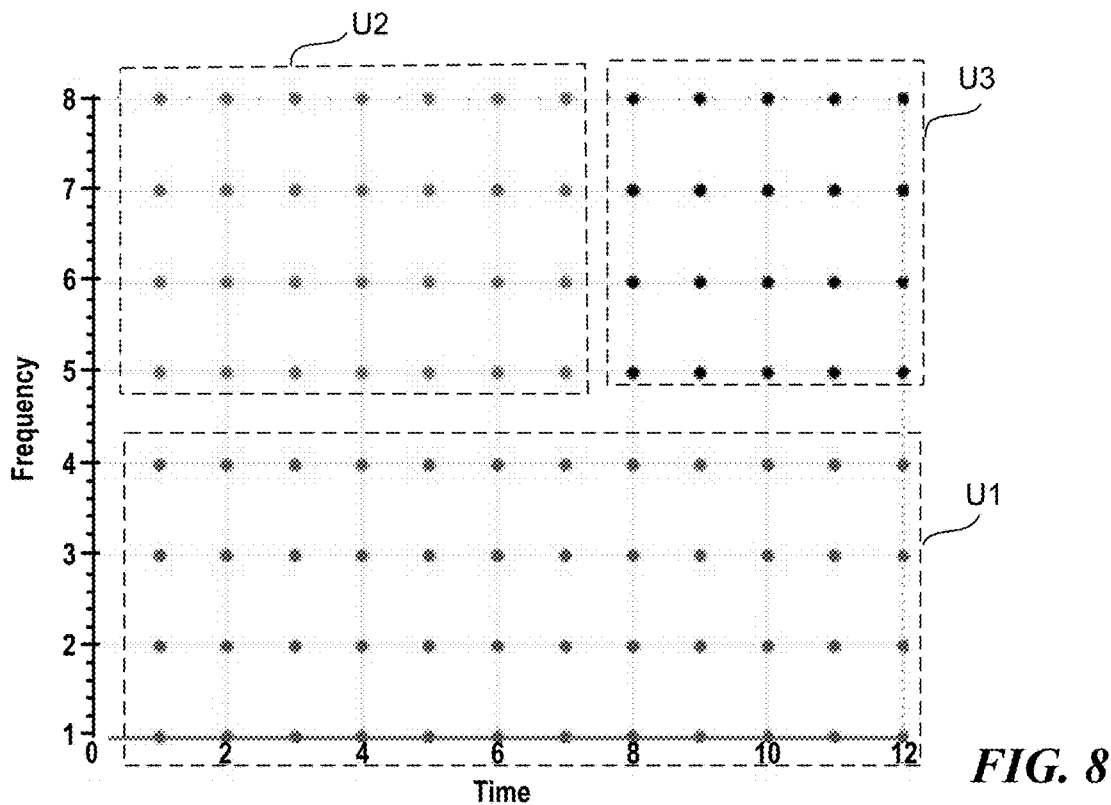
Figure 9:
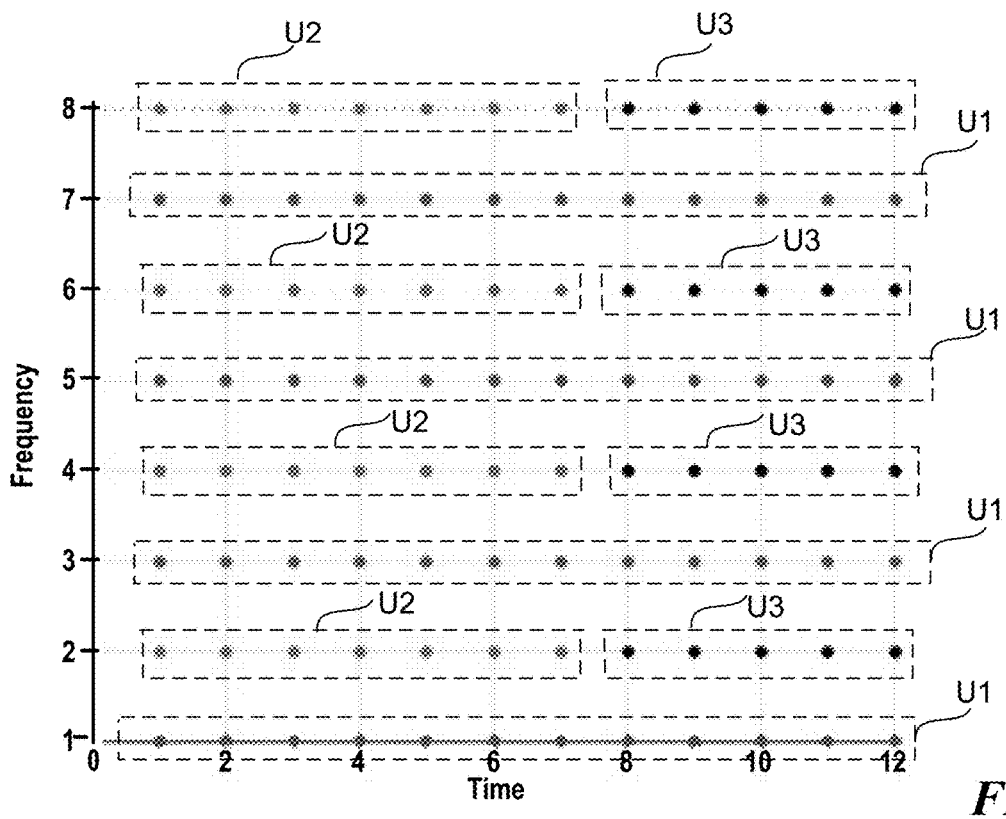

FIGS. 8 and 9 illustrate multiplexing multiple users in the time-frequency domain by allocating different resource blocks or subframes to different users in an interleaved manner.

Figure 10:
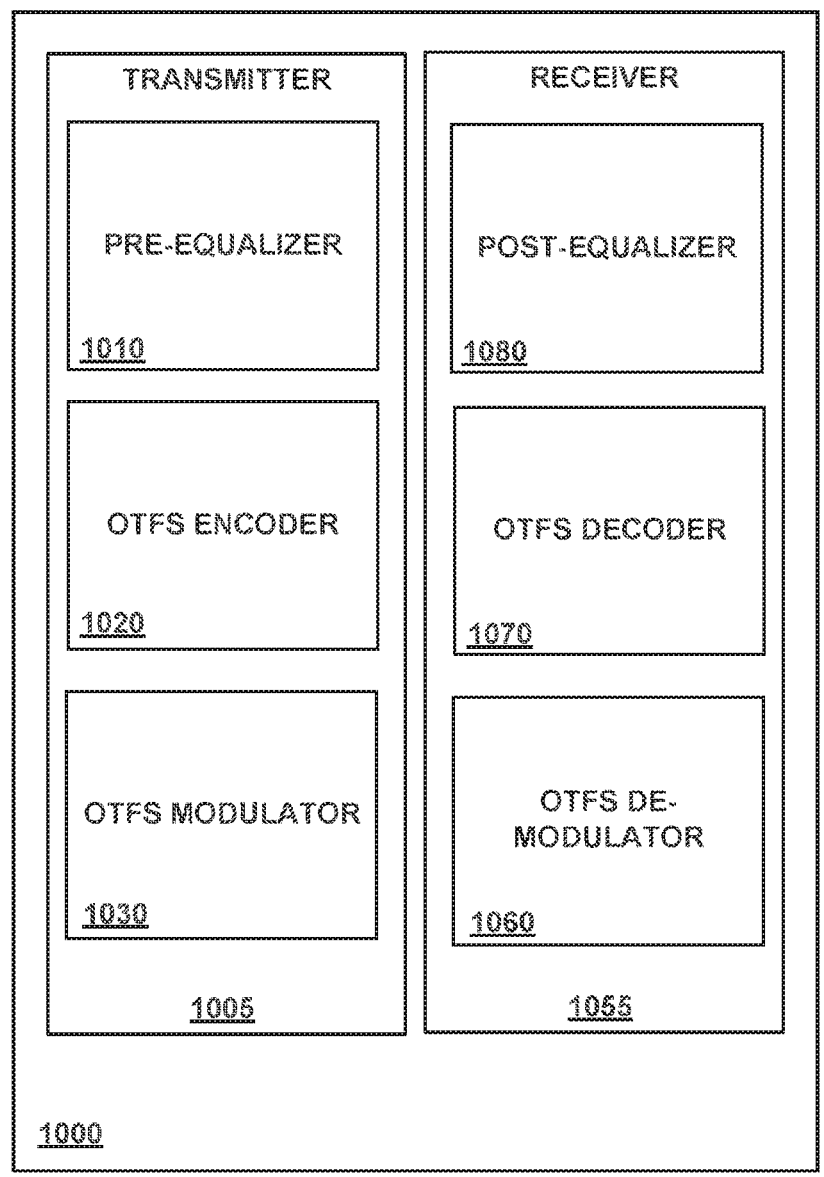

FIG. 10 illustrates components of an exemplary OTFS transceiver.

Figure 11:
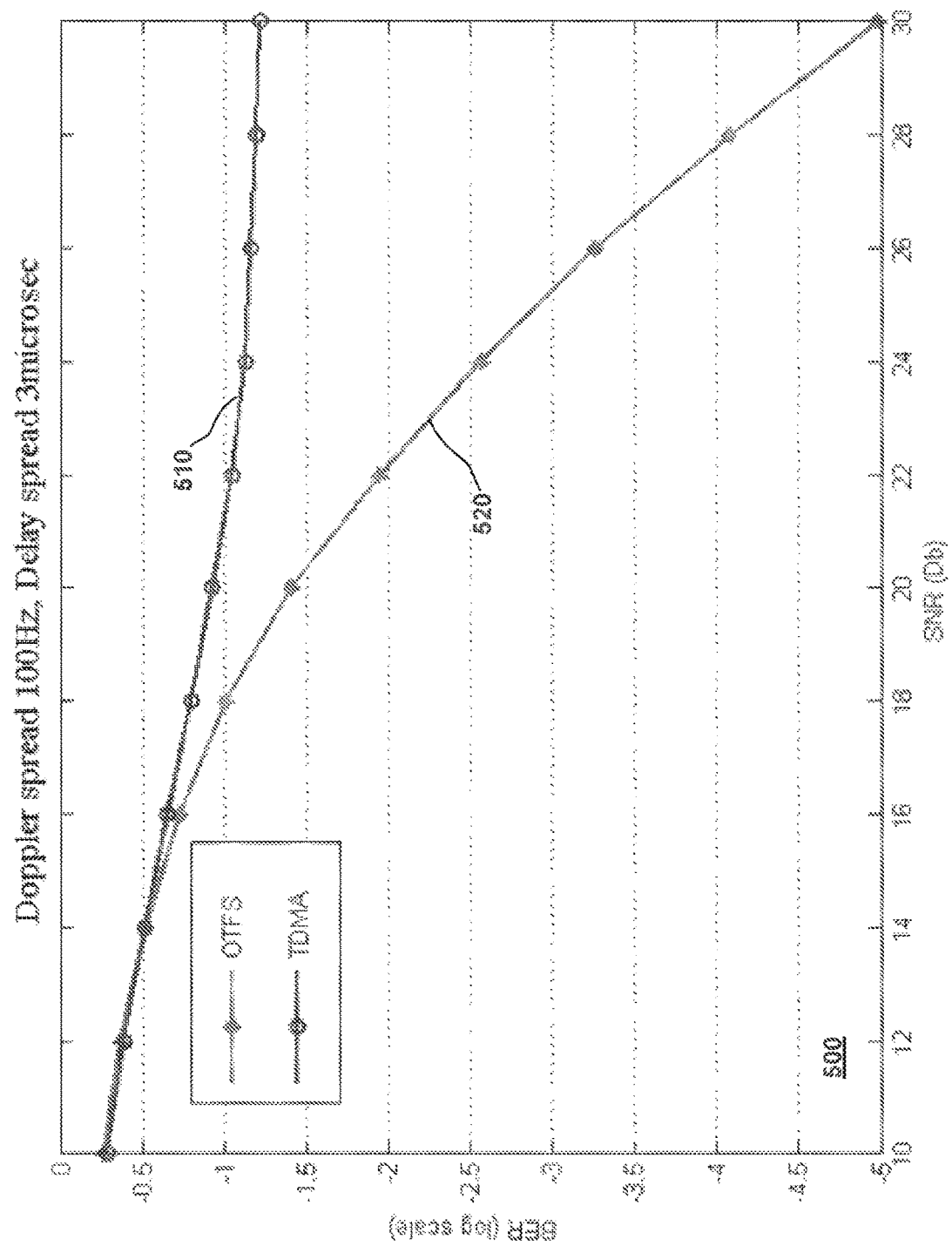

FIG. 11 illustrates a comparison of bit error rates (BER) predicted by a simulation of a TDMA system and an OTFS system.

Figure 12:
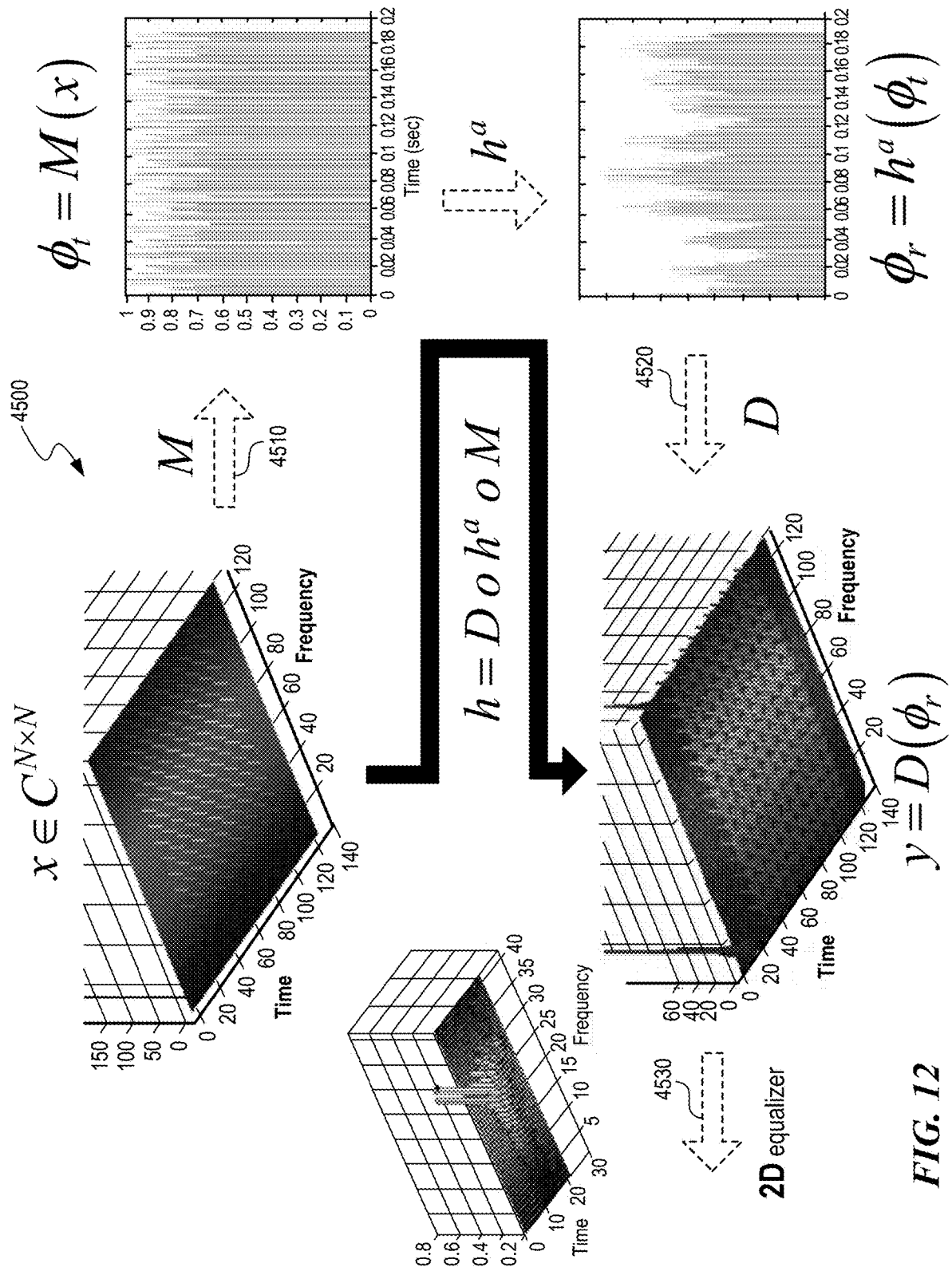

FIG. 12 is a flowchart representative of the operations performed by an exemplary OTFS transceiver.

Figure 13:
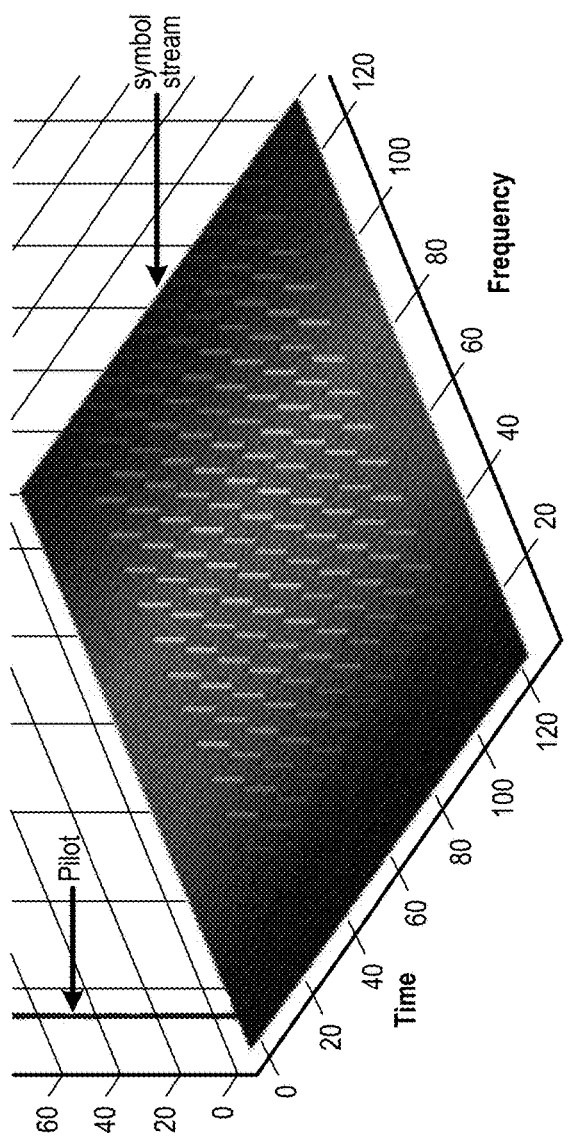
Figure 13:
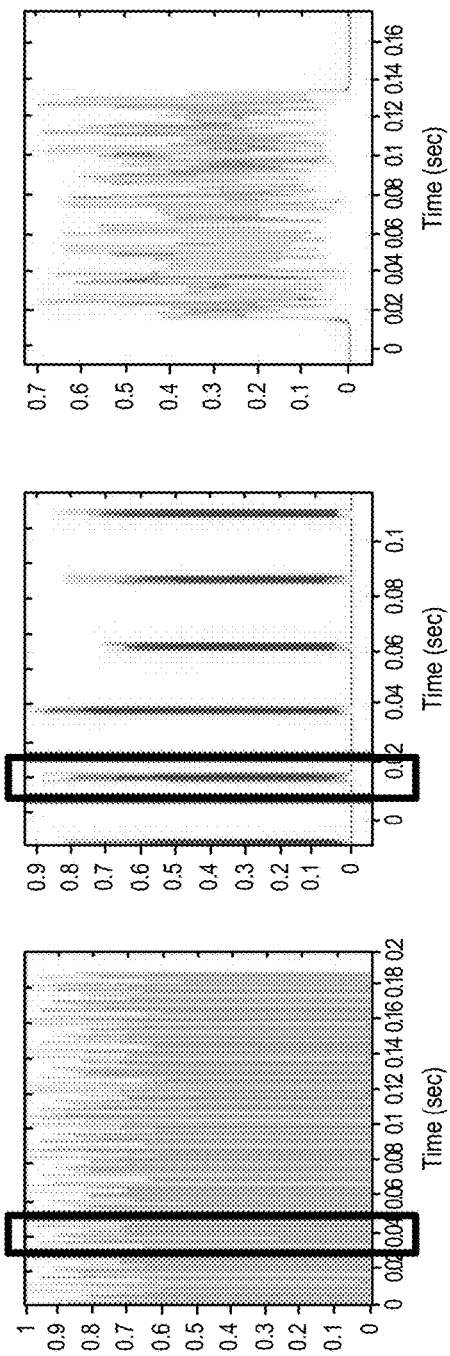

FIG. 13 illustrates functioning of an OTFS modulator as an orthogonal map disposed to transform a two-dimensional time-frequency matrix into a transmitted waveform.

Figure 14:
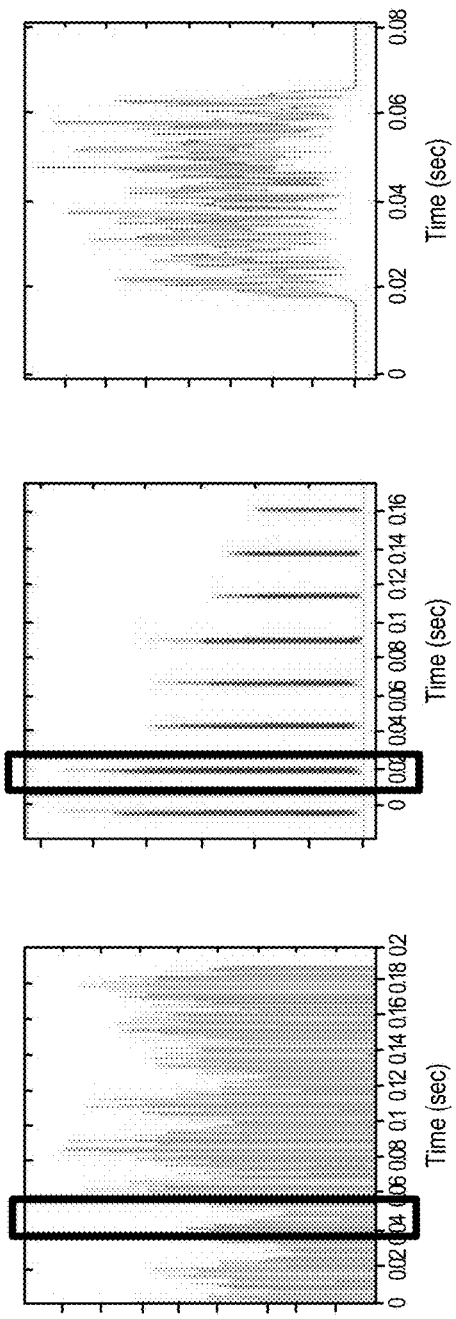
Figure 14:
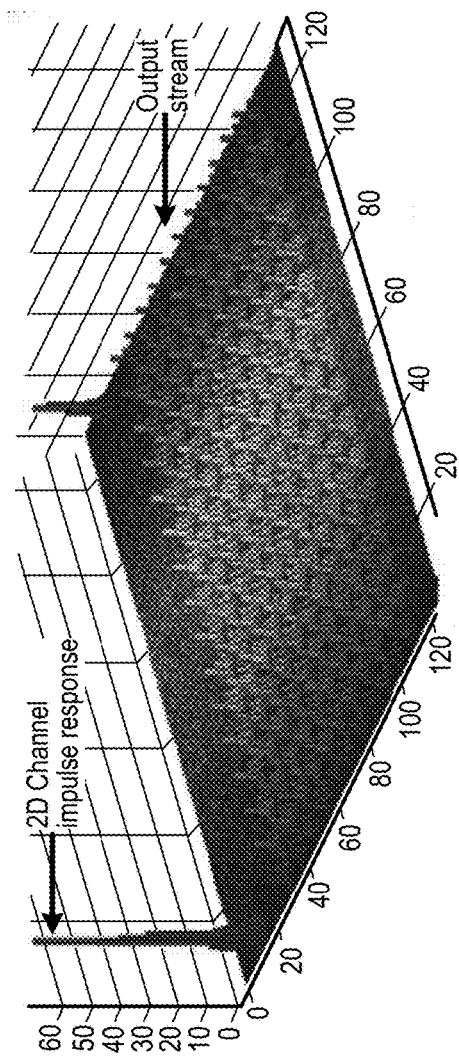

FIG. 14 illustrates operation of an OTFS demodulator in transforming a received waveform into a two-dimensional time-frequency matrix in accordance with an orthogonal map.

Figure 15:
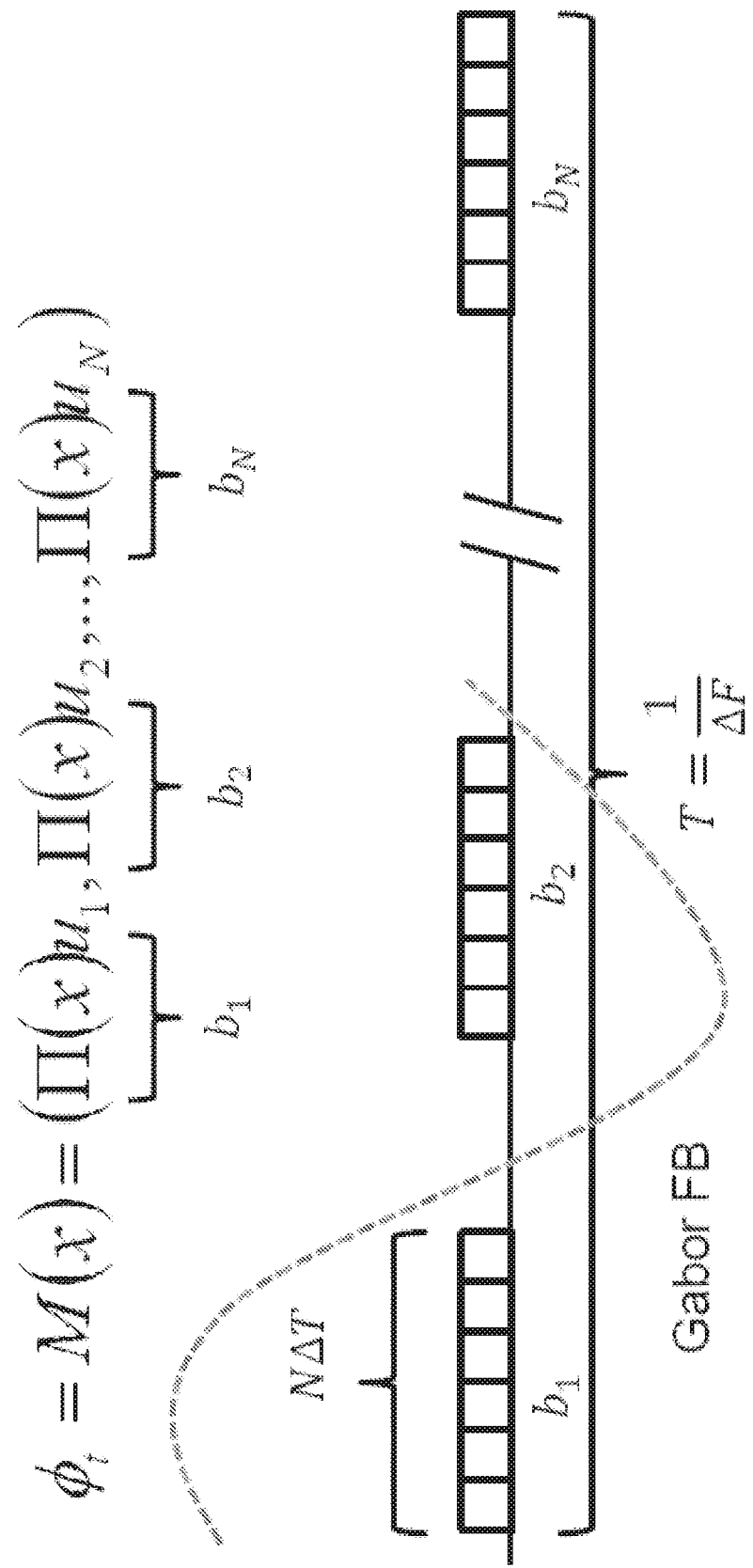

FIG. 15 illustratively represents a pulse train included within a pulse waveform produced by an OTFS modulator.

Figure 16:
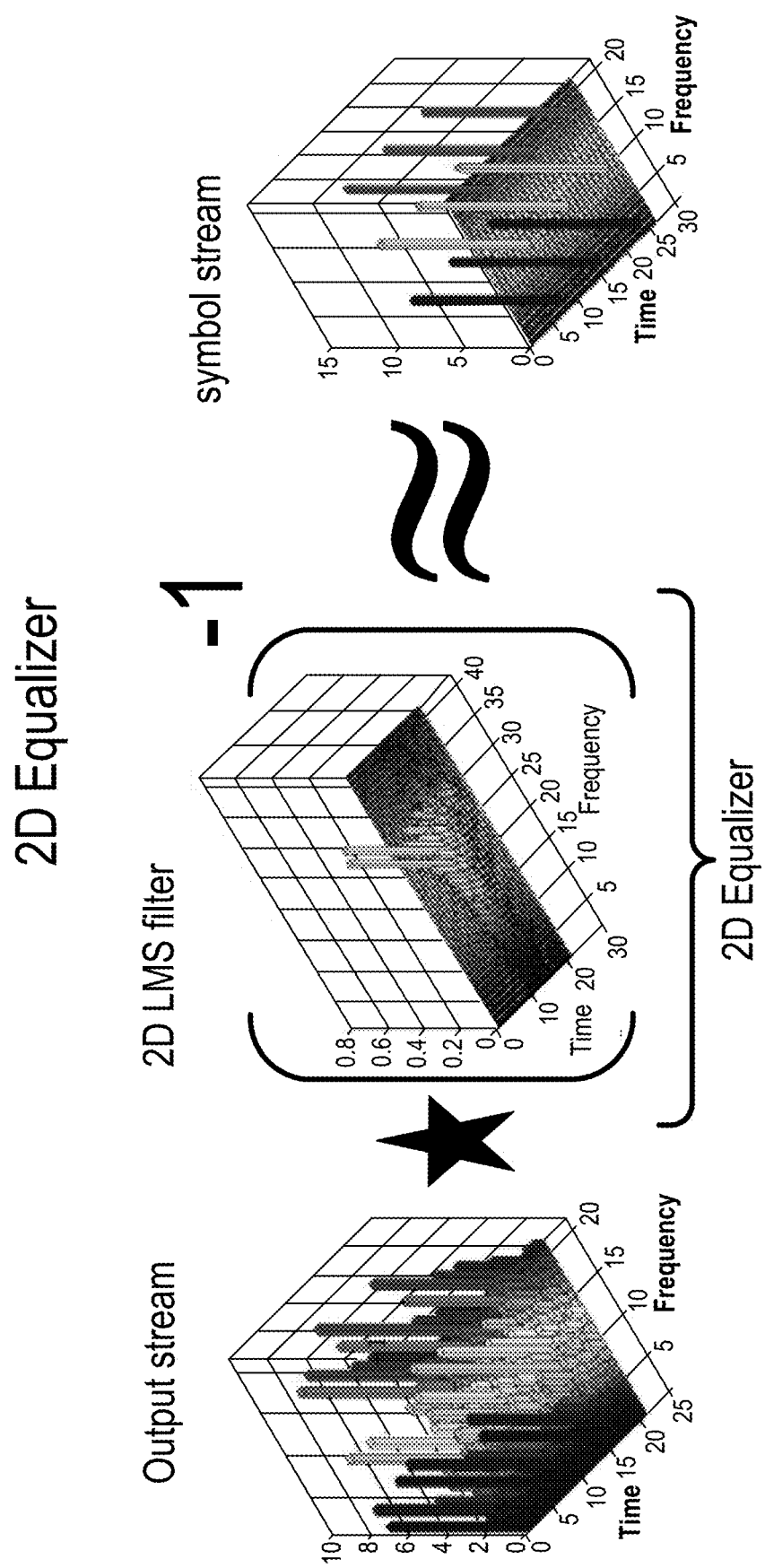

FIG. 16 depicts a two-dimensional decision feedback equalizer configured to perform a least means square (LMS) equalization procedure.

FIGS. 17A-17D depict an OTFS transmitter and receiver and the operation of each with respect to associated time-frequency grids.

Figure 18A:
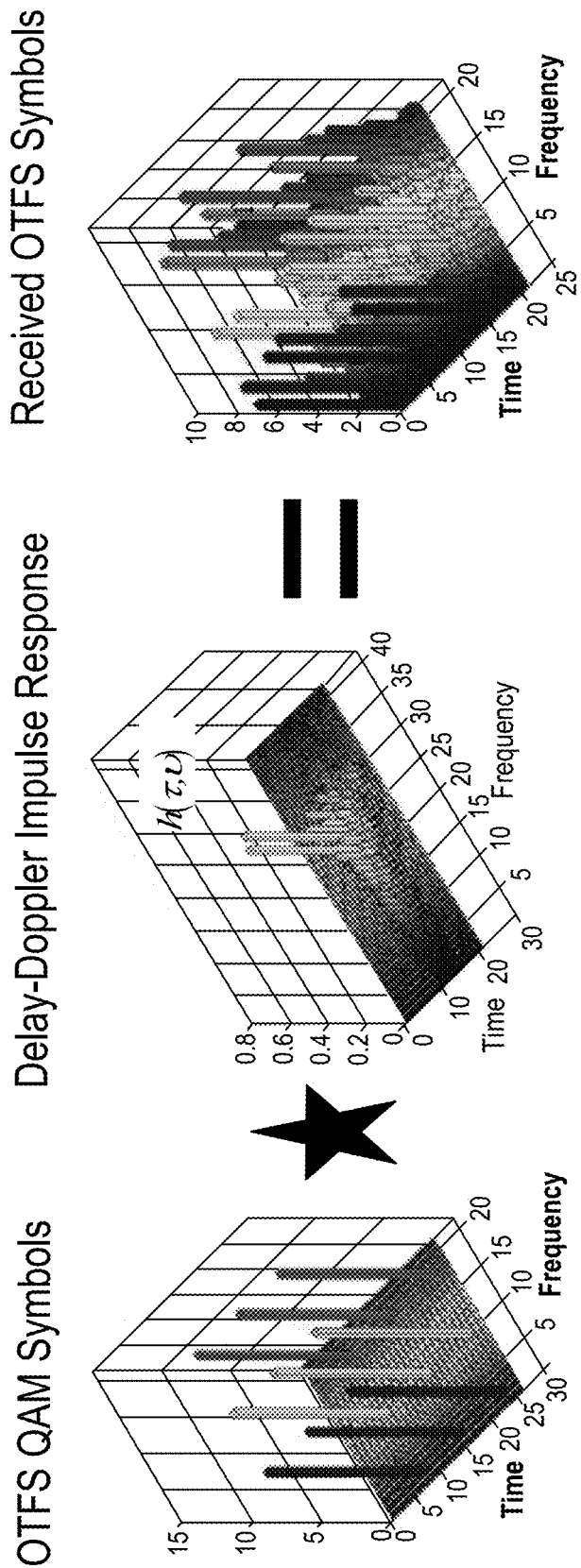
Figure 18B:
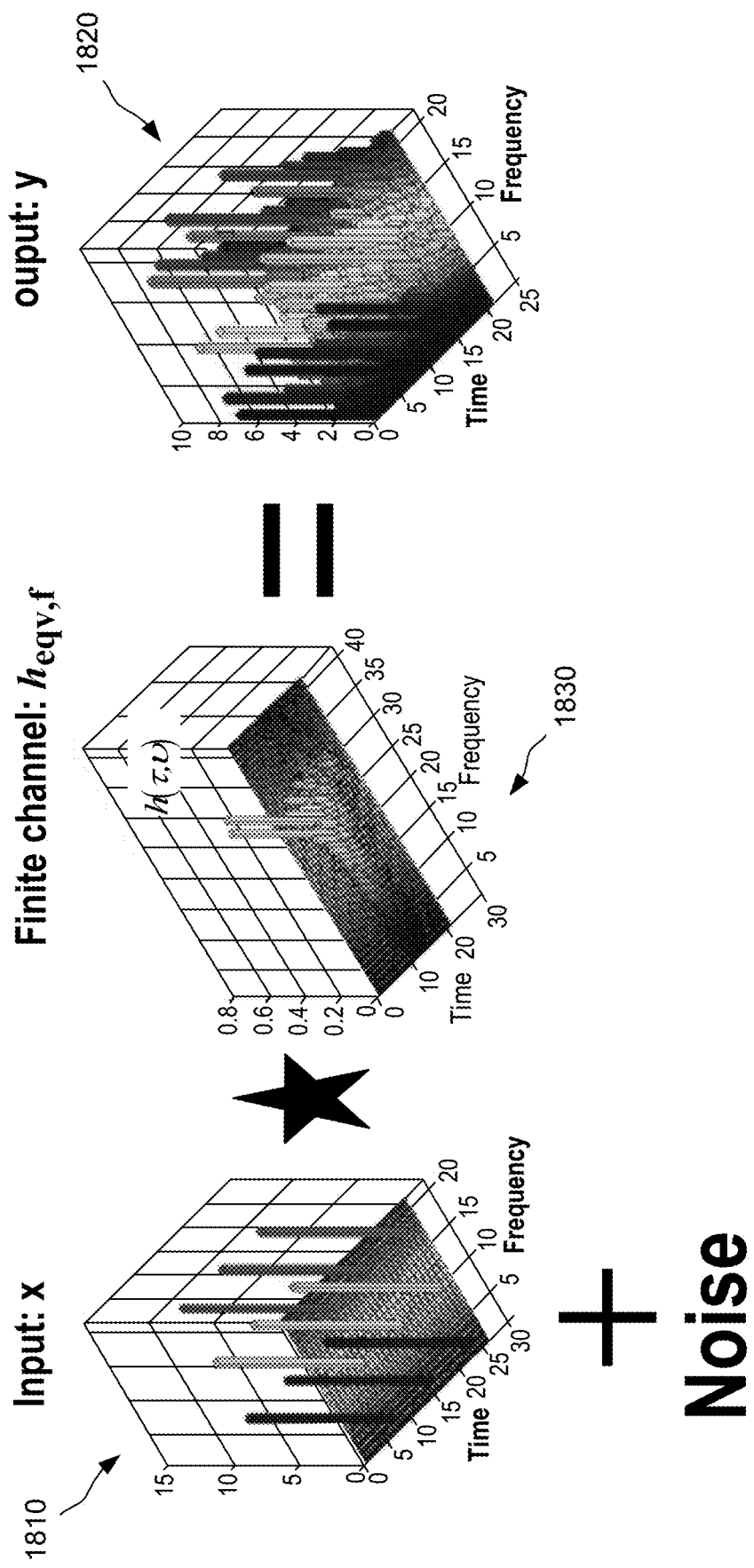

FIGS. 18A and 18B illustratively represent OTFS communication over a communication channel characterized by a two-dimensional delay-Doppler impulse response.

Figure 19A:
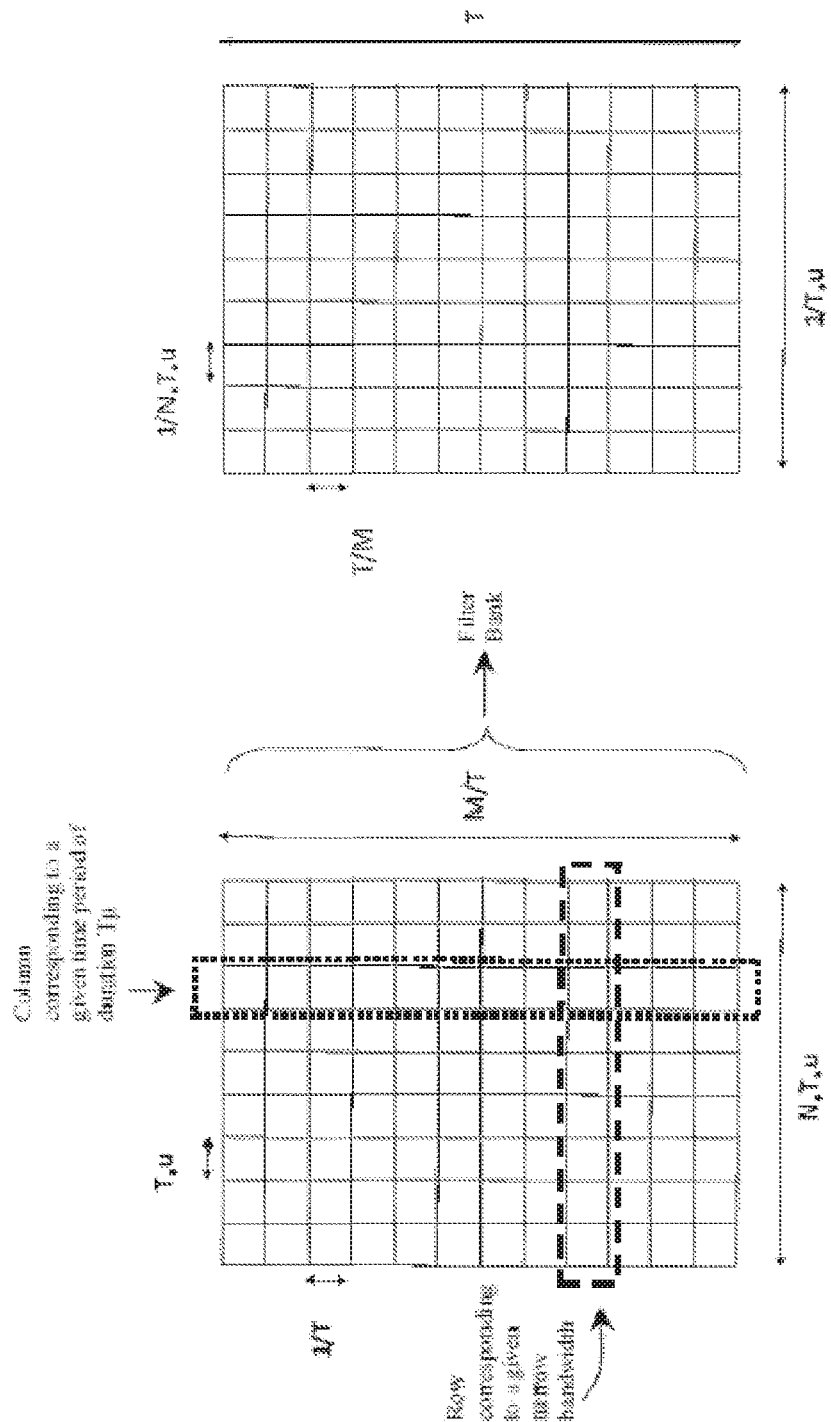

FIG. 19A illustrates transmission of a two-dimensional Fourier transformed information manifold represented by an N×M structure over M frequency bands during N time periods of duration Tµ.

FIG. 19B illustrates another perspective on image domain and transform domain dual grids that may be used for the symplectic OTFS methods described herein.

Figure 20:
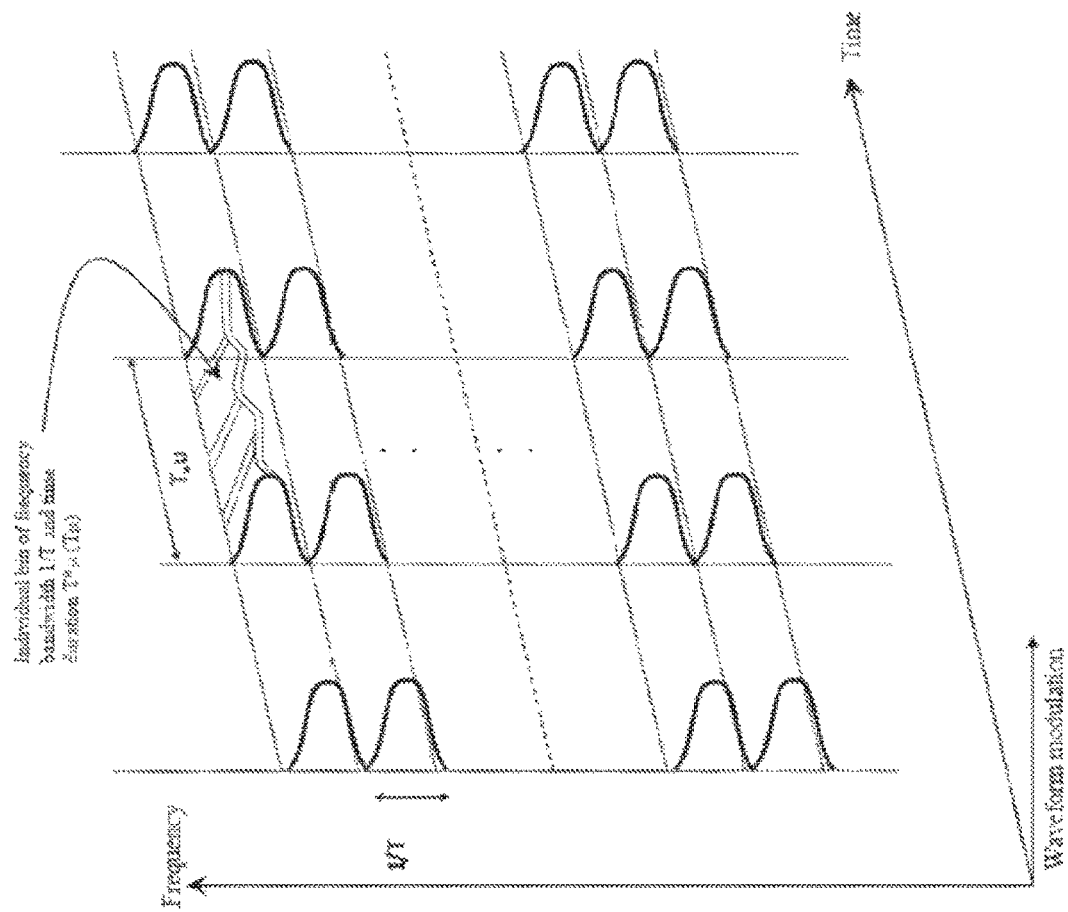

FIG. 20 shows an example of M filtered OTFS frequency bands being simultaneously transmitted according to various smaller time slices Tµ.

Figure 21:
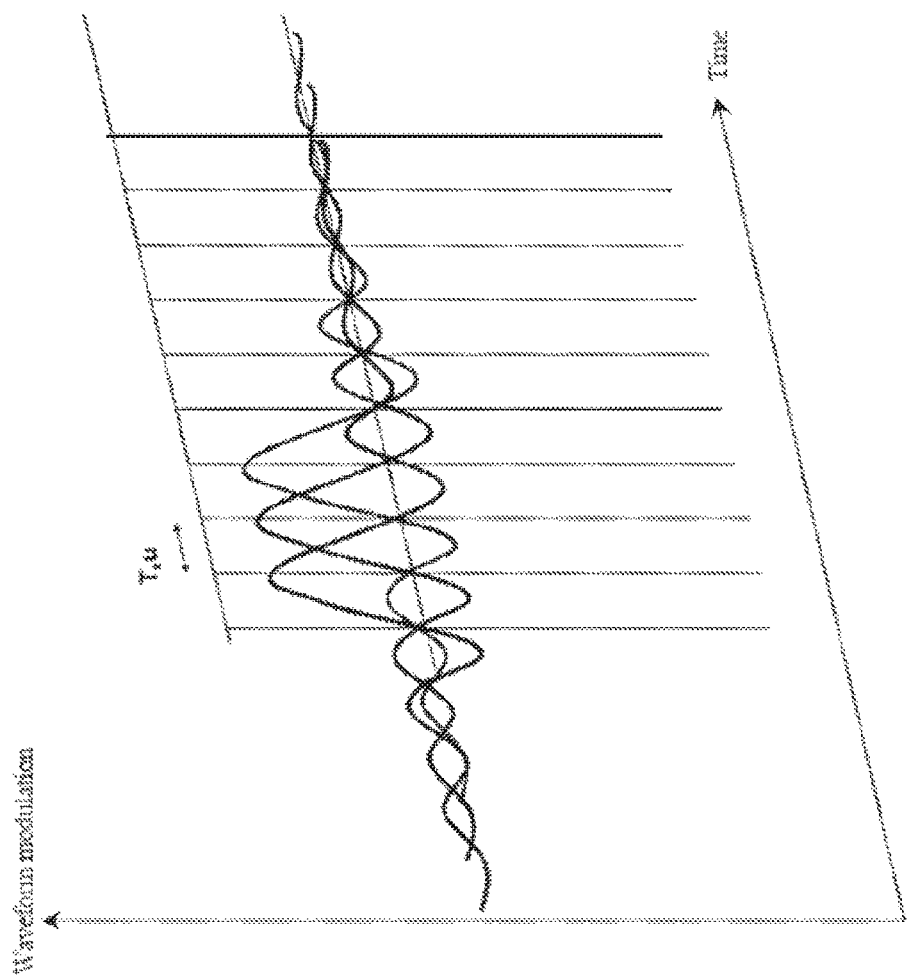

FIG. 21 provides an additional example of OTFS waveforms being transmitted according to various smaller time slices Tµ.

Figure 22:
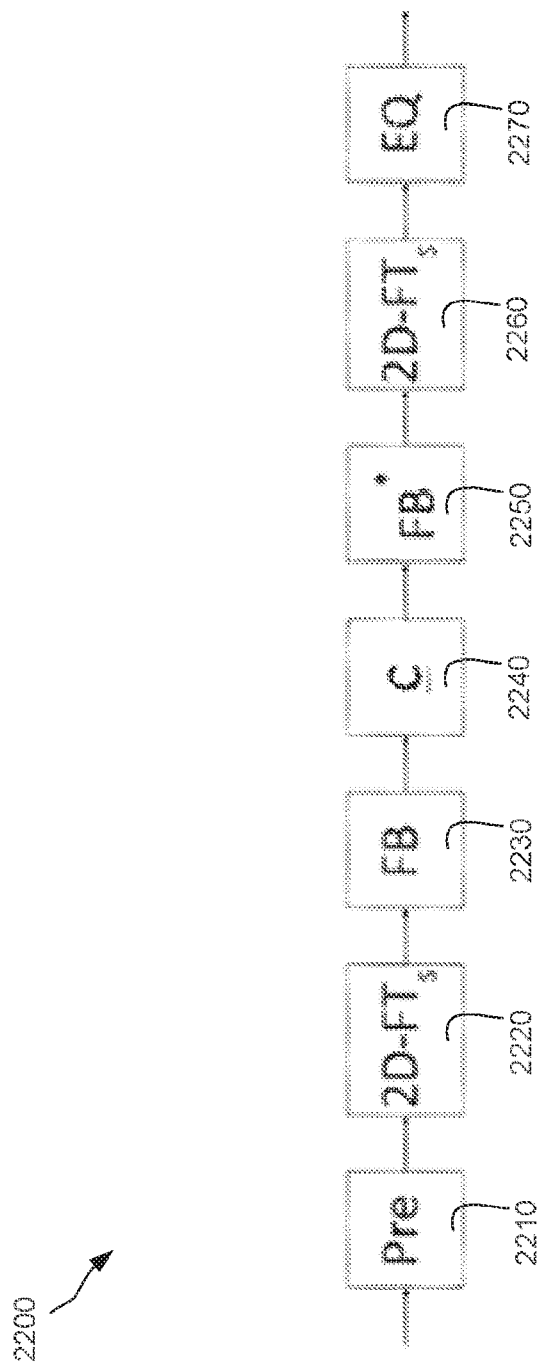

FIG. 22 provides a block diagrammatic representation of an exemplary process of OTFS transmission and reception.

Figure 23:
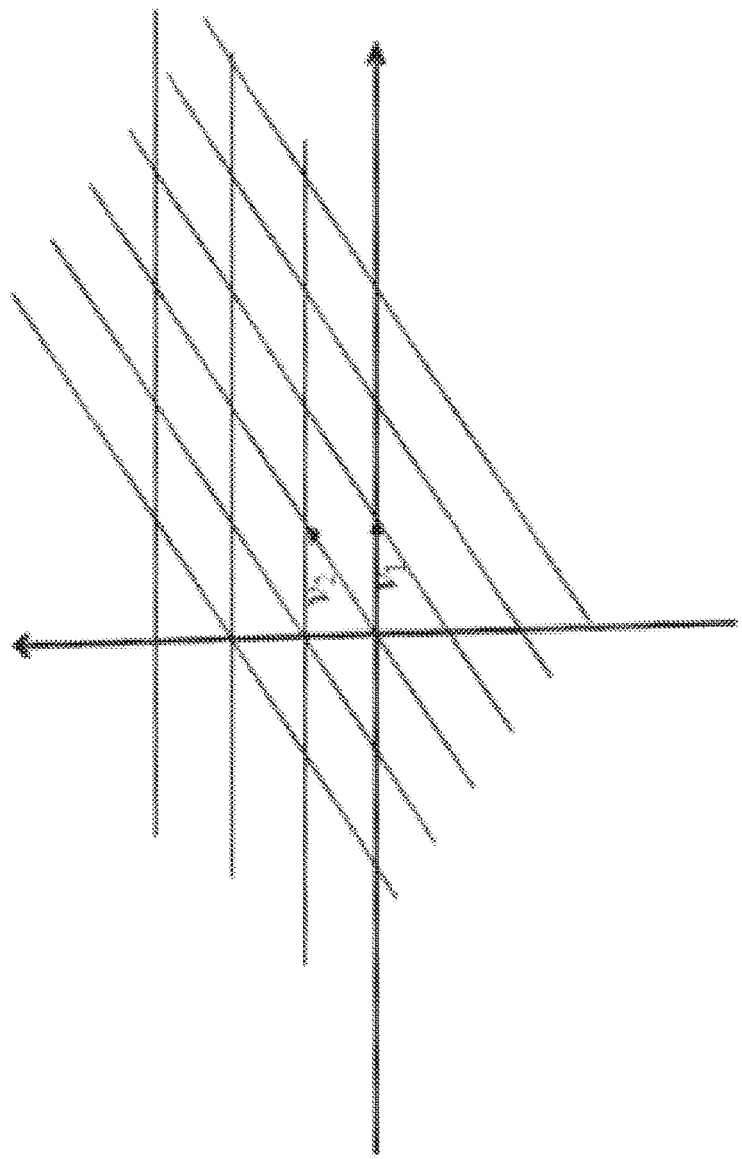

FIG. 23 illustrates represents an exemplary structure of finite OTFS modulation map.

Figures 24A, 24B:
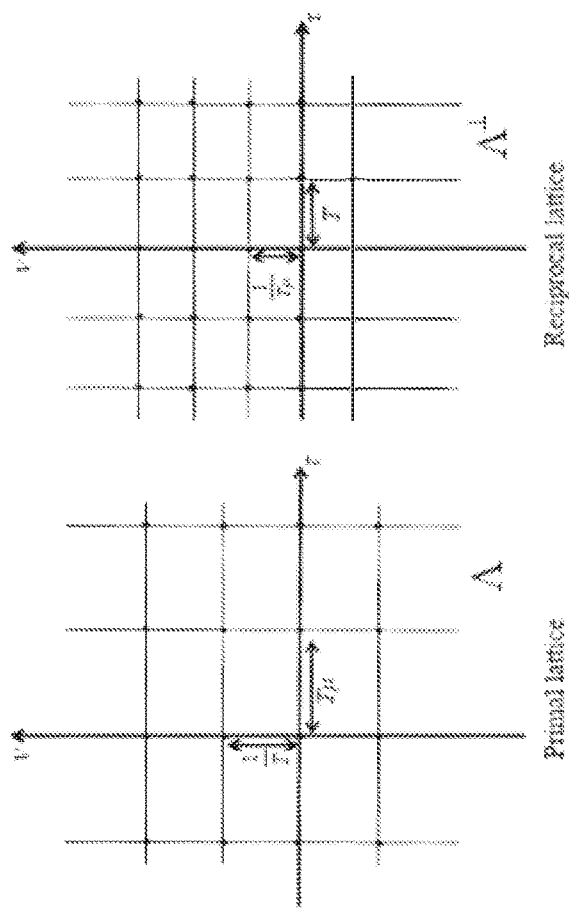

FIGS. 24A and 24B respectively illustrate a standard communication lattice and the reciprocal of the standard communication lattice.

Figure 25:
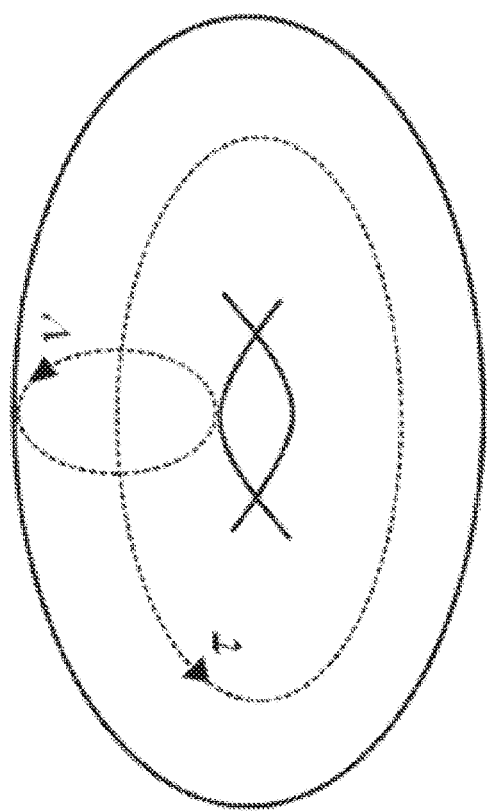

FIG. 25 illustratively represents a standard communication torus.

Figure 26:
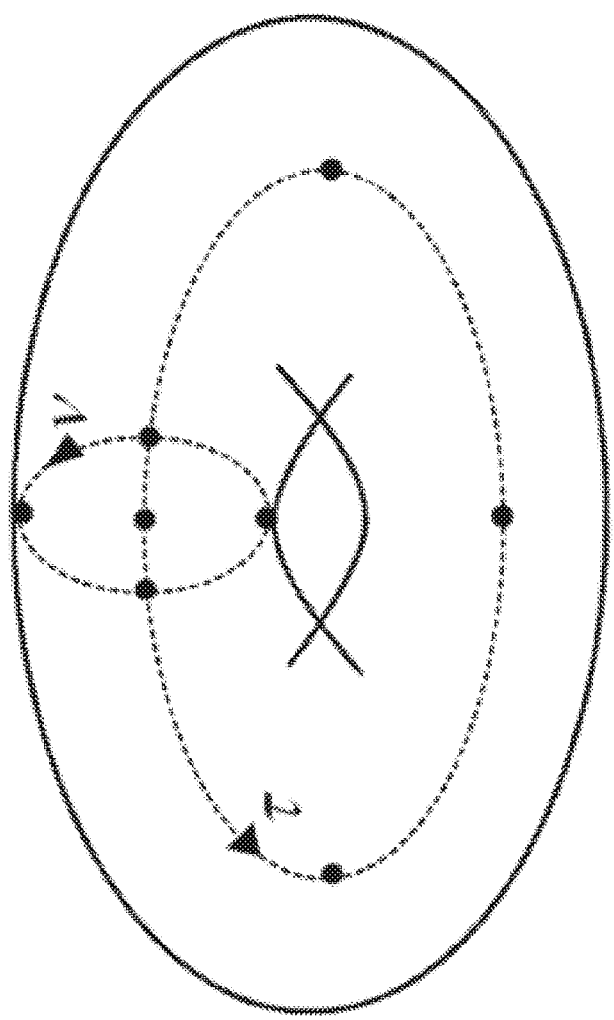

FIG. 26 illustratively represents a standard communication finite torus.

Figure 27:
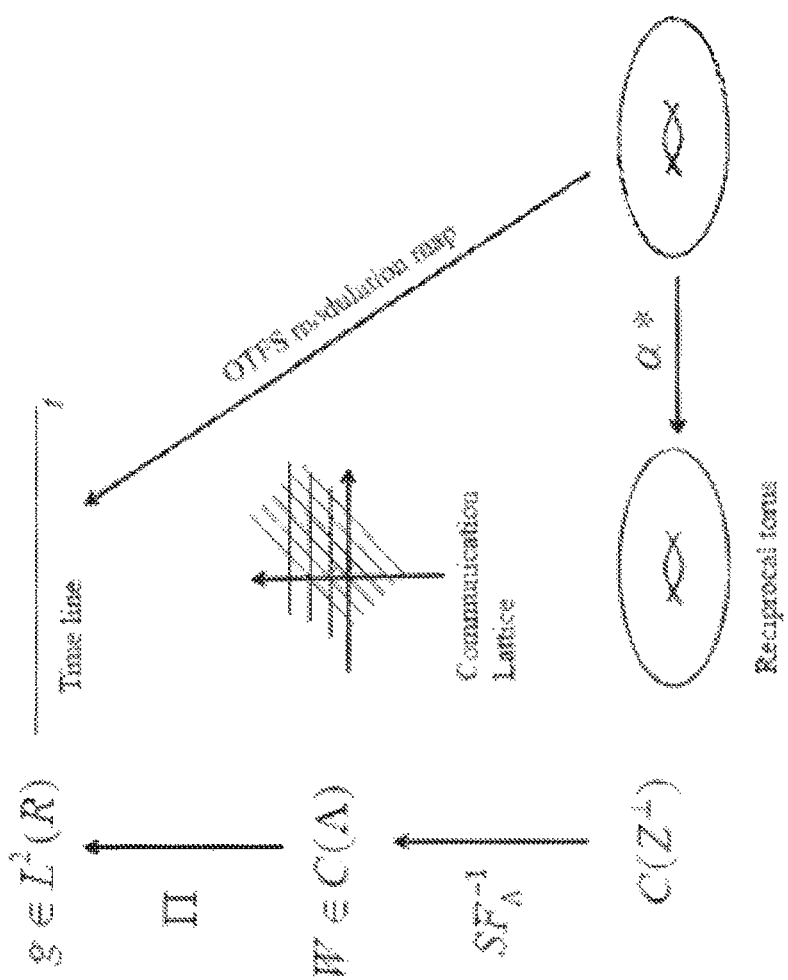

FIG. 27 illustrates an exemplary structure of an OTFS modulation map.

Figure 28:
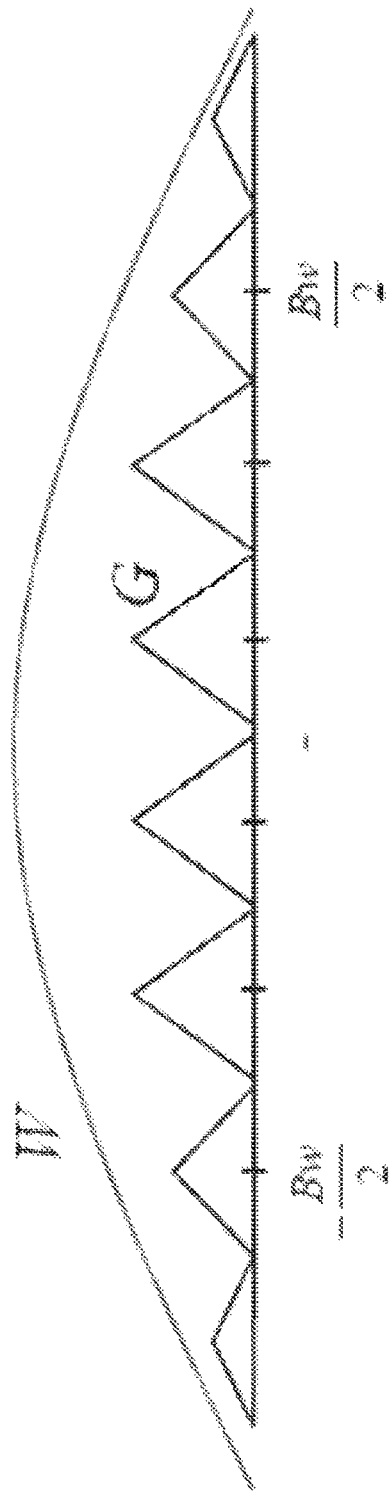

FIG. 28 illustrates a frequency domain interpretation of an OTFS modulation block.

Figure 29A:
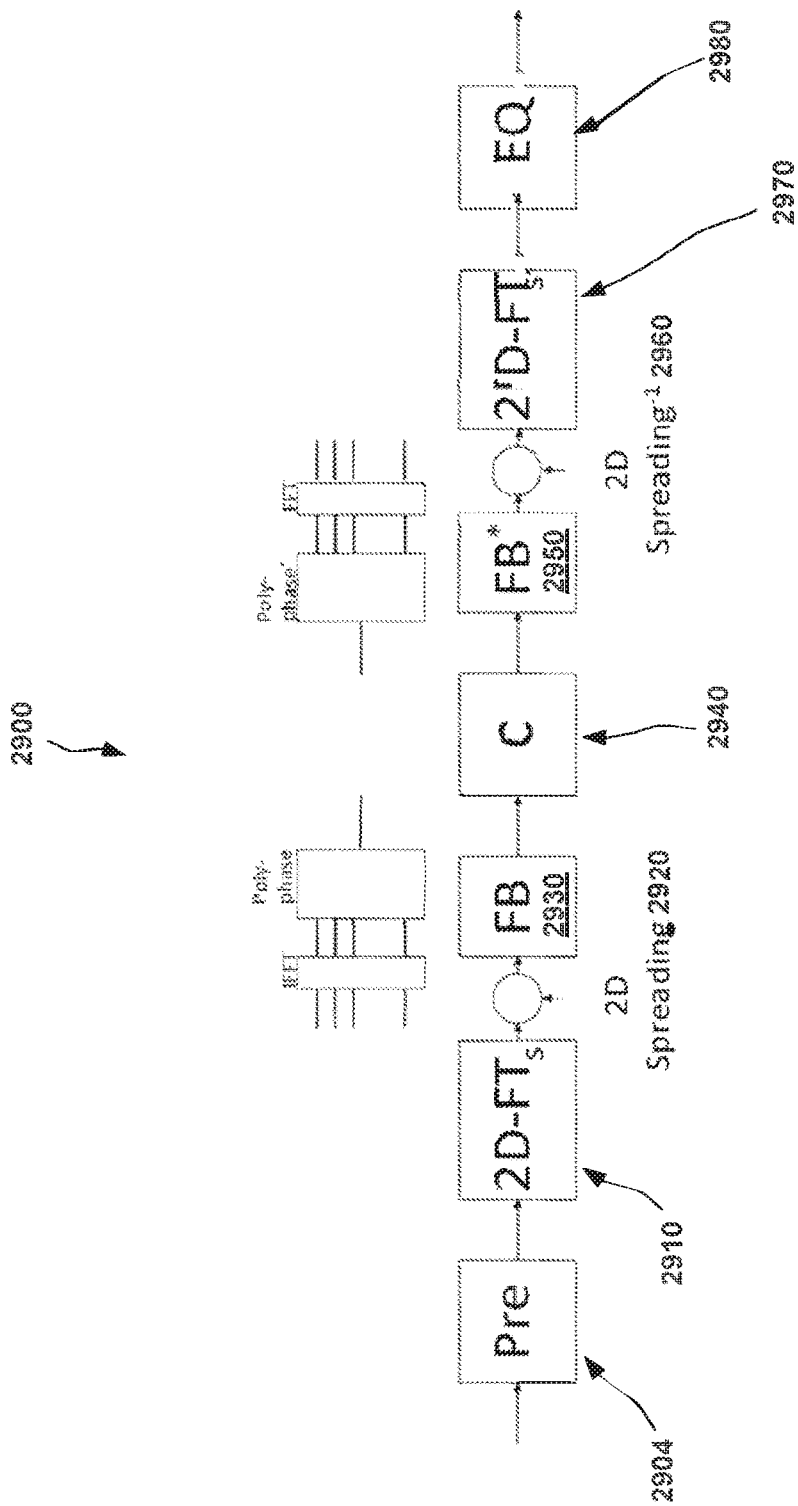
Figure 29B:
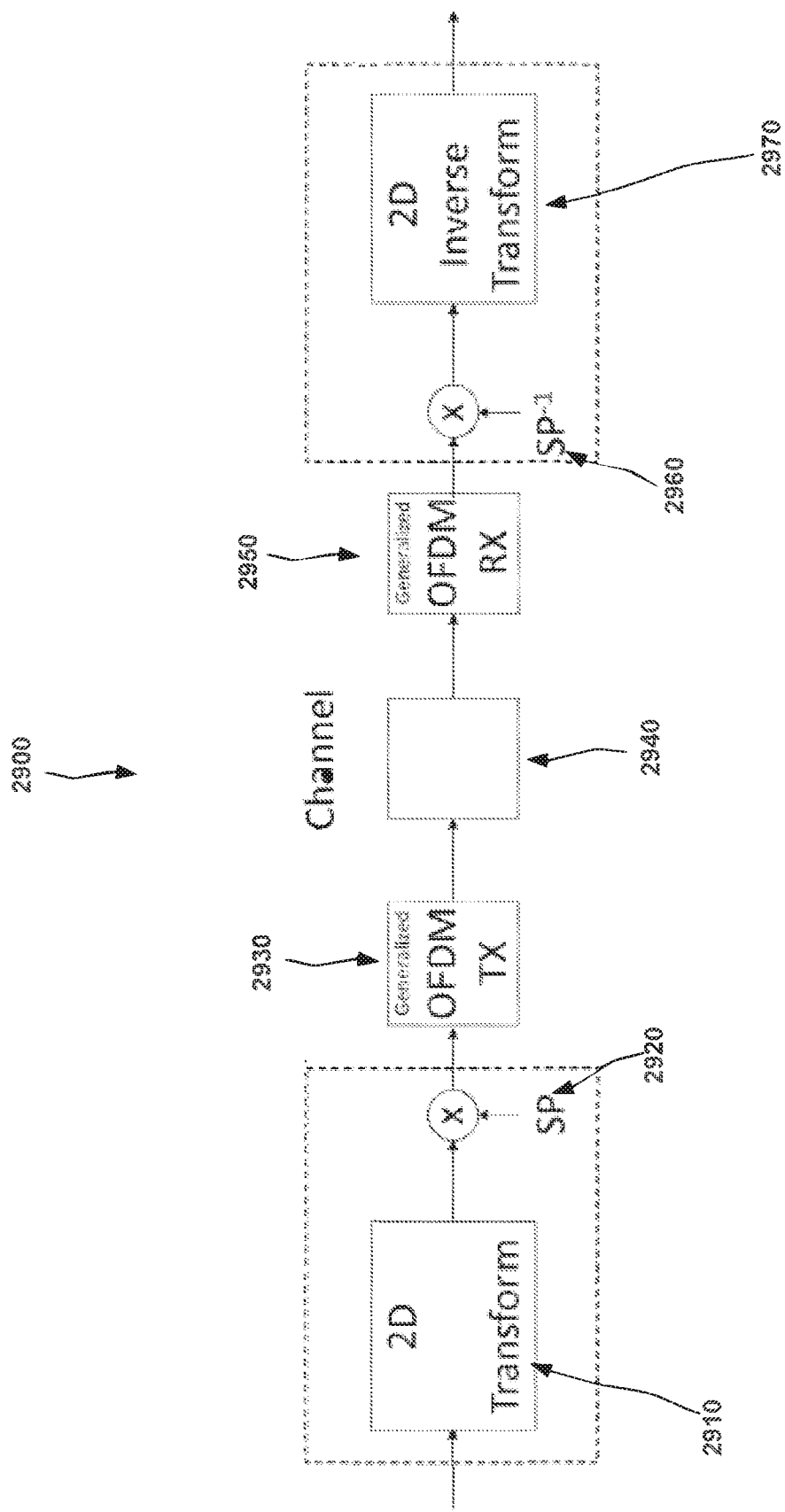

FIGS. 29A and 29B illustrate one manner in which symplectic OTFS methods can operate in a transmitter and receiver system.

Figure 29C:
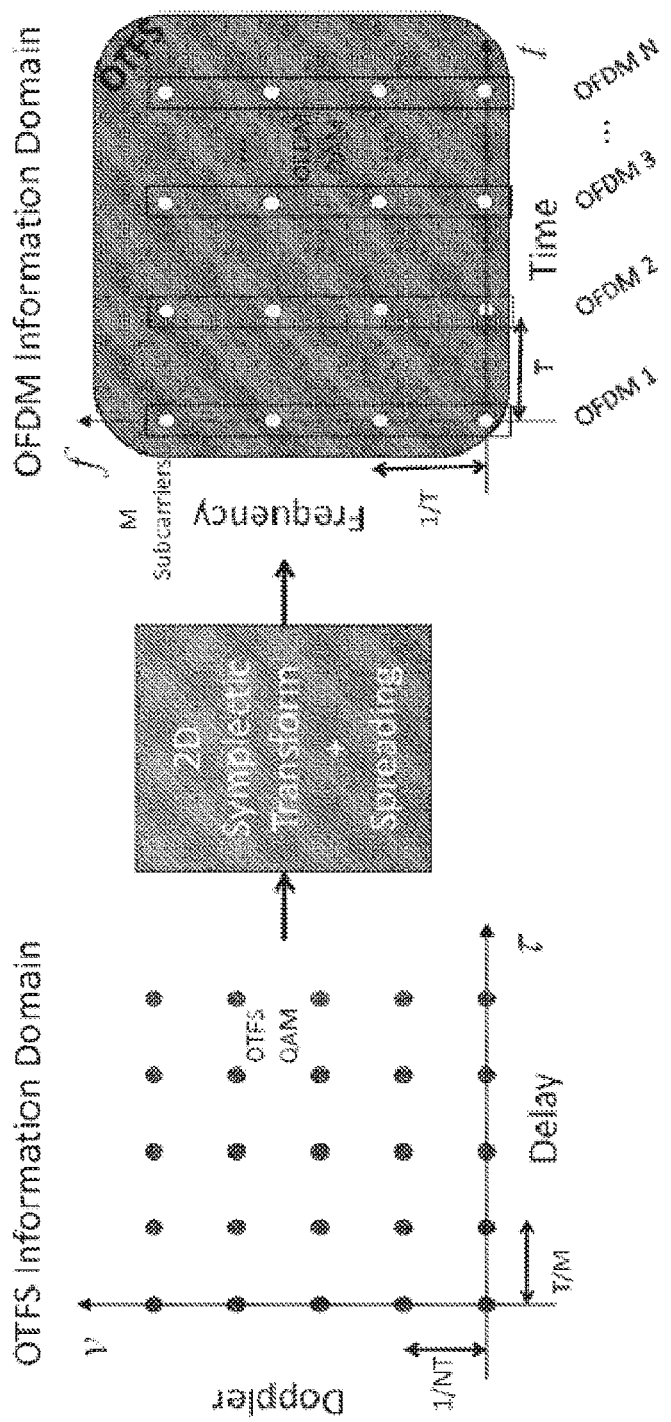

FIG. 29C illustrates characteristics of OTFS pre-processing enabling compatibility with OFDM modulation systems.

Figure 29D:
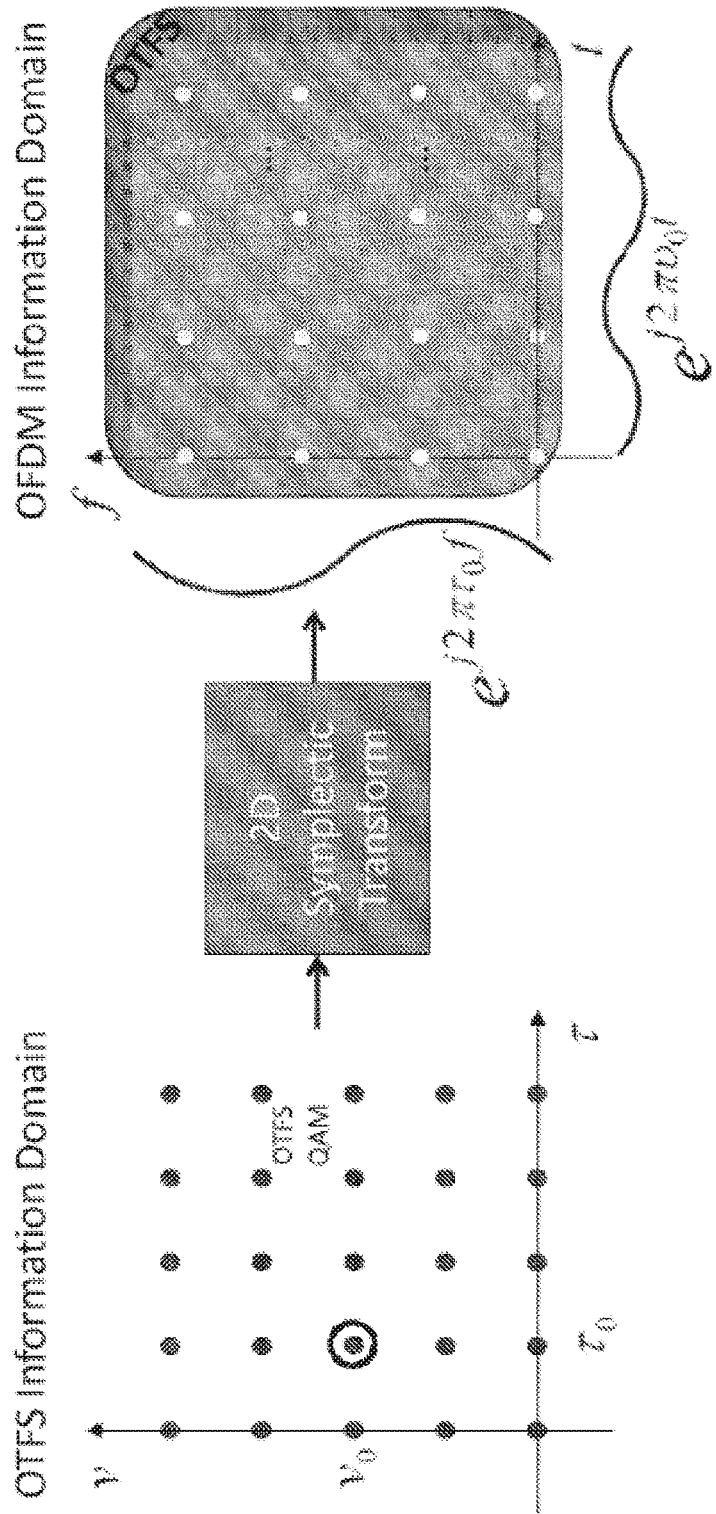

FIG. 29D illustrates further details of an OTFS pre-processing operation compatible with OFDM modulation systems.

Figure 30:
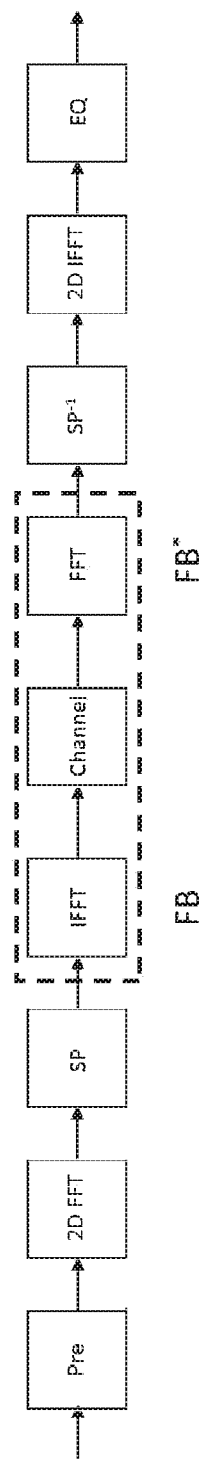

FIG. 30 shows an alternative method of transmitting and receiving data over a channel.

Figure 31:
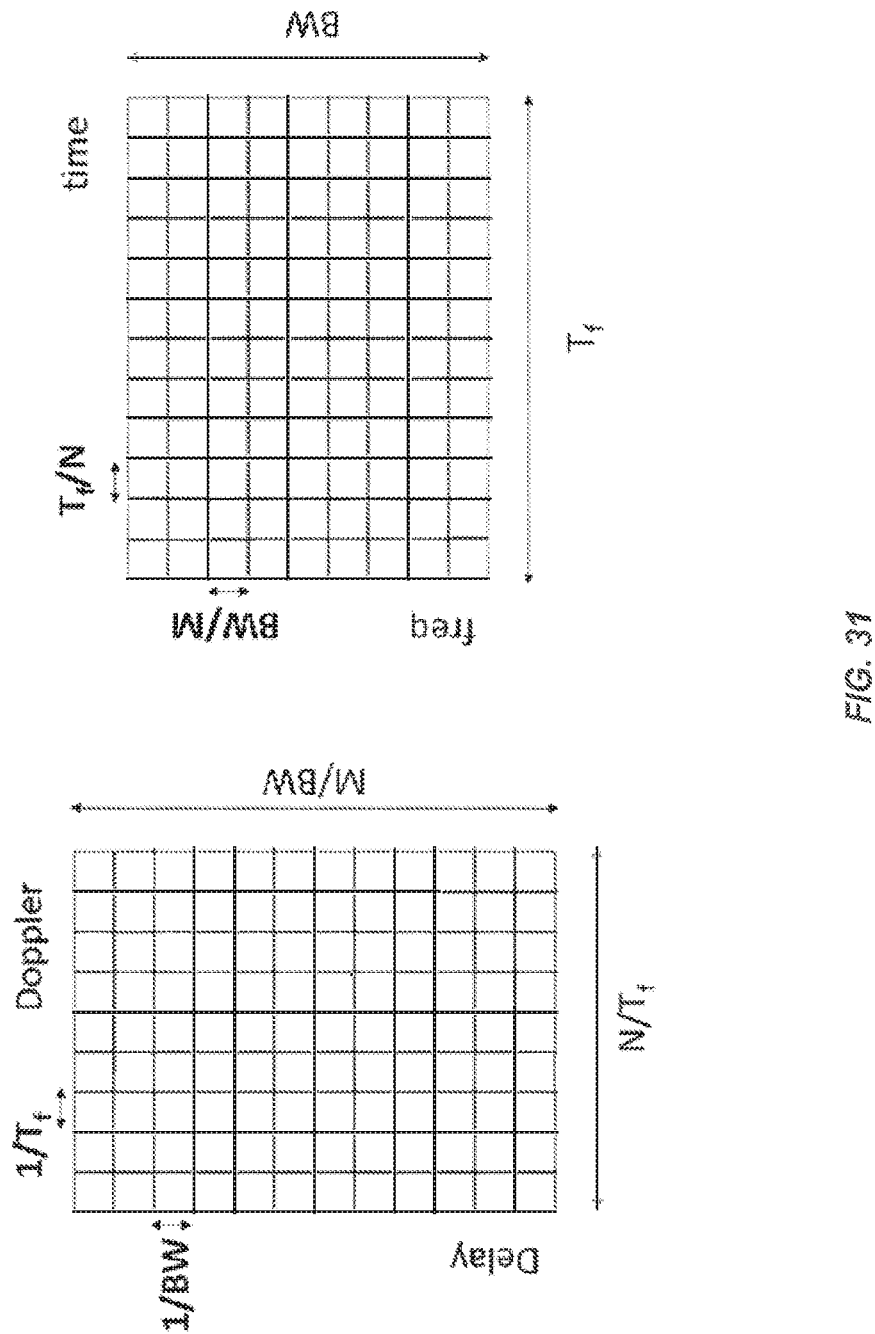

FIG. 31 shows the impact of channel caused Doppler and time delays on the image domain and transform domain dual grids.

Figure 32:
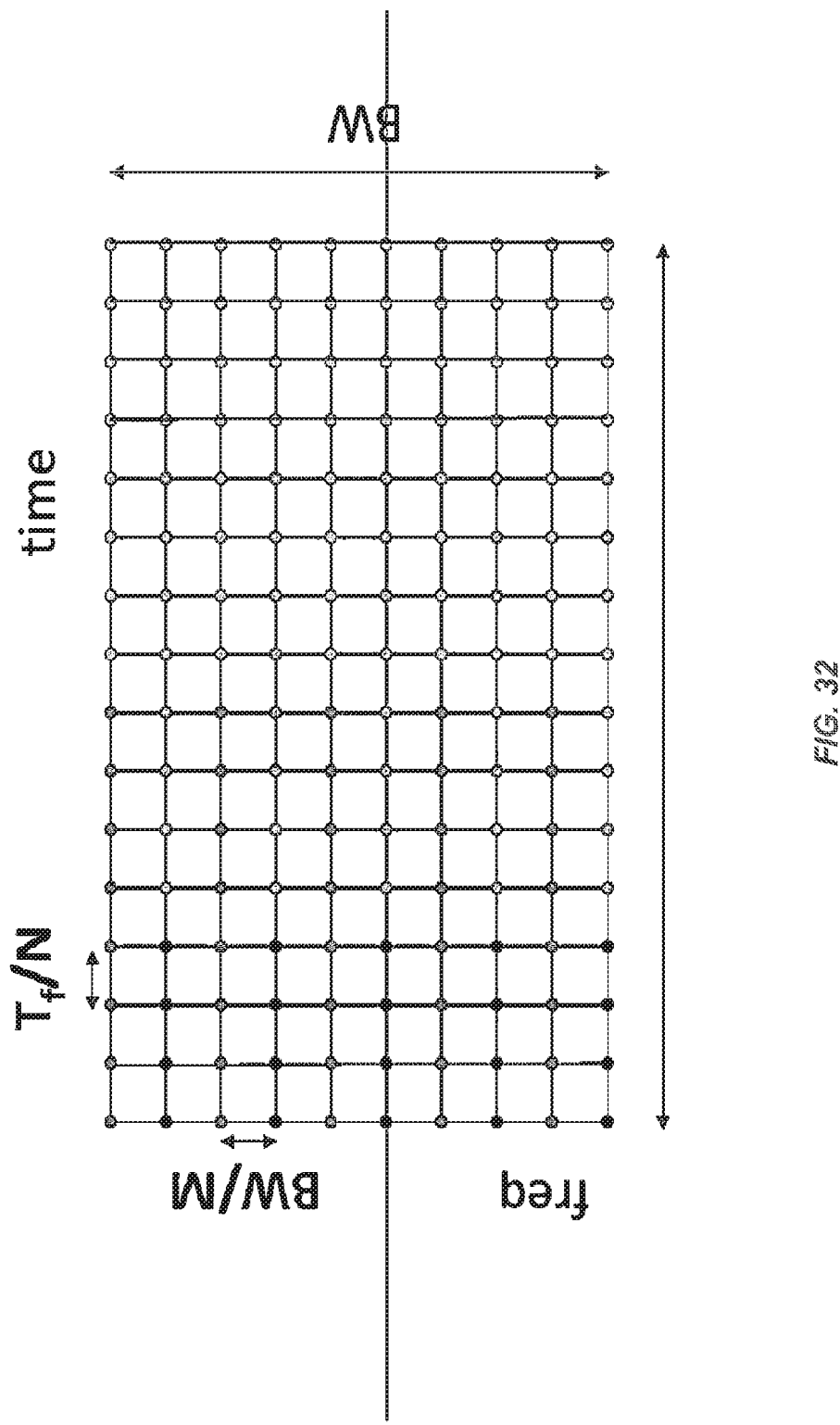

FIG. 32 shows one example of interleaving

Figure 33:
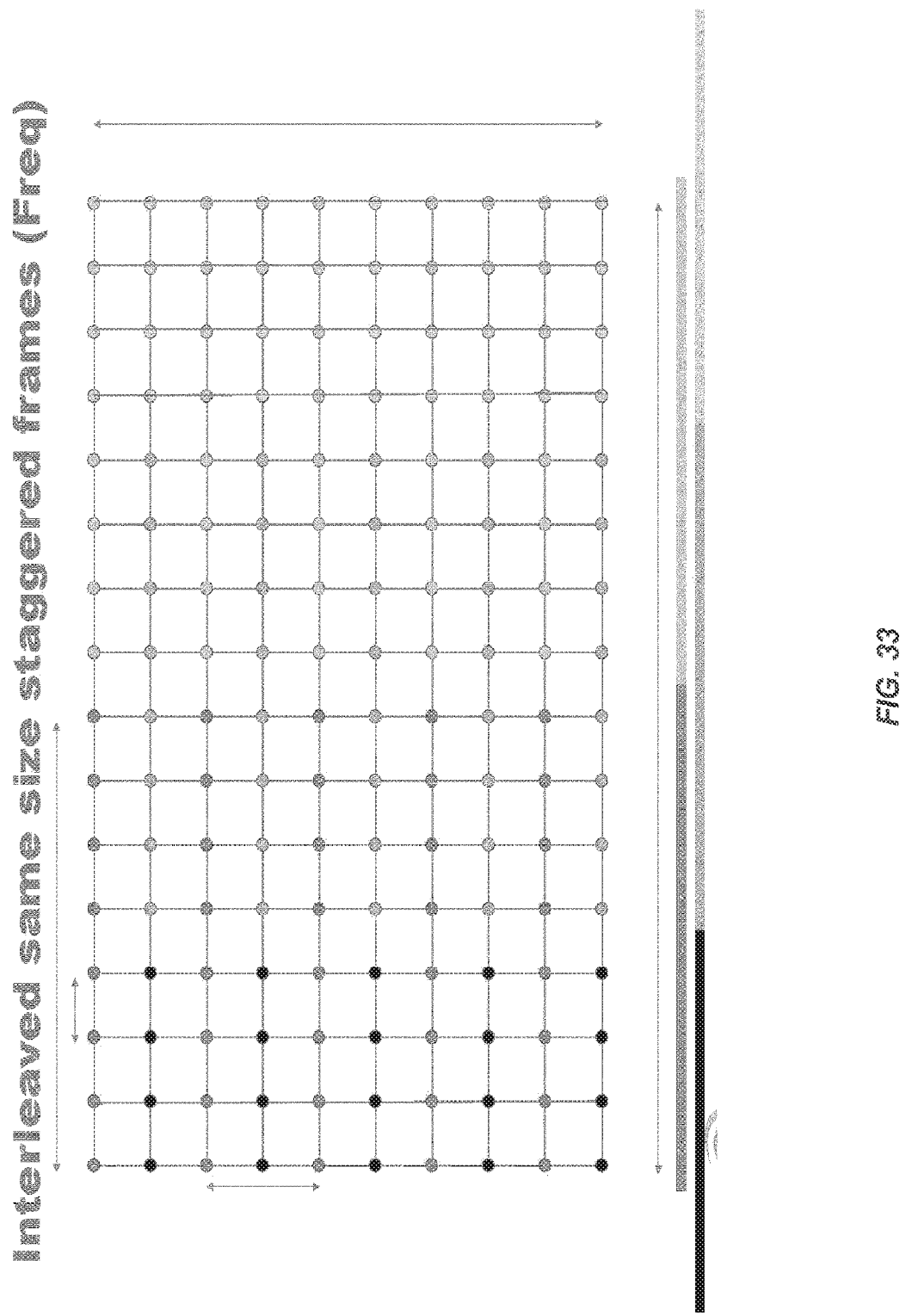

FIG. 33 shows another example of interleaving, in which same size frames are interleaved on a frequency staggered basis.

Figure 34:
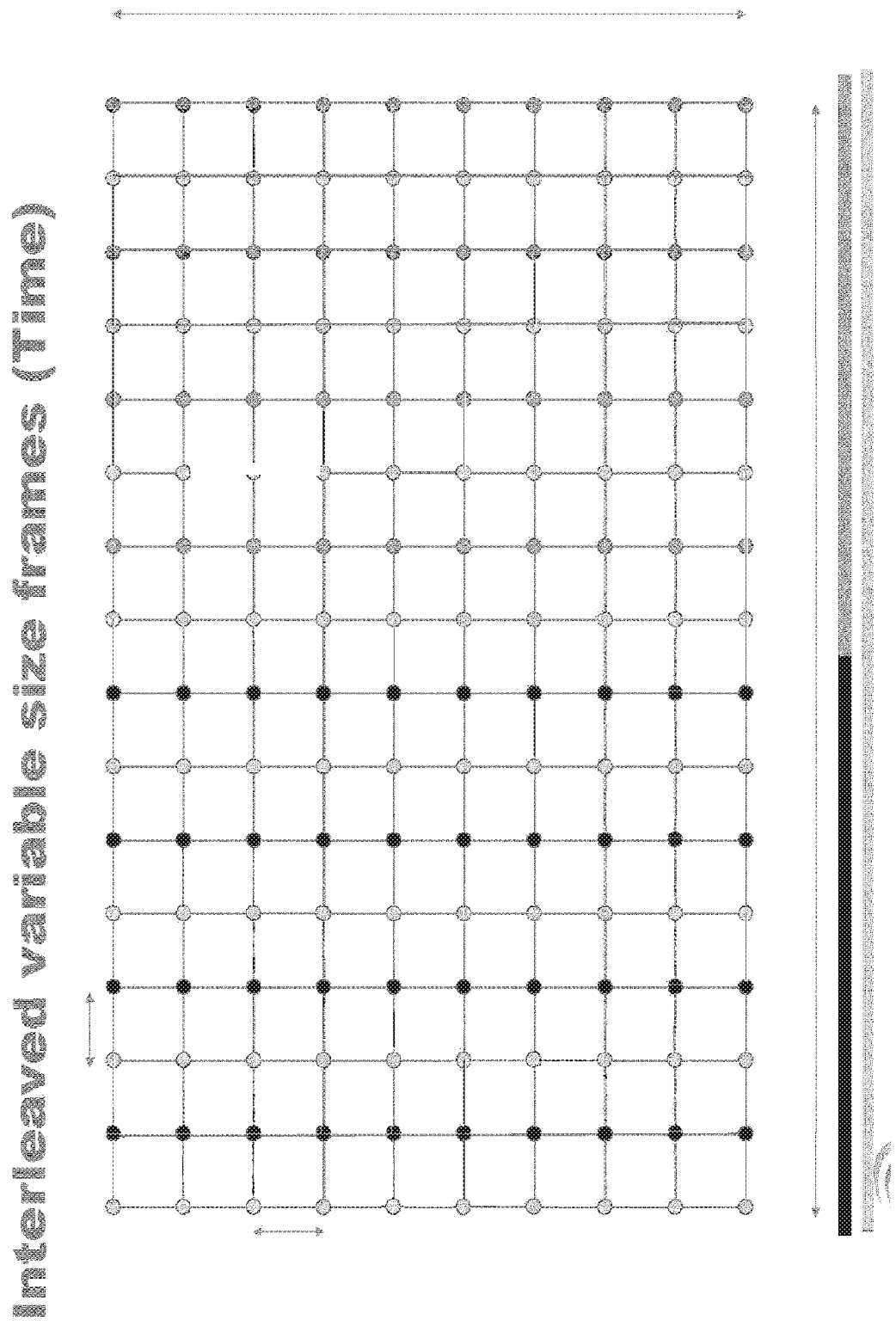

FIG. 34 shows another example of interleaving, in which variable size frames are interleaved on a time basis.

Figure 35:
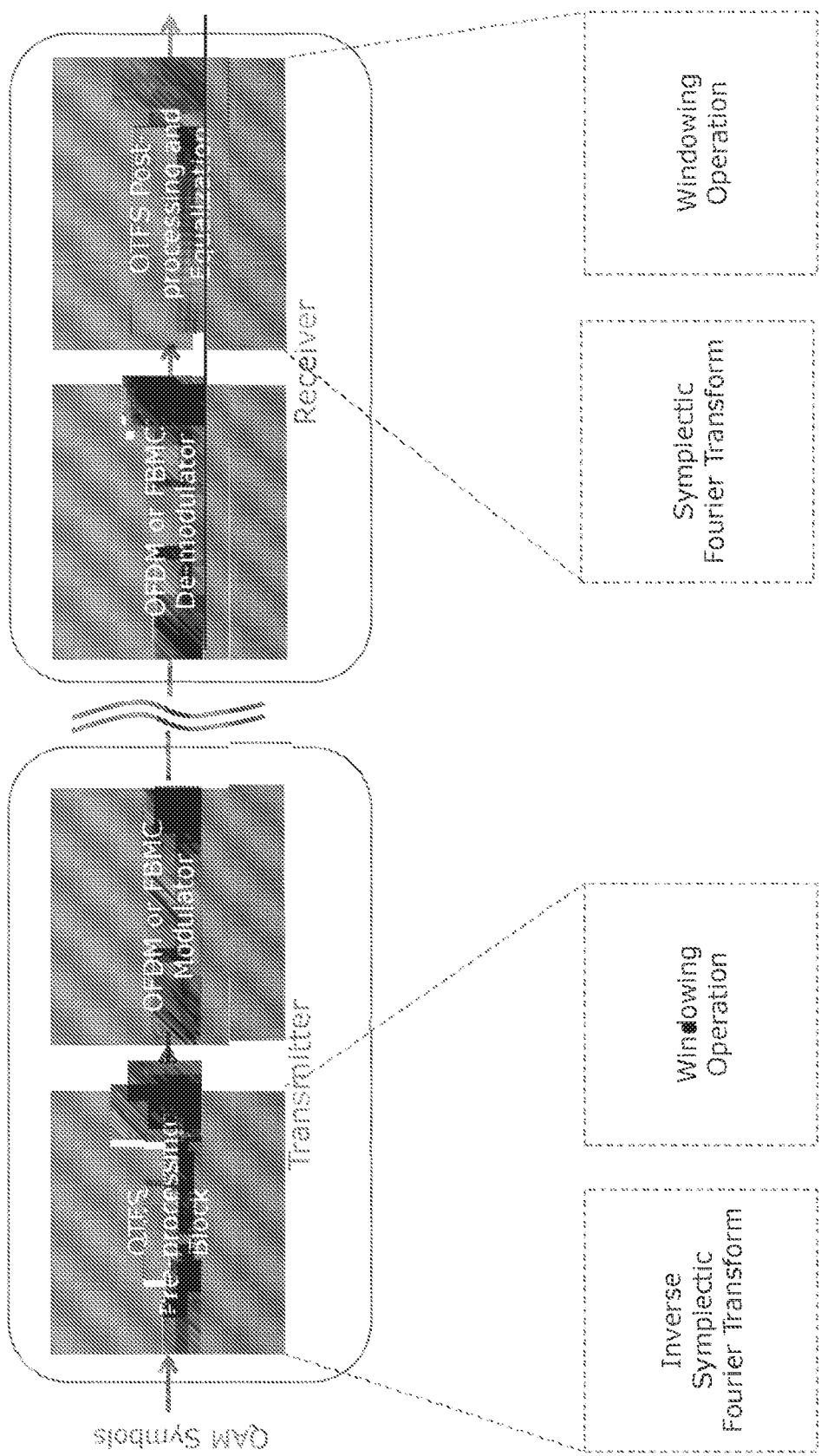

FIG. 35 depicts an OTFS pre-processing step within a transmitter module and an OTFS post-processing step within a receiver module.

Figure 36:
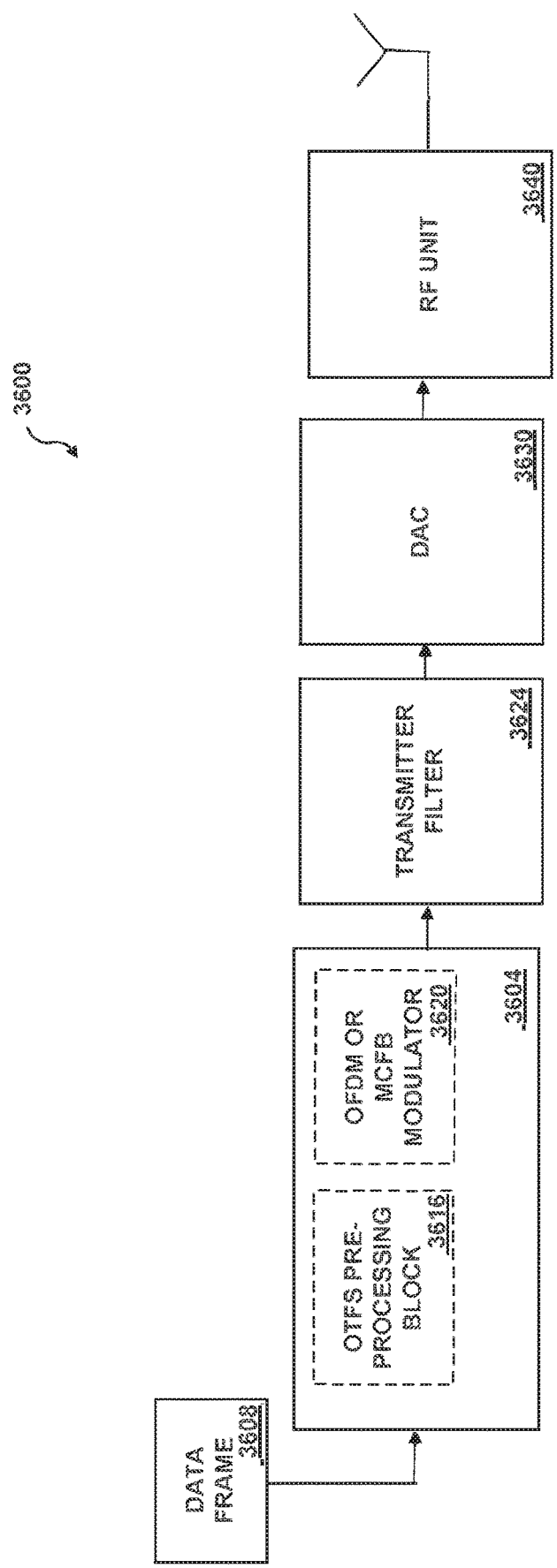

FIG. 36 provides a block diagram of an OTFS transmitter according to an embodiment.

Figure 37:
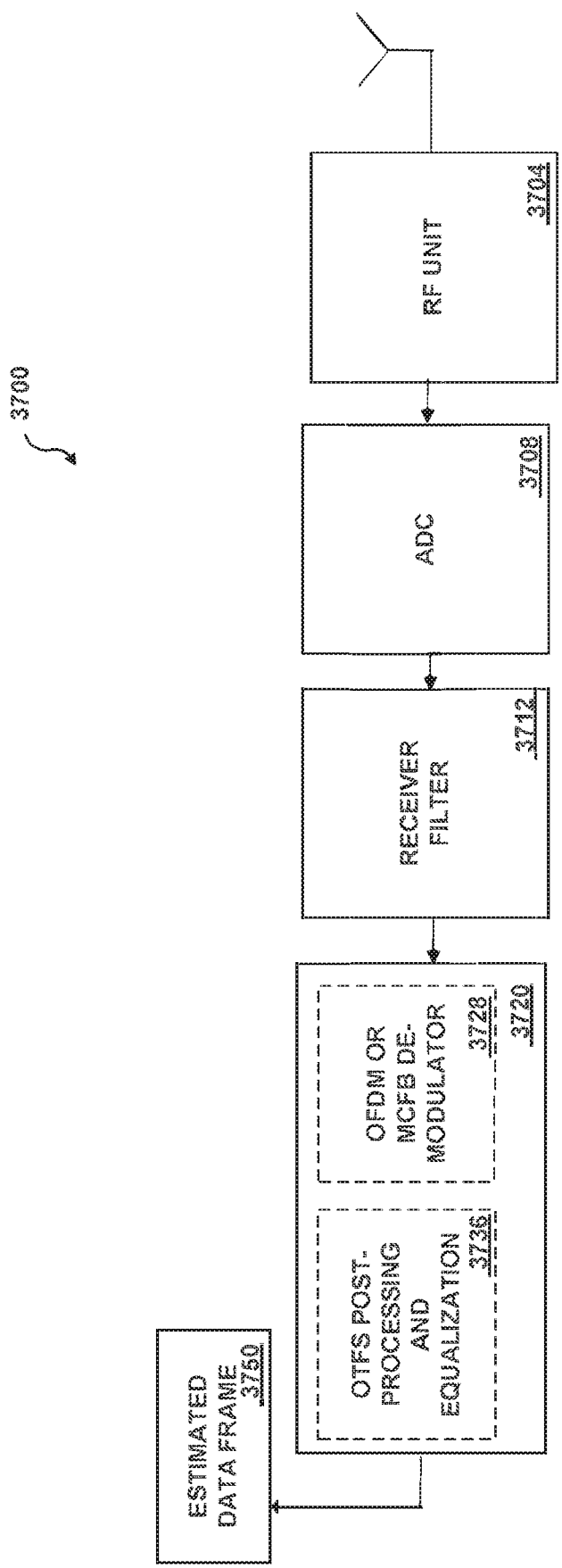

FIG. 37 depicts an OTFS receiver configured to demodulate OTFS-modulated data received over a wireless link.

FIG. 38 shows an example of how an active OTFS relay system may operate between an OTFS transmitter and receiver.

DETAILED DESCRIPTION

As is discussed below, embodiments of orthogonal time frequency space (OTFS) modulation involve transmitting each information symbol by modulating a two-dimensional (2D) basis function on the time-frequency plane. In exemplary embodiments the modulation basis function set is specifically derived to best represent the dynamics of the time varying multipath channel. In this way OTFS transforms the time-varying multipath channel into a time invariant delay-Doppler two dimensional convolution channel. This effectively eliminates the difficulties in tracking time-varying fading in, for example, communications involving high speed vehicles.

OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-Doppler channel representation is very compact, OTFS enables massive MIMO and beamforming with CSI at the transmitter for four, eight, and more antennas in moving vehicle applications. The CSI information needed in OTFS is a fraction of what is needed to track a time varying channel.

As will be appreciated from the discussion below, one characteristic of OTFS is that a single QAM symbol may be spread over multiple time and/or frequency points. This is a key technique to increase processing gain and in building penetration capabilities for IoT deployment and PSTN replacement applications. Spreading in the OTFS domain allows spreading over wider bandwidth and time durations while maintaining a stationary channel that does not need to be tracked over time.

These benefits of OTFS will become apparent once the basic concepts behind OTFS are understood. There is a rich mathematical foundation of OTFS that leads to several variations; for example it can be combined with OFDM or with multicarrier filter banks. Prior to proceeding to a detailed discussion of OTFS, various drawbacks of communication systems predicated on one-dimensional channel models are first described.

Figure 1A:
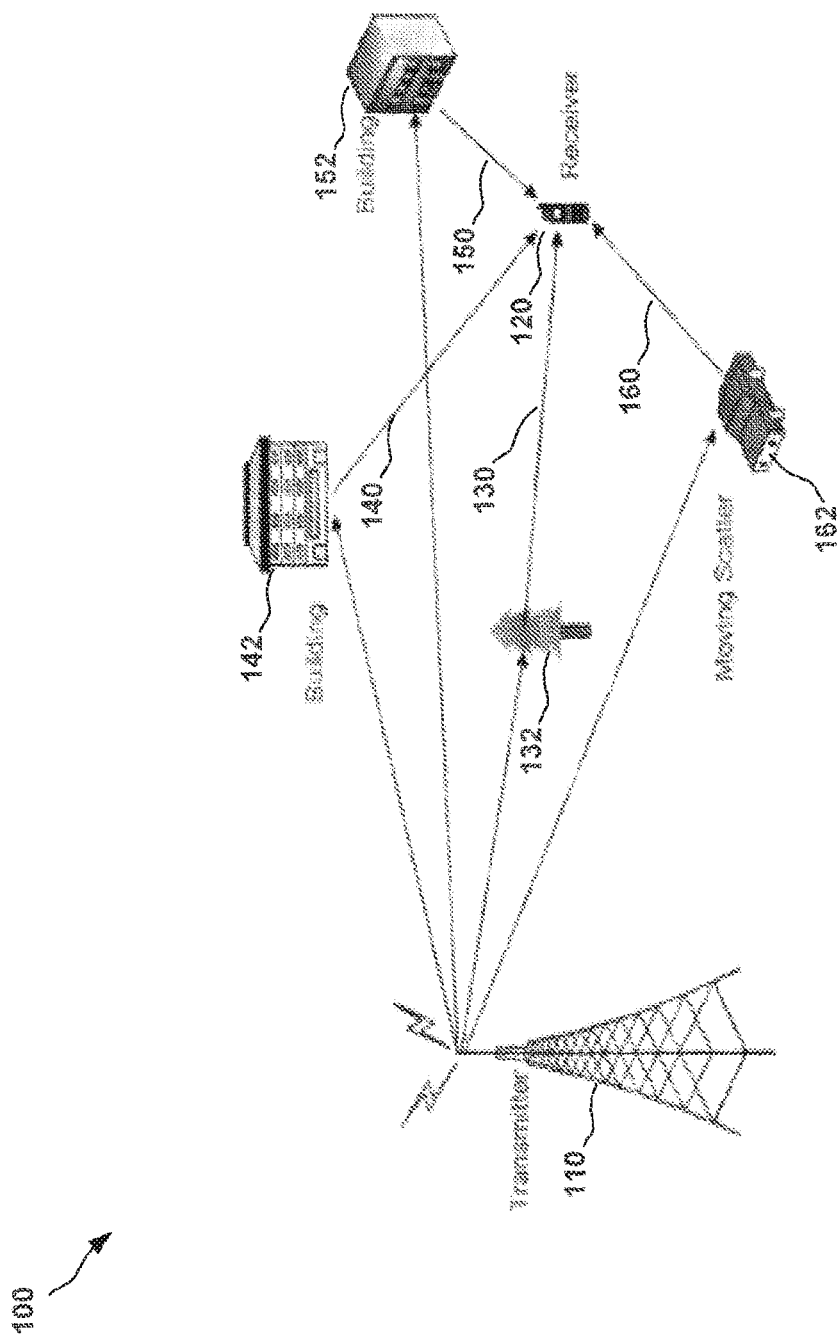
FIG. 1A illustrates an example of a wireless communication system that may exhibit time/frequency selective fading.

FIG. 1A illustrates an example of a wireless communication system 100 that may exhibit time/frequency selective fading. The system 100 includes a transmitter 110 (e.g., a cell phone tower) and a receiver 120 (e.g., a cell phone). The scenario illustrated in FIG. 1 includes multiple pathways (multi-path) that the signal transmitted from the transmitter 100 travels through before arriving at the receiver 100. A first pathway 130 reflects through a tree 132, second pathway 140 reflects off of a building 142 and a third pathway 150 reflects off of a second building 152. A fourth pathway 160 reflects off of a moving car 162. Because each of the pathways 130, 140, 150 and 160 travels a different distance, and is attenuated or faded at a different level and at a different frequency, when conventionally configured the receiver 120 may drop a call or at least suffer low throughput due to destructive interference of the multi-path signals.

Figure 1B:
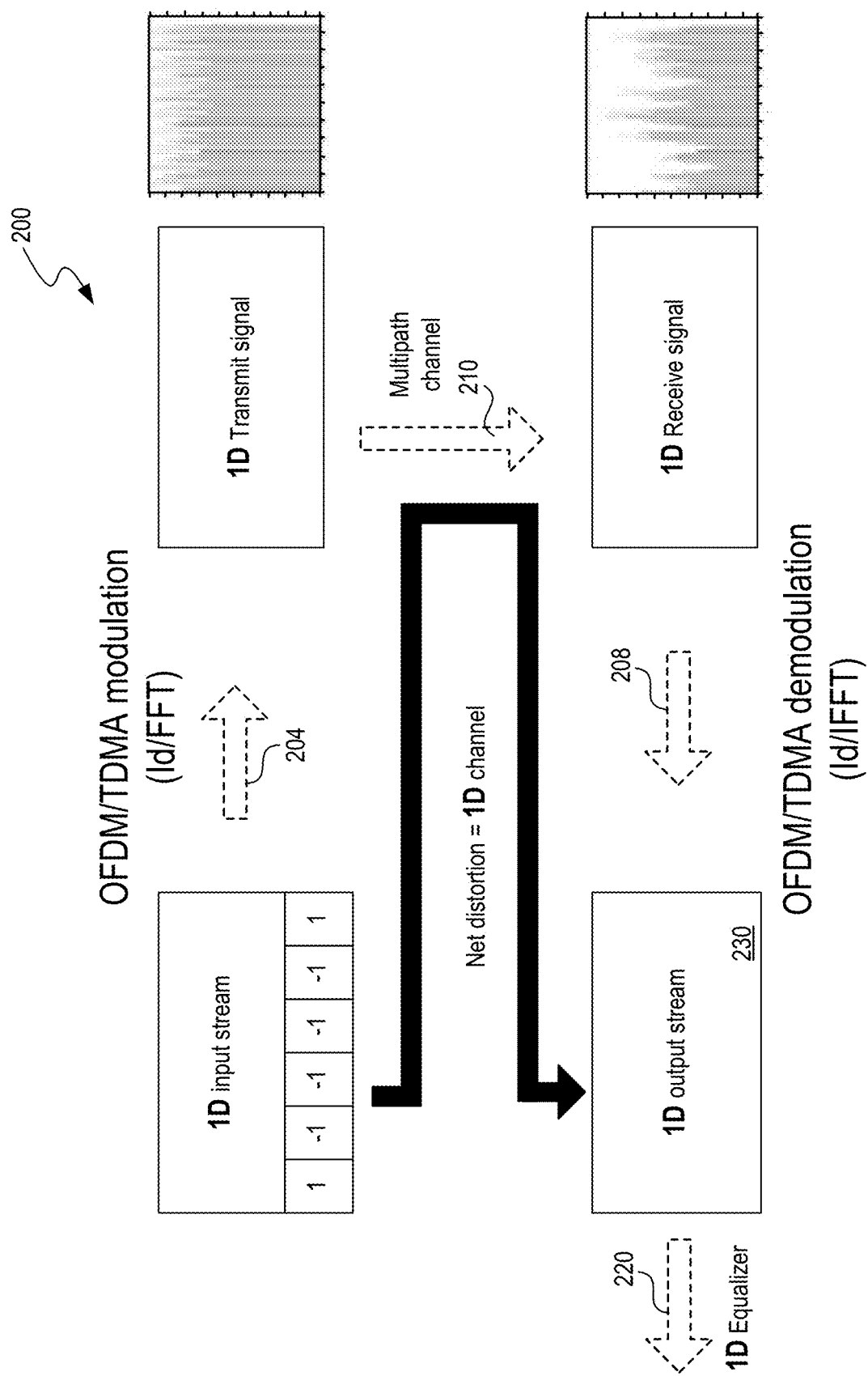
FIG. 1B provides a high-level representation of a conventional transceiver which could be utilized in the wireless communication system of FIG. 1A.

Turning now to FIG. 1B, a high-level representation is provided of a conventional transceiver 200 which could be utilized in the wireless communication system 100 of FIG. 1A. The transceiver 200 could, for example, operate in accordance with established protocols for time-division multiple access (TDMA), code-division multiple access (CDMA) or orthogonal frequency-division multiple access (OFDM) systems. In conventional wireless communication systems such as TDMA, CDMA, and OFDM) systems, the multipath communication channel 210 between a transmitter 204 and a receiver 208 is represented by a one-dimensional model. In these systems channel distortion is characterized using a one-dimensional representation of the impulse response of the communication channel. The transceiver 200 may include a one-dimensional equalizer 220 configured to at least partially remove this estimated channel distortion from the one-dimensional output data stream 230 produced by the receiver 208.

Unfortunately, use of a one-dimensional channel model presents a number of fundamental problems. First, the one-dimensional channel models employed in existing communication systems are non-stationary; that is, the symbol-distorting influence of the communication channel changes from symbol to symbol. In addition, when a channel is modeled in only one dimension it is likely and possible that certain received symbols will be significantly lower in energy than others due to "channel fading". Finally, one-dimensional channel state information (CSI) appears random and much of it is estimated by interpolating between channel measurements taken at specific points, thus rendering the information inherently inaccurate. These problems are only exacerbated in multi-antenna (MIMO) communication systems. As is discussed below, embodiments of the OTFS method described herein can be used to substantially overcome the fundamental problems arising from use of a one-dimensional channel model.

The multipath fading channel is commonly modeled one-dimensionally in the baseband as a convolution channel with a time varying impulse response $$r(t)=\int ℏ(\tau,t)s(t-\tau)dT \qquad (1)$$

where s(t) and r(t) represent the complex baseband channel input and output respectively and where $ℏ(\tau,t)$ is the complex baseband time varying channel response.

This representation, while general, does not give us insight into the behavior and variations of the time varying impulse response. A more useful and insightful model, which is also commonly used for Doppler multipath doubly fading channels is $$r(t)=\iint h(\tau,\nu)e^{j2\pi\nu(t-\tau)}s(t-\tau)d\nu d\tau \qquad (2)$$

In this representation, the received signal is a superposition of reflected copies of the transmitted signal, where each copy is delayed by the path delay $\tau$, frequency shifted by the Doppler shift $\nu$ and weighted by the time-independent delay-Doppler impulse response $h(\tau,\nu)$ for that $\tau$ and $\nu$. In addition to the intuitive nature of this representation, Eq. (2) maintains the generality of Eq. (1). In other words it can represent complex Doppler trajectories, like accelerating vehicles, reflectors etc. This can be seen if we express the time varying impulse response as a Fourier expansion with respect to the time variable t $$ℏ(\tau,t)=\int h(\tau,\nu)e^{j2\pi\nu t}dt \qquad (3)$$

Figure 2A:
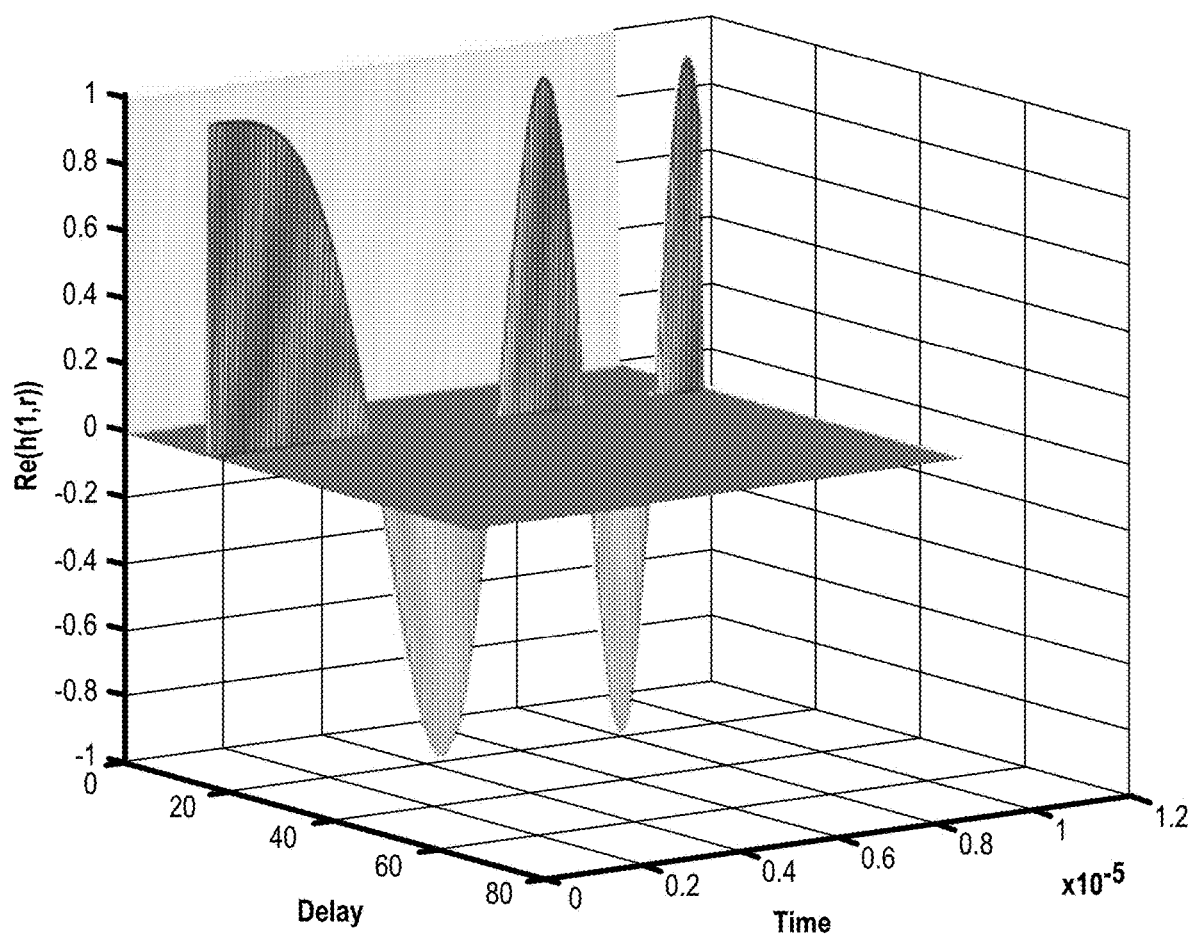
FIG. 2A shows the time-varying impulse response for an accelerating reflector in a channel represented by a one-dimensional channel model in a (τ,t) coordinate system.
Figure 2B:
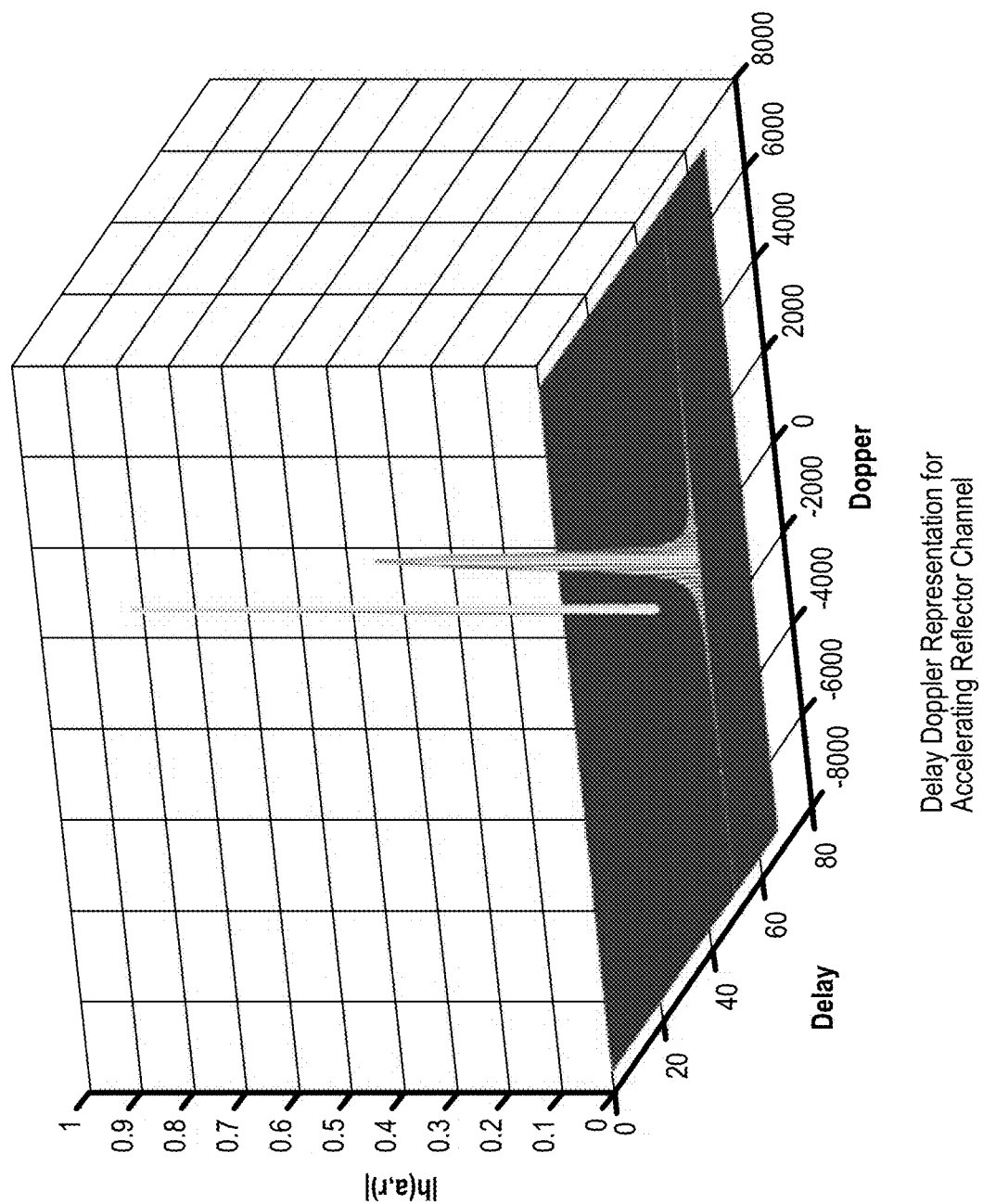
FIG. 2B shows the same channel represented using a time invariant impulse response in a delay-Doppler (τ,ν) coordinate system.

Substituting (3) in (1) we obtain Eq. (2) after some manipulation. As an example, FIG. 2A shows the time-varying impulse response for an accelerating reflector in the $(\tau,t)$ coordinate system, while FIG. 2B shows the same channel represented as a time invariant impulse response in the $(\tau,\nu)$ coordinate system.

An important feature revealed by these two figures is how compact the $(\tau,\nu)$ representation is compared to the $(\tau,t)$ representation. This has important implications for channel estimation, equalization and tracking as will be discussed later.

Notice that while $h(\tau,\nu)$ is, in fact, time-independent, the operation on s(t) is still time varying, as can be seen by the effect of the explicit complex exponential function of time in Eq. (2). In implementation the disclosed modulation scheme contemplates an appropriate choice of orthogonal basis functions that render the effects of this channel to become truly time-independent in the domain defined by those basis functions. The proposed scheme has the following high level outline.

First, let us consider a set of orthonormal basis functions $\phi_{\tau,\nu}(t)$ indexed by $\tau,\nu$ which are orthogonal to translation and modulation, i.e., $$\phi_{\tau,\nu}(t-\tau_0)=\phi_{\tau+\tau_0,\nu}(t)$$

$$e^{j2\pi\nu_0 t}\phi_{\tau,\nu}(t)=\phi_{\tau,\nu-\nu_0}(t) \quad (4)$$

and let us consider the transmitted signal as a superposition of these basis functions $$s(t)=\iint x(\tau,\nu)\phi_{\tau,\nu}(t)d\tau d\nu \quad (5)$$

where the weights $x(\tau,\nu)$ represent the information bearing signal to be transmitted. After the transmitted signal of (5) goes through the time varying channel of Eq. (2) we obtain a superposition of delayed and modulated versions of the basis functions, which due to (4) results in $$r(t) = \iint h(\tau, \nu)e^{j2\pi\nu(t-\tau)}s(t-\tau)d\nu d\tau \quad (6)$$

$$= \iint \phi_{\tau,\nu}(t)\{h(\tau, \nu) * x(\tau, \nu)\}d\tau d\nu$$

where * denotes two dimensional convolution. Eq. (6) can be thought of as a generalization of the convolution relationship for linear time invariant systems, using one dimensional exponentials as basis functions. Notice that the term in brackets can be recovered at the receiver by matched filtering against each basis function $\phi_{\tau,\nu}(t)$. In this way a two dimensional channel relationship is established in the $(\tau,\nu)$ domain $$y(\tau,\nu)=h(\tau,\nu)*x(\tau,\nu) \quad (7)$$

where $y(\tau,\nu)$ is the receiver two dimensional matched filter output. Notice also, that in this domain the channel is described by a time invariant two-dimensional convolution.

A final different interpretation of the wireless channel will also be useful in what follows. Let us consider s(t) and r(t) as elements of the Hilbert space of square integrable functions $\mathcal{H}$. Then Eq. (2) can be interpreted as a linear operator on $\mathcal{H}$ acting on the input s(t), parametrized by the impulse response h(τ,ν), and producing the output r(t):

$$r = \Pi_h(s): s(t) \in \mathcal{H} \xrightarrow{\Pi_h(\bullet)} r(t) \in \mathcal{H}. \quad (8)$$

Notice that although the operator is linear, it is not time-invariant. If there is no Doppler, i.e., if $h(\nu,\tau)=h(0,\tau)\delta(\nu)$, then Eq. (2) reduces to a time invariant convolution. Also notice that while for time invariant systems the impulse response is parameterized by one dimension, in the time varying case we have a two dimensional impulse response. While in the time invariant case the convolution operator produces a superposition of delays of the input s(t), (hence the parameterization is along the one dimensional delay axis) in the time varying case we have a superposition of delay-and-modulate operations as seen in Eq. (2) (hence the parameterization is along the two dimensional delay and Doppler axes). This is a major difference which makes the time varying representation non-commutative (in contrast to the convolution operation which is commutative), and complicates the treatment of time varying systems.

One important point of Eq. (8) is that the operator $\Pi_h(\bullet)$ can be compactly parametrized by a two dimensional function h(τ,ν), providing an efficient, time-independent description of the channel. Typical channel delay spreads and Doppler spreads are a very small fraction of the symbol duration and subcarrier spacing of multicarrier systems.

The representation of time varying systems defined by equations (2) and (8) may be characterized as a Heisenberg representation. In this regard it may be shown that every linear operator (eq. (8)) can be parameterized by some impulse response as in equation (2).

OTFS Modulation Over the Doppler Multipath Channel

The time variation of the channel introduces significant difficulties in wireless communications related to channel acquisition, tracking, equalization and transmission of channel state information (CSI) to the transmit side for beamforming and MIMO processing. We herein develop a modulation domain based on a set of orthonormal basis functions over which we can transmit the information symbols, and over which the information symbols experience a static, time invariant, two dimensional channel for the duration of the packet or burst transmission. In that modulation domain, the channel coherence time is increased by orders of magnitude and the issues associated with channel fading in the time or frequency domain in SISO or MIMO systems are significantly reduced.

Figure 3:
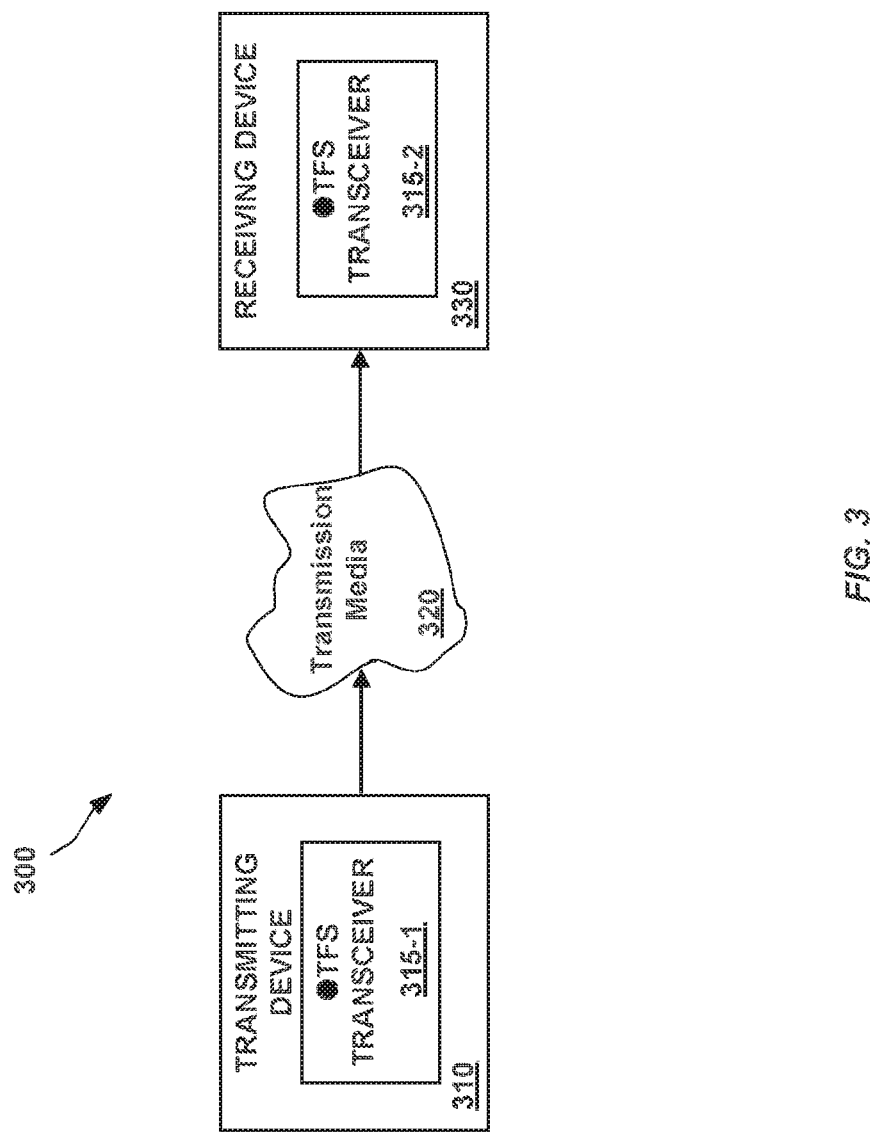
FIG. 3 is a block diagram of components of an exemplary OTFS communication system.

FIG. 3 is a block diagram of components of an exemplary OTFS communication system 300. As shown, the system 300 includes a transmitter 310 and a receiver 330. The transmitting device 310 and the receiving device 330 include first and second OTFS transceivers 315-1 and 315-2, respectively. The OTFS transceivers 315-1 and 315-2 communicate, either unidirectionally or bidirectionally, via communication channel 320 in the manner described herein. Although in the exemplary embodiments described herein the system 300 may comprise a wireless communication system, in other embodiments the communication channel may comprise a wired communication channel such as, for example, a communication channel within a fiber optic or coaxial cable. As was described above, the communication channel 320 may include multiple pathways and be characterized by time/frequency selective fading.

The components of the OTFS transceiver may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Referring now to FIG. 3B, there is provided a pictorial view of the two transformations that constitute an exemplary form of OTFS modulation. It shows at a high level the signal processing steps that are required at a transmitter, such as the transmitter 310, and a receiver, such as the receiver 330. It also includes the parameters that define each step, which will become apparent as we further expose each step. Further, FIG. 3C shows a block diagram of the different processing stages at the transmitter and receiver and establishes the notation that will be used for the various signals.

We initially describe the transform which relates the waveform domain to the time-frequency domain.

The Heisenberg Transform

Our purpose in this section is to construct an appropriate transmit waveform which carries information provided by symbols on a grid in the time-frequency plane. Our intent in developing this modulation scheme is to transform the channel operation to an equivalent operation on the time-frequency domain with two important properties: (i) the channel is orthogonalized on the time-frequency grid; and (ii) the channel time variation is simplified on the time-frequency grid and can be addressed with an additional transform. Fortunately, these goals can be accomplished with a scheme that is very close to well-known multicarrier modulation techniques, as explained next. We will start with a general framework for multicarrier modulation and then give examples of OFDM and multicarrier filter bank implementations.

Let us consider the following components of a time frequency modulation:
- A lattice or grid on the time frequency plane, that is a sampling of the time axis with sampling period T and the frequency axis with sampling period $\Delta f$.

$$\Lambda = \{(nT, m\Delta f), n, m \in \mathbb{Z}\} \quad (9)$$

- A packet burst with total duration NT secs and total bandwidth M$\Delta f$ Hz
- A set of modulation symbols X[n,m], n=0, ..., N-1, m=0, ..., M-1 we wish to transmit over this burst
- A transmit pulse $g_{tr}(t)$ with the property of being orthogonal to translations by T and modulations by $\Delta f$ (generally required if the receiver uses the same pulse as the transmitter)

$$\langle g_{tr}(t), g_{tr}(t - nT)e^{j2\pi m\Delta f(t-nT)} \rangle = \quad (10)$$
$$\int g_{tr}^*(t) g_r(t - nT) e^{j2\pi m\Delta f(t-nT)} dt = \delta(m)\delta(n)$$

Given the above components, the time-frequency modulator is a Heisenberg operator on the lattice $\Lambda$, that is, it maps the two dimensional symbols X[n,m] to a transmitted waveform, via a superposition of delay-and-modulate operations on the pulse waveform $g_{tr}(t)$ $$s(t) = \sum_{m=-M/2}^{M/2-1} \sum_{n=0}^{N-1} X[n, m] g_{tr}(t - nT) e^{j2\pi m\Delta f(t-nT)} \quad (11)$$

More formally $$x = \Pi_X(g_{tr}): g_{tr}(t) \in \mathcal{H} \xrightarrow{\Pi_X(\cdot)} y(t) \in \mathcal{H} \quad (12)$$

where we denote by $\Pi_X(\cdot)$ the "discrete" Heisenberg operator, parameterized by discrete values X[n,m].

Notice the similarity of (12) with the channel equation (8). This is not by coincidence, but rather because we apply a modulation effect that mimics the channel effect, so that the end effect of the cascade of modulation and channel is more tractable at the receiver. It is not uncommon practice; for example, linear modulation (aimed at time invariant channels) is in its simplest form a convolution of the transmit pulse g(t) with a delta train of QAM information symbols sampled at the Baud rate T.

$$s(t) = \sum_{n=0}^{N-1} X[n] g(t - nT) \quad (13)$$

In the present case, aimed at the time varying channel, we convolve-and-modulate the transmit pulse (c.f. the channel Eq. (2)) with a two dimensional delta train which samples the time frequency domain at a certain Baud rate and subcarrier spacing.

The sampling rate in the time-frequency domain is related to the bandwidth and time duration of the pulse $g_{tr}(t)$; namely, its time-frequency localization. In order for the orthogonality condition of (10) to hold for a frequency spacing $\Delta f$, the time spacing must be T≥1/$\Delta f$. The critical sampling case of T=1/$\Delta f$ is generally not practical and refers to limiting cases, for example to OFDM systems with cyclic prefix length equal to zero or to filter banks with $g_{tr}(t)$ equal to the ideal Nyquist pulse.

Some examples illustrate these principles:

Example 1: OFDM Modulation: Let us consider an OFDM system with M subcarriers, symbol length $T_{OFDM}$, cyclic prefix length $T_{CP}$ and subcarrier spacing 1/$T_{OFDM}$. If we substitute in Equation (11) symbol duration T=$T_{OFDM}$+$T_{CP}$, number of symbols N=1, subcarrier spacing $\Delta f$=1/$T_{OFDM}$ and $g_{tr}(t)$ a square window that limits the duration of the subcarriers to the symbol length T $$g_{tr}(t) = \begin{cases} 1/\sqrt{T - T_{CP}}, & -T_{CP} < t < T - T_{CP} \\ 0, & \text{else} \end{cases} \quad (14)$$

then we obtain the OFDM formula $$x(t) = \sum_{m=-M/2}^{M/2-1} X[n, m] g_{tr}(t) e^{j2\pi m\Delta f t} \quad (15)$$

Technically, the pulse of Eq. (14) is not orthonormal but is orthogonal to the receive filter (where the CP samples are discarded).

Example 2: Single Carrier Modulation: Equation (11) reduces to single carrier modulation if we substitute M=1 subcarrier, T equal to the Baud period and $g_{tr}(t)$ equal to a square root raised cosine Nyquist pulse.

Example 3: Multicarrier Filter Banks (MCFB): Equation (11) describes a MCFB if $g_{tr}(t)$ is a square root raised cosine Nyquist pulse with excess bandwidth $\alpha$, T is equal to the Baud period and $\Delta f$=(1+$\alpha$)/T.

Expressing the modulation operation as a Heisenberg transform as in Eq. (12) may be counterintuitive. That is, modulation is usually perceived as a transformation of the modulation symbols X[m,n] to a transmit waveform s(t). The Heisenberg transform instead, uses X[m,n] as weights/parameters of an operator that produces s(t) when applied to the prototype transmit filter response $g_{tr}(t)$—c.f. Eq. (12). While counterintuitive, this formulation is useful in pursuing an abstraction of the modulation-channel-demodulation cascade effects in a two dimensional domain where the channel can be described as time invariant.

Attention is turned next to the processing on the receiver side needed to go back from the waveform domain to the time-frequency domain. Since the received signal has undergone the cascade of two Heisenberg transforms (one by the modulation effect and one by the channel effect), it is natural to inquire what the end-to-end effect of this cascade is. The answer to this question is given by the following result:

Proposition 1: Let two Heisenberg transforms as defined by Eqs. (8), (2) be parametrized by impulse responses $h_1(\tau,\nu)$, $h_2(\tau,\nu)$ and be applied in cascade to a waveform $g(t) \in \mathcal{H}$. Then $$\Pi_{h_2}(\Pi_{h_1}(g(t))) = \Pi_h(g(t)) \qquad (16)$$

where $h(\tau,\nu) = h_2(\tau,\nu) \odot h_1(\tau,\nu)$ is the "twisted" convolution of $h_1(\tau,\nu)$, $h_2(\tau,\nu)$ defined by the following convolve-and-modulate operation $$h(\tau,\nu) = \iint h_2(\tau',\nu') h_1(\tau-\tau',\nu-\nu') e^{j2\pi\nu'(\tau-\tau')} d\tau' d\nu' \qquad (17)$$

Applying the above result to the cascade of the modulation and channel Heisenberg transforms of (12) and (8), one can show that the received signal is given by the Heisenberg transform $$r(t) = \Pi_f(g_{tr}(t)) + v(t) = \iint f(\tau,\nu) e^{j2\pi\nu(t-\tau)} g_{tr}(t-\tau) d\nu d\tau + v(t) \qquad (18)$$

where $v(t)$ is additive noise and $f(\tau,\nu)$, the impulse response of the combined transform, is given by the twisted convolution of $X[n,m]$ and $h(\tau,\nu)$ $$f(\tau,\nu) = h(\tau,\nu) \odot X[n,m] = \sum_{m=-M/2}^{M/2-1} \sum_{n=0}^{N-1} X[n,m] h(\tau-nT, \nu-m\Delta f) e^{j2\pi(\nu-m\Delta f)nT} \qquad (19)$$

This result can be considered an extension of the single carrier modulation case, where the received signal through a time invariant channel is given by the convolution of the QAM symbols with a composite pulse, that pulse being the convolution of the transmitter pulse and the channel impulse response.

With this result established we are ready to examine exemplary receiver processing steps.

Receiver Processing and the Wigner Transform

Typical communication system design generally requires that the receiver perform a matched filtering operation, taking the inner product of the received waveform with the transmitter pulse, appropriately delayed or otherwise distorted by the channel. In the present case, we have used a collection of delayed and modulated transmit pulses, and a matched filtering operation is typically performed with respect to each one of them.

Figure 4:
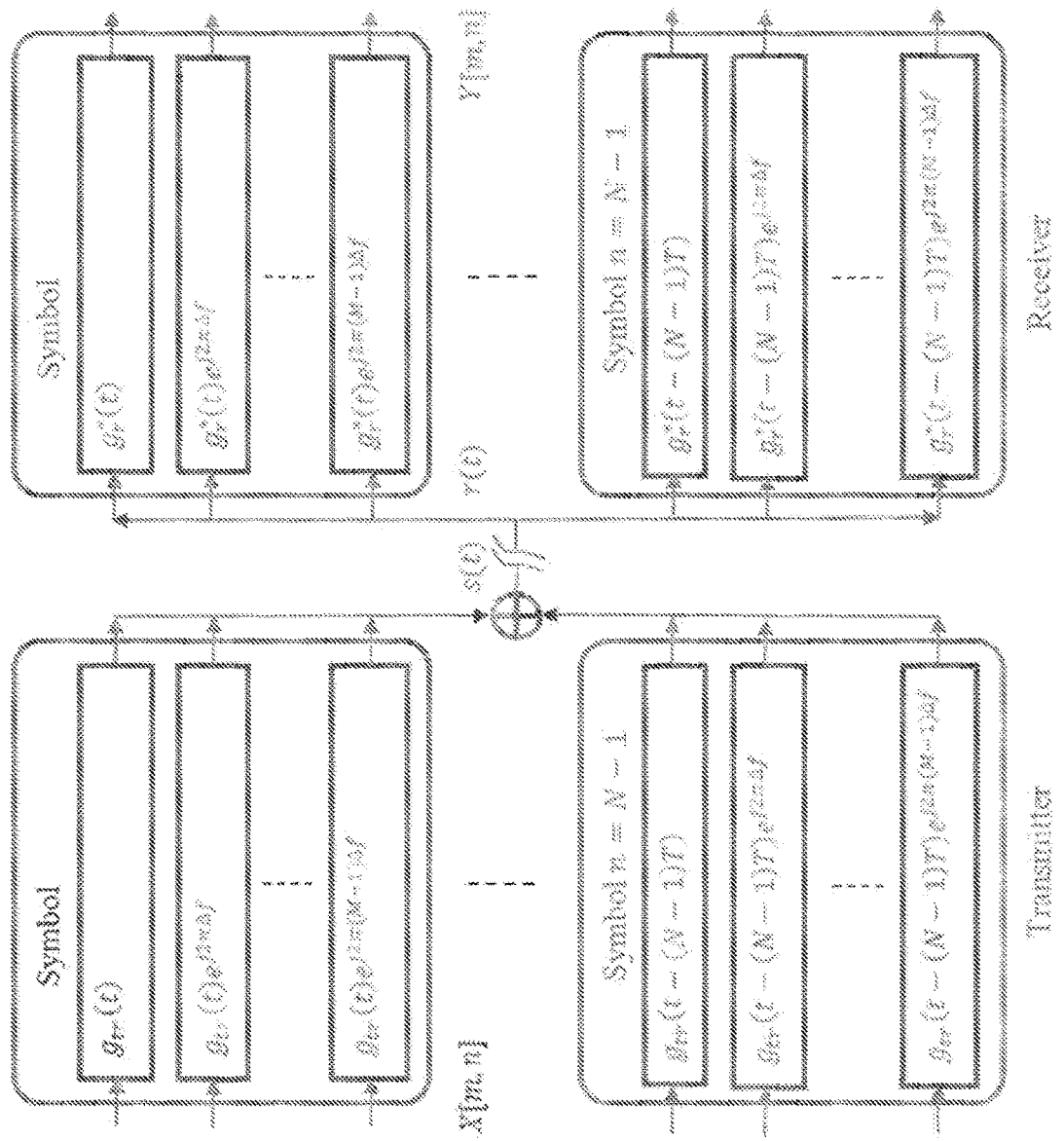
FIG. 4 represents a conceptual implementation of a Heisenberg transform in an OTFS transmitter and a Wigner transform in an OTFS receiver.

FIG. 4 provides a conceptual view of this processing. On the transmitter, we modulate a set of M subcarriers for each symbol we transmit, while on the receiver we perform matched filtering on each of those subcarrier pulses. We define a receiver pulse $g_r(t)$ and take the inner product with a collection of delayed and modulated versions of it. The receiver pulse $g_r(t)$ is in many cases identical to the transmitter pulse, but we keep the separate notation to cover some cases where it is not (most notably in OFDM where the CP samples have to be discarded).

While this approach will yield the sufficient statistics for data detection in the case of an ideal channel, a concern can be raised here for the case of non-ideal channel effects. In this case, the sufficient statistics for symbol detection are obtained by matched filtering with the channel-distorted, information-carrying pulses (assuming that the additive noise is white and Gaussian). In many well designed multicarrier systems however (e.g., OFDM and MCFB), the channel distorted version of each subcarrier signal is only a scalar version of the transmitted signal, allowing for a matched filter design that is independent of the channel and uses the original transmitted subcarrier pulse. We will make these statements more precise shortly and examine the required conditions for this to be true.

In actual embodiments of an OTFS receiver, this matched filtering may be implemented in the digital domain using an FFT or a polyphase transform for OFDM and MCFB respectively. However, for purposes of the present discussion, we will consider a generalization of this matched filtering by taking the inner product $<g_r(t-\tau)e^{j2\pi\nu(t-\tau)}, r(t)>$ of the received waveform with the delayed and modulated versions of the receiver pulse for arbitrary time and frequency offset $(\tau,\nu)$. While likely not necessarily a practical implementation, it allows us to view the operations of FIG. 4 as a two dimensional sampling of this more general inner product.

Let us define the inner product $$A_{g_r,r}(\tau,\nu) = <g_r(t-\tau) e^{j2\pi\nu(t-\tau)}, r(t)> = \int g_r^*(t-\tau) e^{-j2\pi\nu(t-\tau)} r(t) dt \qquad (20)$$

The function $A_{g_r,r}(\tau,\nu)$ is known as the cross-ambiguity function and yields the matched filter output if sampled at $\tau=nT$, $\nu=m\Delta f$ (on the lattice $\Lambda$), i.e., $$Y[n,m] = A_{g_r,r}(\tau,\nu)|_{\tau=nT, \nu=m\Delta f} \qquad (21)$$

The ambiguity function is related to the inverse of the Heisenberg transform, namely the Wigner transform. FIG. 4 provides an intuitive feel for that, as the receiver appears to invert the operations of the transmitter. More formally, if we take the cross-ambiguity or the transmit and receive pulses $A_{g_r,g_{tr}}(\tau,\nu)$, and use it as the impulse response of the Heisenberg operator, then we obtain the orthogonal cross-projection operator $$\prod_{A_{g_r,g_{tr}}} (y(t)) = g_{tr}(t) \langle g_r(t), y(t) \rangle$$

In words, the coefficients that come out of the matched filter, if used in a Heisenberg representation, will provide the best approximation to the original $y(t)$ in the sense of minimum square error.

One key question to be addressed is the relationship is between the matched filter output $Y[n,m]$ (or more generally $Y(\tau,\nu)$) and the transmitter input $X[n,m]$. We have already established in (18) that the input to the matched filter $r(t)$ can be expressed as a Heisenberg representation with impulse response $f(\tau,\nu)$ (plus noise). The output of the matched filter then has two contributions $$Y(\tau,\nu) = A_{g_r,r}(\tau,\nu) = A_{g_r,[\Pi_f(g_{tr})+v]}(\tau,\nu) = A_{g_r,\Pi_f(g_{tr})}(\tau,\nu) + A_{g_r,v}(\tau,\nu) \qquad (22)$$

The last term is the contribution of noise, which we will denote $V(\tau,\nu) = A_{g_r,v}(\tau,\nu)$. The first term on the right hand side is the matched filter output to the (noiseless) input comprising of a superposition of delayed and modulated versions of the transmit pulse. We next establish that this term can be expressed as the twisted convolution of the two dimensional impulse response $f(\tau,\nu)$ with the cross-ambiguity function (or two dimensional cross correlation) of the transmit and receive pulses.

The following theorem summarizes the key result.

Theorem 1: (Fundamental time-frequency domain channel equation). If the received signal can be expressed as $$\Pi_f(g_{tr}(t)) = \iint f(\tau,\nu) e^{j2\pi\nu(t-\tau)} g_{tr}(t-\tau) d\nu d\tau \qquad (23)$$

Then the cross-ambiguity of that signal with the receive pulse $g_{tr}(t)$ can be expressed as $$A_{g_r,\Pi_f(g_{tr})}(\tau,\nu) = f(\tau,\nu) \odot A_{g_r,g_{tr}}(\tau,\nu) \quad (24)$$

Recall from (19) that $f(\tau,\nu)=h(\tau,\nu)\odot X[n,m]$, that is, the composite impulse response is itself a twisted convolution of the channel response and the modulation symbols.

Substituting $f(\tau,\nu)$ from (19) into (22) we obtain the end-to-end channel description in the time frequency domain $$Y(\tau,\nu) = A_{g_r,\Pi_f(g_{tr})}(\tau,\nu) + V(\tau,\nu) \quad (25)$$
$$= h(\tau,\nu) \odot X[n,m] \odot A_{g_r,g_{tr}}(\tau,\nu) + V(\tau,\nu)$$

where $V(\tau,\nu)$ is the additive noise term. Eq. (25) provides an abstraction of the time varying channel on the time-frequency plane. It states that the matched filter output at any time and frequency point $(\tau,\nu)$ is given by the delay-Doppler impulse response of the channel twist-convolved with the impulse response of the modulation operator twist-convolved with the cross-ambiguity (or two dimensional cross correlation) function of the transmit and receive pulses.

Evaluating Eq. (25) on the lattice $\Lambda$ we obtain the matched filter output modulation symbol estimates $$\hat{X}[m,n] = Y[n,m] = Y(\tau,\nu)|_{\tau=nT,\nu=m\Delta f} \quad (26)$$

In order to get more intuition on Equations (25), (26). let us first consider the case of an ideal channel, i.e., $h(\tau,\nu)=\delta(\tau)\delta(\nu)$. In this case by direct substitution we get the convolution relationship $$Y[n,m] = \quad (27)$$
$$\sum_{m'=-M/2}^{M/2-1} \sum_{n'=0}^{N-1} X[n',m'] A_{g_r,g_{tr}}((n-n')T, (m-m')\Delta f) + V[m,n]$$

In order to simplify Eq. (27) we will use the orthogonality properties of the ambiguity function. Since we use a different transmit and receive pulses we will modify the orthogonality condition on the design of the transmit pulse we stated in (10) to a bi-orthogonality condition $$\langle g_{tr}(t), g_r(t-nT)e^{j2\pi m\Delta f(t-nT)} \rangle = \quad (28)$$
$$\int g_{tr}^*(t) g_r(t-nT) e^{j2\pi m\Delta f(t-nT)} dt = \delta(m)\delta(n)$$

Under this condition, only one term survives in (27) and we obtain $$Y[n,m] = X[n,m] + V[n,m] \quad (29)$$

where $V[n,m]$ is the additive white noise. Eq. (29) shows that the matched filter output does recover the transmitted symbols (plus noise) under ideal channel conditions. Of more interest of course is the case of non-ideal time varying channel effects. We next show that even in this case, the channel orthogonalization is maintained (no intersymbol or intercarrier interference), while the channel complex gain distortion has a closed form expression.

The following theorem summarizes the result as a generalization of (29).

Theorem 2: (End-to-end time-frequency domain channel equation):

If $h(\tau,\nu)$ has finite support bounded by $(\tau_{max},\nu_{max})$ and if $A_{g_r,g_{tr}}(\tau,\nu)=0$ for $\tau \in (nT-\tau_{max}, nT+\tau_{max})$, $\nu \in (m\Delta f-\nu_{max}, m\Delta f+\nu_{max})$, that is, the ambiguity function bi-orthogonality property of (28) is true in a neighborhood of each grid point $(m\Delta f, nT)$ of the lattice $\Lambda$ at least as large as the support of the channel response $h(\tau,\nu)$, then the following equation holds $$Y[n,m] = H[n,m]X[n,m]$$
$$H[n,m] = \iint h(\tau,\nu) e^{j2\pi\nu nT} e^{-j2\pi(\nu+m\Delta f)\tau} d\nu d\tau \quad (30)$$

If the ambiguity function is only approximately bi-orthogonal in the neighborhood of $\Lambda$ (by continuity), then (30) is only approximately true. Eq. (30) is a fundamental equation that describes the channel behavior in the time-frequency domain. It is the basis for understanding the nature of the channel and its variations along the time and frequency dimensions.

Some observations are now in order on Eq. (30). As mentioned before, there is no interference across $X[n,m]$ in either time n or frequency m.

The end-to-end channel distortion in the modulation domain is a (complex) scalar that needs to be equalized.

If there is no Doppler, i.e. $h(\tau,\nu)=h(\tau,0)\delta(\nu)$, then Eq. (30) becomes $$Y[n,m] = X[n,m] \int h(\tau,0) e^{-j2\pi m\Delta f\tau} d\tau \quad (31)$$
$$= X[n,m] H(0, m\Delta f)$$

which is the well-known multicarrier result, that each subcarrier symbol is multiplied by the frequency response of the time invariant channel evaluated at the frequency of that subcarrier.

If there is no multipath, i.e. $h(\tau,\nu)=h(0,\nu)\delta(\tau)$, then Eq. (30) becomes $$Y[n,m] = X[n,m] \int h(\nu,0) e^{j2\pi\nu nT} d\tau \quad (32)$$

Notice that the fading each subcarrier experiences as a function of time nT has a complicated expression as a weighted superposition of exponentials. This is a major complication in the design of wireless systems with mobility like LTE; it necessitates the transmission of pilots and the continuous tracking of the channel, which becomes more difficult the higher the vehicle speed or Doppler bandwidth is.

Some examples of this general framework are provided below.

Example 3: (OFDM modulation). In this case the fundamental transmit pulse is given by (14) and the fundamental receive pulse is $$g_r(t) = \begin{cases} 0 & -T_{CP} < t < 0 \\ \dfrac{1}{\sqrt{T-T_{CP}}} & 0 < t < T - T_{CP} \\ 0 & \text{else} \end{cases} \quad (33)$$

i.e., the receiver zeroes out the CP samples and applies a square window to the symbols comprising the OFDM symbol. It is worth noting that in this case the bi-orthogonality property holds exactly along the time dimension.

Example 4: (MCFB modulation). In the case of multicarrier filter banks $g_{tr}(t)=g_r(t)=g(t)$. There are several designs for the fundamental pulse g(t). A square root raised cosine pulse provides good localization along the frequency dimension at the expense of less localization along the time dimension. If T is much larger than the support of the channel in the time dimension, then each subchannel sees a flat channel and the bi-orthogonality property holds approximately.

In summary, one of the two transforms defining OTFS has now been described. Specifically, an explanation has been provided of how the transmitter and receiver apply appropriate operators on the fundamental transmit and receive pulses and orthogonalize the channel according to Eq. (30). Examples have also been provided to illustrate how the choice of the fundamental pulse affects the time and frequency localization of the transmitted modulation symbols and the quality of the channel orthogonalization that is achieved. However, Eq. (30) shows that the channel in this domain, while free of intersymbol interference, suffers from fading across both the time and the frequency dimensions via a complicated superposition of linear phase factors.

In what follows we start from Eq. (30) and describe the second transform that defines OTFS; we will show how that transform defines an information domain where the channel does not fade in either dimension.

The 2D OTFS Transform

Notice that the time-frequency response H[n,m] in (30) is related to the channel delay-Doppler response h(τ,ν) by an expression that resembles a Fourier transform. However, there are two important differences: (i) the transform is two dimensional (along delay and Doppler) and (ii) the exponentials defining the transforms for the two dimensions have opposing signs. Despite these difficulties, Eq. (30) points in the direction of using complex exponentials as basis functions on which to modulate the information symbols; and only transmit on the time-frequency domain the superposition of those modulated complex exponential bases. As is discussed below, this approach exploits Fourier transform properties and effectively translates a multiplicative channel in one Fourier domain to a convolution channel in the other Fourier domain.

Given the difficulties of Eq. (30) mentioned above, we need to develop a suitable version of Fourier transform and associated sampling theory results. Let us start with the following definitions:

Definition 1: Symplectic Discrete Fourier Transform: Given a square summable two dimensional sequence X[m, n]∈$\hbar$ (Λ) we define $$x(\tau, \nu) = \sum_{m,n} X[n, m]e^{-j2\pi(\nu nT - \tau m\Delta f)} \quad (34)$$

$$\triangleq SDFT(X[n, m])$$

Notice that the above 2D Fourier transform (known as the Symplectic Discrete Fourier Transform) differs from the more well known Cartesian Fourier transform in that the exponential functions across each of the two dimensions have opposing signs. This is necessary in this case, as it matches the behavior of the channel equation.

Further notice that the resulting x(τ,ν) is periodic with periods (1/Δf,1/T). This transform defines a new two dimensional plane, which we will call the delay-Doppler plane, and which can represent a max delay of 1/Δf and a max Doppler of 1/T. A one dimensional periodic function is also called a function on a circle, while a 2D periodic function is called a function on a torus (or donut). In this case x(τ,ν) is defined on a torus Z with circumferences (dimensions) (1/Δf,1/T).

The periodicity of x(τ,ν) (or sampling rate of the time-frequency plane) also defines a lattice on the delay-Doppler plane, which we will call the reciprocal lattice $$\Lambda^{\perp} = \left\{\left(m\frac{1}{\Delta f}, n\frac{1}{T}\right), n, m \in \mathbb{Z}\right\} \quad (35)$$

The points on the reciprocal lattice have the property of making the exponent in (34), an integer multiple of 2π.

The inverse transform is given by:

$$X[n, m] = \frac{1}{c}\int_0^{\frac{1}{\Delta f}} \int_0^{\frac{1}{T}} x(\tau, \nu)e^{j2\pi(\nu nT - \tau m\Delta f)} d\nu d\tau \quad (36)$$

$$\triangleq SDFT^{-1}(x(\tau, \nu))$$

where c=TΔf.

We next define a sampled version of x(τ,ν). In particular, we wish to take M samples on the delay dimension (spaced at 1/MΔf) and N samples on the Doppler dimension (spaced at 1/NT). More formally, a denser version of the reciprocal lattice is defined so that $\Lambda^{\perp} \subseteq \Lambda_0^{\perp}$.

$$\Lambda_0^{\perp} = \left\{\left(m\frac{1}{M\Delta f}, n\frac{1}{NT}\right), n, m \in \mathbb{Z}\right\} \quad (37)$$

We define discrete periodic functions on this dense lattice with period (1/Δf,1/T), or equivalently we define functions on a discrete torus with these dimensions $$Z_0^{\perp} = \left\{\left(m\frac{1}{M\Delta f}, n\frac{1}{NT}\right), m = 0, \ldots, M-1, n = 0, \ldots N-1,\right\} \quad (38)$$

These functions are related via Fourier transform relationships to discrete periodic functions on the lattice Λ, or equivalently, functions on the discrete torus $$Z_0 = \{(nT, m\Delta f), m=0, \ldots, M-1, n=0, \ldots N-1,\} \quad (39)$$

We wish to develop an expression for sampling Eq. (34) on the lattice of (38). First, we start with the following definition.

Definition 2: Symplectic Finite Fourier Transform: If $X_p[k,l]$ is periodic with period (N,M), then we define $$x_p[m, n] = \sum_{k=0}^{N-1} \sum_{l=-\frac{M}{2}}^{\frac{M}{2}-1} X_p[k, l]e^{-j2\pi\left(\frac{nk}{N} - \frac{ml}{M}\right)} \quad (40)$$

$$\triangleq SFFT(X[k, l])$$

Notice that $X_p[m,n]$ is also periodic with period [M,N] or, equivalently, it is defined on the discrete torus $Z_0^{\perp}$. Formally, the SFFT(X[n,m]) is a linear transformation from $\hbar(Z_0) \to \hbar(Z_0^{\perp})$.

Let us now consider generating $x_p[m,n]$ as a sampled version of (34), i.e., $$x_p[m, n] = x[m, n] = x(\tau, v)|_{\tau=\frac{m}{M\Delta f}, v=\frac{n}{NT}}.$$  (5)

Then we can show that (40) still holds where $X_p[m,n]$ is a periodization of $X[n,m]$ with period $(N,M)$ $$X_p[n, m] = \sum_{l,k=-\infty}^{\infty} X[n - kN, m - lM]$$  (41)

This is similar to the result that sampling in one Fourier domain creates aliasing in the other domain.

The inverse discrete (symplectic) Fourier transform is given by $$X_p[n, m] = \frac{1}{MN} \sum_{l,k} x[l, k] e^{j2\pi\left(\frac{nk}{N} - \frac{ml}{M}\right)}$$  (42)

$$\stackrel{\Delta}{=} SFFT^{-1}(x[l, k])$$

where $l=0, \ldots, M-1$, $k=0, \ldots, N-1$. If the support of $X[n,m]$ is time-frequency limited to $Z_0$ (no aliasing in (41)), then $X_p[n,m]=X[n,m]$ for $n,m\in Z_0$, and the inverse transform (42) recovers the original signal.

The SDFT is termed "discrete" because it represents a signal using a discrete set of exponentials, while the SFFT is called "finite" because it represents a signal using a finite set of exponentials.

In the present context, an important property of the symplectic Fourier transform is that it transforms a multiplicative channel effect in one domain to a circular convolution effect in the transformed domain. This is summarized in the following proposition:

Proposition 2: Let $X_1[n,m] \in \hbar(Z_0)$, $X_2[n,m] \in \hbar(Z_0)$ be periodic 2D sequences. Then $$SFFT(X_1[n,m]*X_2[n,m])=SFFT(X_1[n,m])\cdot SFFT(X_2[n,m])$$  (43)

where * denotes two dimensional circular convolution. With this framework established we are ready to define the OTFS modulation.

Discrete OTFS modulation: Consider a set of NM QAM information symbols arranged on a 2D grid $x[l,k]$, $k=0, \ldots, N-1$, $l=0, \ldots, M-1$ we wish to transmit. We will consider $x[l,k]$ to be two dimensional periodic with period $[N,M]$. Further, assume a multicarrier modulation system defined by A lattice on the time frequency plane, that is a sampling of the time axis with sampling period T and the frequency axis with sampling period $\Delta f$ (c.f. Eq. (9)).

A packet burst with total duration NT secs and total bandwidth $M\Delta f$ Hz.

Transmit and receive pulses $g_{tr}(t)$, $g_{tr}(t) \in L_2(\mathcal{H})$ satisfying the bi-orthogonality property of (28)

A transmit windowing square summable function $W_{tr}[n,m] \in \hbar(\Lambda)$ multiplying the modulation symbols in the time-frequency domain A set of modulation symbols $X[n,m]$, $n=0, \ldots, N-1$, $m=0, \ldots, M-1$ related to the information symbols $x[k,l]$ by a set of basis functions $b_{k,l}[n,m]$ $$X[n, m] = \frac{1}{MN} W_{tr}[n, m] \sum_{k=0}^{N-1} \sum_{l=0}^{M-1} x[l, k] b_{k,l}[n, m]$$  (44)

$$b_{k,l}[n, m] = e^{j2\pi\left(\frac{ml}{M} - \frac{nk}{N}\right)}$$

where the basis functions $b_{k,l}[n,m]$ are related to the inverse symplectic Fourier transform (c.f., Eq. (42))

Given the above components, we define the discrete OTFS modulation via the following two steps $$X[n,m]=W_{tr}[n,m]SFFT^{-1}(x[k,l])$$

$$s(t)=\Pi_X(g_{tr}(t))$$  (45)

The first equation in (45) describes the OTFS transform, which combines an inverse symplectic transform with a windowing operation. The second equation describes the transmission of the modulation symbols $X[n,m]$ via a Heisenberg transform of $g_{tr}(t)$ parameterized by $X[n,m]$. More explicit formulas for the modulation steps are given by Equations (42) and (11).

While the expression of the OTFS modulation via the symplectic Fourier transform reveals important properties, it is easier to understand the modulation via Eq. (44), that is, transmitting each information symbol $x[k,l]$ by modulating a 2D basis function $b_{k,l}[n,m]$ on the time-frequency plane.

Discrete OTFS demodulation: Let us assume that the transmitted signal $s(t)$ undergoes channel distortion according to (8), (2) yielding $r(t)$ at the receiver. Further, let the receiver employ a receive windowing square summable function $W_r[n,m]$. Then, the demodulation operation consists of the following steps:

(i) Matched filtering with the receive pulse, or more formally, evaluating the ambiguity function on A (Wigner transform) to obtain estimates of the time-frequency modulation symbols $$Y[n,m]=A_{g_r,y}(\tau,v)_{\tau=nT,v=m\Delta f}$$  (46)

(ii) windowing and periodization of $Y[n,m]$ $$Y_w[n, m] = W_r[n, m] Y[n, m]$$  (47)

$$Y_p[n, m] = \sum_{k,l=-\infty}^{\infty} Y_w[n - kN, m - lM]$$

(iii) and applying the symplectic Fourier transform on the periodic sequence $Y_p[n,m]$ $$\hat{x}[l,k]=y[l,k]=SFFT(Y_p[n,m])$$  (48)

The first step of the demodulation operation can be interpreted as a matched filtering operation on the time-frequency domain as we discussed earlier. The second step is there to ensure that the input to the SFFT is a periodic sequence. If the trivial window is used, this step can be skipped. The third step can also be interpreted as a projection of the time-frequency modulation symbols on the orthogonal basis functions $$\hat{x}[l, k] = \sum_{m=0}^{M-1} \sum_{n=0}^{N-1} \hat{X}(n, m) b_{k,l}^*(n, m)$$  (49)

$$b_{k,l}^*(n, m) = e^{-j2\pi\left(\frac{lm}{L} - \frac{kn}{K}\right)}$$

The discrete OTFS modulation defined above points to efficient implementation via discrete-and-periodic FFT type processing. However, it potentially does not provide insight into the time and bandwidth resolution of these operations in the context of two dimensional Fourier sampling theory. We next introduce continuous OTFS modulation and relate the more practical discrete OTFS as a sampled version of the continuous modulation.

Continuous OTFS modulation: Consider a two dimensional periodic function $x(\tau,\nu)$ with period $[1/\Delta f, 1/T]$ that we wish to transmit. The choice of the period may seem arbitrary at this point, but the rationale for its choice will become apparent after the discussion below. Further, assume a multicarrier modulation system defined by A lattice on the time frequency plane, that is a sampling of the time axis with sampling period T and the frequency axis with sampling period $\Delta f$ (c.f. Eq. (9)).

Transmit and receive pulses $g_{tr}(t), g_{tr}(t) \in L_2(\mathbb{Z})$ satisfying the bi-orthogonality property of (28)

A transmit windowing function $W_{tr}[n,m] \in \hbar(\Lambda)$ multiplying the modulation symbols in the time-frequency domain Given the above components, we define the continuous OTFS modulation via the following two steps $$X[n,m] = W_{tr}[n,m] \text{SDFT}^{-1}(x(\tau,\nu))$$

$$s(t) = \Pi_X(g_{tr}(t)) \qquad (50)$$

The first equation describes the inverse discrete time-frequency symplectic Fourier transform [c.f. Eq. (36)] and the windowing function, while the second equation describes the transmission of the modulation symbols via a Heisenberg transform [c.f. Eq. (11)].

Continuous OTFS demodulation: Let us assume that the transmitted signal s(t) undergoes channel distortion according to (8), (2) yielding r(t) at the receiver. Further, let the receiver employ a receive windowing function $W_r[n,m] \in \hbar(\Lambda)$. Then, the demodulation operation consists of two steps:

(i) Evaluating the ambiguity function on $\Lambda$ (Wigner transform) to obtain estimates of the time-frequency modulation symbols $$Y[n,m] = A_{g_r,y}(\tau,\nu)|_{\nu=nT,\nu=m\Delta f} \qquad (51)$$

(ii) Windowing and applying the symplectic Fourier transform on the modulation symbols $$\hat{x}(\tau,\nu) = \text{SDFT}(W_r[n,m]Y[n,m]) \qquad (52)$$

Notice that in (51), (52) there is no periodization of Y[n,m], since the SDFT is defined on aperiodic square summable sequences. The periodization step needed in discrete OTFS can be understood as follows. Suppose we wish to recover the transmitted information symbols by performing a continuous OTFS demodulation and then sampling on the delay-Doppler grid $$\hat{x}(l,k) = \hat{x}(\tau,\nu)|_{\tau=\frac{m}{M\Delta f}, \nu=\frac{n}{NT}}$$

Since performing a continuous symplectic Fourier transform is generally not practical we consider whether the same result can be obtained using SFFT. The answer is that SFFT processing will produce exactly the samples we are looking for if the input sequence is first periodized (aliased). See also equation (40) and (41).

We have now described each of the steps of an exemplary form of OTFS modulation. We have also discussed how the Wigner transform at the receiver inverts the Heisenberg transform at the transmitter [c.f. Eqs. (27), (29)], and similarly for the forward and inverse symplectic Fourier transforms.

FIG. 5A illustratively represents operations involved in OTFS-based communication, including the transformation of the time-frequency plane to the Doppler-delay plane. In addition, FIGS. 5A and 5B indicates relationships between sampling rate, delay resolution and time resolution. Referring to FIG. 5A, in a first operation a Heisenberg transform translates a time-varying convolution channel in the waveform domain to an orthogonal but still time varying channel in the time frequency domain. For a total bandwidth BW and M subcarriers the frequency resolution is $\Delta f = \text{BW}/M$. For a total frame duration $T_f$ and N symbols the time resolution is $T = T_f/N$.

In a second operation a SFFT transform translates the time-varying channel in the time-frequency domain to a time invariant one in the delay-Doppler domain. The Doppler resolution is $1/T_f$ and the delay resolution is 1/BW, with the Doppler and delay resolutions being mutually decoupled. The choice of window can provide a tradeoff between main lobe width (resolution) and side lobe suppression, as in classical spectral analysis.

Referring to FIG. 5C, an illustration is provided of signaling between various domains in an OTFS communication system. Specifically, FIG. 5C illustrates signaling over: the (i) actual physical channel with a signaling waveform, (ii) the time-frequency domain, and (iii) the delay-Doppler domain.

FIG. 5D illustrates exemplary notations used in denoting signals present at various stages of processing (e.g., encoding, modulation, decoding, demodulation) in an OTFS transmitter and receiver.

Channel Equation in the OTFS Domain

A mathematical characterization of the end-to-end signal relationship in an OTFS system when a non-ideal channel is between the transmitter and receiver will now be provided. Specifically, this section demonstrates how the time varying channel in (2), (8), is transformed to a time invariant convolution channel in the delay Doppler domain.

Proposition 3: Consider a set of NM QAM information symbols arranged in a 2D periodic sequence x[l,k] with period [M, N]. The sequence x[k,l] undergoes the following transformations:

It is modulated using the discrete OTFS modulation of Eq. (45).

It is distorted by the delay-Doppler channel of Eqs. (2), (8).

It is demodulated by the discrete OTFS demodulation of Eqs. (46), (48).

The estimated sequence $\hat{x}[l,k]$ obtained after demodulation is given by the two dimensional periodic convolution $$\hat{x}[l,k] \simeq \frac{1}{MN} \sum_{m=0}^{M-1} \sum_{n=0}^{N-1} x[m,n] h_w\left(\frac{l-m}{M\Delta f}, \frac{k-n}{NT}\right) \qquad (53)$$

of the input QAM sequence x[m,n] and a sampled version of the windowed impulse response $h_w(\cdot)$, $$h_w\left(\frac{l-m}{M\Delta f}, \frac{k-n}{NT}\right) = h_w(\tau',\nu')\bigg|_{\tau'=\frac{l-m}{M\Delta f}, \nu'=\frac{k-n}{NT}} \qquad (54)$$

where $h_w(\tau',\nu')$ denotes the circular convolution of the channel response with a windowing function $$h_w(\tau',\nu')=\iint e^{-j2\pi\nu\tau}h(\tau,\nu)w(\tau'-\tau,\nu'-\nu)d\tau d\nu \quad (55)$$

To be precise, the window $w(\tau,\nu)$ is circularly convolved with a slightly modified version of the channel impulse response $e^{-j2\pi\nu\tau}h(\tau,\nu)$ (by a complex exponential) as can be seen in the equation. The windowing function $w(\tau,\nu)$ is the symplectic Fourier transform of the time-frequency window $W[n,m]$ $$w(\tau, \nu) = \sum_{m=0}^{M-1}\sum_{n=0}^{N-1} W[n,m]e^{-j2\pi(\nu nT-\tau m\Delta f)} \quad (56)$$

and where $W[n,m]$ is the product of the transmit and receive window.

$$W[n,m]=W_{tr}[n,m]W_r[n,m] \quad (57)$$

In many cases, the windows in the transmitter and receiver are matched, i.e., $W_{tr}[n,m]=W_0[n,m]$ and $W_r[n,m]=W^*_0[n,m]$, hence $W[n,m]=|W_0[n,m]|^2$.

The window effect is to produce a blurred version of the original channel with a resolution that depends on the span of the frequency and time samples available. If one considers the rectangular (or trivial) window, i.e., $W[n,m]=1$, $n=0, \ldots, N-1$, $m=-M/2, \ldots, M/2-1$ and zero else, then its SDFT $w(\tau,\nu)$ in (56) is the two dimensional Dirichlet kernel with bandwidth inversely proportional to N and M.

There are several other uses of the window function. The system can be designed with a window function aimed at randomizing the phases of the transmitted symbols. This randomization may be more important for pilot symbols than data carrying symbols. For example, if neighboring cells use different window functions, the problem of pilot contamination is avoided.

Channel Estimation in the OTFS Domain

There is a variety of different ways a channel estimation scheme could be designed for an OTFS system, and a variety of different implementation options and details A straightforward way to perform channel estimation entails transmitting a sounding OTFS frame containing a discrete delta function in the OTFS domain or, equivalently, a set of unmodulated carriers in the time frequency domain. From a practical standpoint, the carriers may be modulated with known, say BPSK, symbols which are removed at the receiver, as is common in many OFDM systems.

FIG. 6 shows a discrete impulse in the OTFS domain which may be used for purposes of channel estimation, e.g., as a form of pilot signal. In the example of FIG. 6 the remainder of M×N delay-Doppler plane includes information symbols are arranged in a grid. In a typical implementation M×N could be, for example, 1024×256 or 512×16.

However, this approach may be wasteful as the extent of the channel response is only a fraction of the full extent of the OTFS frame $(1/T,1/\Delta f)$. For example, in LTE systems $1/T\approx15$ KHz while the maximum Doppler shift $f_{d,max}$ is typically one to two orders of magnitude smaller. Similarly $1/\Delta f\approx67$ usec, while maximum delay spread $\tau_{max}$ is again one to two orders of magnitude less. We therefore can have a much smaller region of the OTFS frame devoted to channel estimation while the rest of the frame carries useful data. More specifically, for a channel with support $(\pm f_{d,max}, \pm\tau_{max})$ we need an OTFS subframe of length $(2f_{d,max}/T, 2\tau_{max}/\Delta f)$.

In the case of multiuser transmission, each UE can have its own channel estimation subframe positioned in different parts of the OTFS frame. However, this channel estimation subframe may be relatively limited in size. For example, if $\tau_{max}$ is 5% of the extent of the delay dimension and $f_{d,max}$ is 5% of the Doppler dimension, the channel estimation subframe need only be 5%×5%=0.25% of the OTFS frame.

Importantly, although the channel estimation symbols are limited to a small part of the OTFS frame, they actually sound the whole time-frequency domain via the corresponding two-dimensional time-frequency basis functions associated with these symbols.

A different approach to channel estimation is to devote pilot symbols on a subgrid in the time-frequency domain. The key question in this approach is the determination of the density of pilots that is sufficient for channel estimation without introducing aliasing. Assume that the pilots occupy the subgrid $(n_0T,m_0\Delta f)$ for some integers $n_0,m_0$. Recall that for this grid the SDFT will be periodic with period $(1/n_0T, 1/m_0\Delta f)$. Then, applying the aliasing results discussed earlier to this grid, we obtain an alias-free Nyquist channel support region of $(\pm f_{d,max}, \pm\tau_{max})=(\pm\frac{1}{2}n_0T, \pm\frac{1}{2}m_0\Delta f)$. The density of the pilots can then be determined from this relation given the maximum support of the channel. The pilot subgrid should extend to the whole time-frequency frame, so that the resolution of the channel is not compromised.

OTFS-Access: Multiplexing More than One User

There are a variety of ways to multiplex several uplink or downlink transmissions in one OTFS frame. Here we will briefly review the following multiplexing methods:

Multiplexing in the OTFS delay-Doppler domain
Multiplexing in the time-frequency domain
Multiplexing in the code spreading domain
Multiplexing in the spatial domain 1. Multiplexing in the delay-Doppler domain: This is potentially the most natural multiplexing scheme for downlink transmissions. Different sets of OTFS basis functions, or sets of information symbols or resource blocks, are given to different users. Given the orthogonality of the basis functions, the users can be separated at the UE receiver. The UE need only demodulate the portion of the OTFS frame that is assigned to it.

Attention is directed to FIGS. 7A and 7B, which illustrates a pair of different exemplary basis functions capable of being used in OTFS communications. In contrast to conventional communication systems, in an OTFS system even a small subframe or resource block in the OTFS domain will be transmitted over the whole time-frequency frame via two-dimensional basis functions and will experience the average channel response. FIGS. 7A and 7B illustrate this point by showing two different basis functions belonging to different users. Because of this, there is no compromise on channel resolution for each user, regardless of the resource block or subframe size.

FIGS. 7C and 7D collectively illustrate two-dimensional spreading with respect to both time and frequency in an OTFS communication system. As shown, one or more QAM symbols 710 may be placed within the two-dimensional information domain. Each QAM symbol within the information domain multiples a two-dimensional (i.e., time and frequency domain) basis function 720. In a typical OTFS communication system the transmitted signal is comprised of a set of QAM symbols spread across both time and frequency by a corresponding set of two-dimensional basis functions which are mutually orthogonal with respect to both time and frequency.

FIG. 7E illustrates members of one potential set of such mutually orthogonal two-dimensional basis functions.

In the uplink direction, transmissions from different users experience different channel responses. Hence, the different subframes in the OTFS domain will experience a different convolution channel. This can potentially introduce inter-user interference at the edges where two user subframes are adjacent, and would require guard gaps to eliminate it. In order to avoid this overhead, a different multiplexing scheme can be used in the uplink as explained next.

2. Multiplexing in the time-frequency domain: In this approach, resource blocks or subframes are allocated to different users in the time-frequency domain. FIG. 8 illustrates this for a three user case. As shown in FIG. 8, a first user (U1) occupies the whole frame length but only half the available subcarriers. A second user (U2) and a third user (U3) occupy the other half subcarriers, and divide the total length of the frame between them.

Notice that in this case, each user employs a slightly different version of the OTFS modulation described. One difference is that each user i performs an SFFT on a subframe $(N_i, M_i)$, $N_i \le N$, $M_i \le M$. This reduces the resolution of the channel, or in other words reduces the extent of the time-frequency plane in which each user will experience its channel variation. On the other side, this also gives the scheduler the opportunity to schedule users in parts of the time-frequency plane where their channel is best.

If it is desired to extract the maximum diversity of the channel and allocate users across the whole time-frequency frame, users can be multiplexed via interleaving. In this case, one user occupies a subsampled grid of the time-frequency frame, while another user occupies another subsampled grid adjacent to it. FIG. 9 shows the same three users as in FIG. 8, but interleaved on the subcarrier dimension. Of course, interleaving is possible in the time dimension as well, and/or in both dimensions. The degree of interleaving, or subsampling the grid per user is only limited by the spread of the channel that must be accommodated.

3. Multiplexing in the time-frequency spreading code domain: Assume that it is desired to design a random access PHY and MAC layer where users can access the network without having to undergo elaborate RACH and other synchronization procedures. There is a perceived need for such a system to support Internet of Things (IoT) deployments. OTFS can support such a system by assigning each user a different two-dimensional window function that is designed as a randomizer. In this embodiment the windows of different users are designed to be nearly orthogonal to each other and nearly orthogonal to time and frequency shifts. Each user then only transmits on one or a few basis functions and uses the window as a means to randomize interference and provide processing gain. This can result in a much simplified system that may be attractive for low cost, short burst type of IoT applications.

4. Multiplexing in the spatial domain: Finally, like other OFDM multicarrier systems, a multi-antenna OTFS system can support multiple users transmitting on the same basis functions across the whole time-frequency frame. The users are separated by appropriate transmitter and receiver beamforming operations.

Exemplary Implementations of OTFS Communication Systems

As discussed above, embodiments of Orthogonal Time Frequency Space (OTFS) modulation are comprised of a cascade of two transformations. The first transformation maps the two dimensional plane where the information symbols reside (and which may be termed the delay-Doppler plane) to the time frequency plane. The second transformation transforms the time frequency domain to the waveform time domain where the transmitted signal is actually constructed. This transform can be thought of as a generalization of multicarrier modulation schemes.

FIG. 10 illustrates components of an exemplary OTFS transceiver 1000. The OTFS transceiver 1000 can be used as one or both of the exemplary OTFS transceivers 315 illustrated in the communication system 300 of FIG. 3. The OTFS transceiver 1000 includes a transmitter module 1005 that includes a pre-equalizer 1010, an OTFS encoder 1020 and an OTFS modulator 1030. The OTFS transceiver 1000 also includes a receiver module 1055 that includes a post-equalizer 1080, an OTFS decoder 1070 and an OTFS demodulator 1060. The components of the OTFS transceiver may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. The disclosed OTFS methods will be described in view of the various components of the transceiver 1000.

Referring again to FIG. 3, in one aspect a method of OTFS communication involves transmitting at least one frame of data ([D]) from the transmitting device 310 to the receiving device 330 through the communication channel 320, such frame of data comprising a matrix of up to $N^2$ data elements, N being greater than 1. The method comprises convolving, within the OTFS transceiver 315-1, the data elements of the data frame so that the value of each data element, when transmitted, is spread over a plurality of wireless waveforms, each waveform having a characteristic frequency, and each waveform carrying the convolved results from a plurality of said data elements from the data frame [D]. Further, during the transmission process, cyclically shifting the frequency of this plurality of wireless waveforms over a plurality of times so that the value of each data element is transmitted as a plurality of cyclically frequency shifted waveforms sent over a plurality of times. At the receiving device 330, the OTFS transceiver 315-2 receives and deconvolves these wireless waveforms thereby reconstructing a replica of said at least one frame of data [D]. In the exemplary embodiment the convolution process is such that an arbitrary data element of an arbitrary frame of data ([D]) cannot be guaranteed to be reconstructed with full accuracy until substantially all of these wireless waveforms have been transmitted and received.

FIG. 11 illustrates a comparison of bit error rates (BER) predicted by a simulation of a TDMA system and an OTFS system. Both systems utilize a 16 QAM constellation. The simulation modeled a Doppler spread of 100 Hz and a delay spread of 3 microsec. As can be seen from the graphs, the OTFS system offers much lower BER than the TDMA system for the same signal-to-noise ratio (SNR).

Attention is now directed to FIG. 12, which is a flowchart representative of the operations performed by an OTFS transceiver 1200 which may be implemented as, for example, the OTFS transceiver 1000 (FIG. 10). The OTFS transceiver 1200 includes a transmitter including a modulator 1210 and a receiver including a demodulator 1220 and two-dimensional equalizer 1230. In operation, a transmitter of the OTFS transceiver 1200 receives a two-dimensional symbol stream in the form of an N×N matrix of symbols, which may hereinafter be referred to as a TF matrix:

$x \in C^{N \times N}$

As is illustrated in FIG. 13, in one embodiment the modulator 1210 functions as an orthogonal map disposed to transform the two-dimensional TF matrix to the following transmitted waveform:

$\phi_t = M(x) = \Sigma x(i,j)\phi_{i,j}\phi_{i,j} \perp \phi_{k,l}$

Referring to FIG. 14, the demodulator 1220 transforms the received waveform to a two-dimensional TF matrix in accordance with an orthogonal map in order to generate an output stream:

$\phi_r \mapsto y = D(\phi_r)$

In one embodiment the OTFS transceiver 1200 may be characterized by a number of variable parameters including, for example, delay resolution (i.e., digital time "tick" or clock increment), Doppler resolution, processing gain factor (block size) and orthonormal basis function. Each of these variable parameters may be represented as follows.

Delay resolution (digital time tick):

$$\Delta T \in R^{>0}\left(\Delta T = \frac{1}{Bw}\right)$$

Doppler resolution:

$$\Delta F \in R^{>0}\left(\Delta F = \frac{1}{Trans}\right)$$

Processing gain factor (block size):

$N > 0$

Orthonormal basis of $C^{N \times 1}$ (spectral shapes):

$U = \{u_1, u_2, \ldots, u_N\}$

As is illustrated by FIG. 12, during operation the modulator 1210 takes a TF matrix $x \in C^{N \times N}$ and transforms it into a pulse waveform. In one embodiment the pulse waveform comprises a pulse train defined in terms of the Heisenberg representation and the spectral shapes:

$$\phi_t = M(x) = \left(\frac{\Pi(x)u_1}{b_1}, \frac{\Pi(x)u_2}{b_2}, \ldots, \frac{\Pi(x)u_N}{b_N}\right)$$

where $b_1, b_2 \ldots b_N$ are illustrated in FIG. 15 and where, in accordance with the Heisenberg relation:

$\Pi(h*x) = \Pi(h) \cdot \Pi(x)$ in particular:

$\Pi(\delta_{(\tau,0)}*x) = L_\tau \cdot \Pi(x)$ $\Pi(\delta_{(0,w)}*x) = M_w \cdot \Pi(x)$ The Heisenberg representation provides that:

$$\prod : C^{N \times N} \to C^{N \times N} \text{ given by:}$$

$$\prod(x) = \sum_{r,w=0}^{N-1} x(\tau, w) M_w L_\tau, x \in C^{N \times N}$$

where $L_t$ and $M_w$ are respectively representative of cyclic time and frequency shifts and may be represented as:

$L_t \in C^{N \times N}: L_t(\varphi)(t) = \varphi(t+\tau), \tau = 0, \ldots, N-1$ $M_w \in C^{N \times N}: M_w(\varphi)(t) = e^{\frac{j2\pi}{N}wt}\varphi(t), w = 0, \ldots, N-1$ The demodulator 1220 takes a received waveform and transforms it into a TF matrix $y \in C^{N \times N}$ defined in terms of the Wigner transform and the spectral shapes:

$\phi_r = (b_1, b_2, \ldots, b_N)$ $$y(\tau, w) = D(\phi_r)(\tau, w) = \overbrace{\frac{1}{N}\sum_{n=1}^{N} \langle M_M L_\tau u_n, b_n \rangle}^{\text{Wigner transform}}$$

Main property of M and D (Stone von Neumann theorem):

$D(h^a M(x)) = h*x$ where:

$h(\tau, w) \approx a(\tau \Delta T, w \Delta F)$

As illustrated in FIG. 16, the equalizer 1230 may be implemented as a two-dimensional decision feedback equalizer configured to perform a least means square (LMS) equalization procedure such that:

$y \mapsto \hat{x}$

The equalizer 1230 leverages the feature of OTFS that, in the time-frequency plane, all bits experience the same distortion during propagation through the channel. By "de-blurring" the bits using the same distortion experienced by the bits in the channel, the signal transmitted into the channel is revealed.

Transmitter Grid and Receiver Bin Structure

Figure 17A:
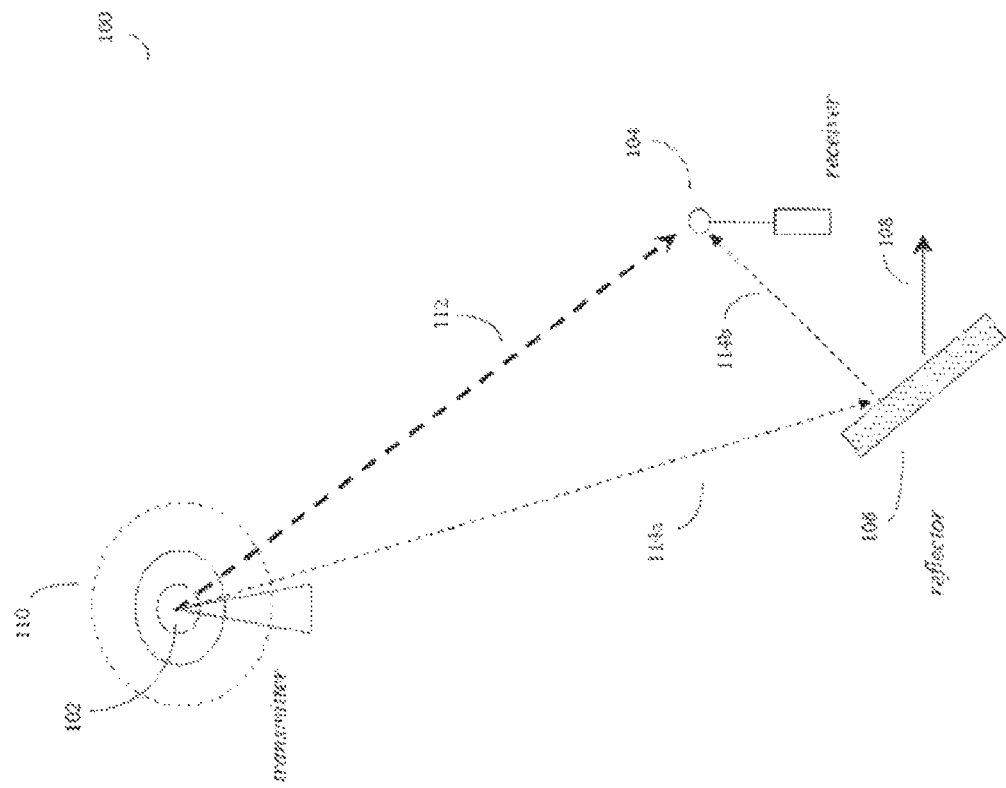
Figure 17B:
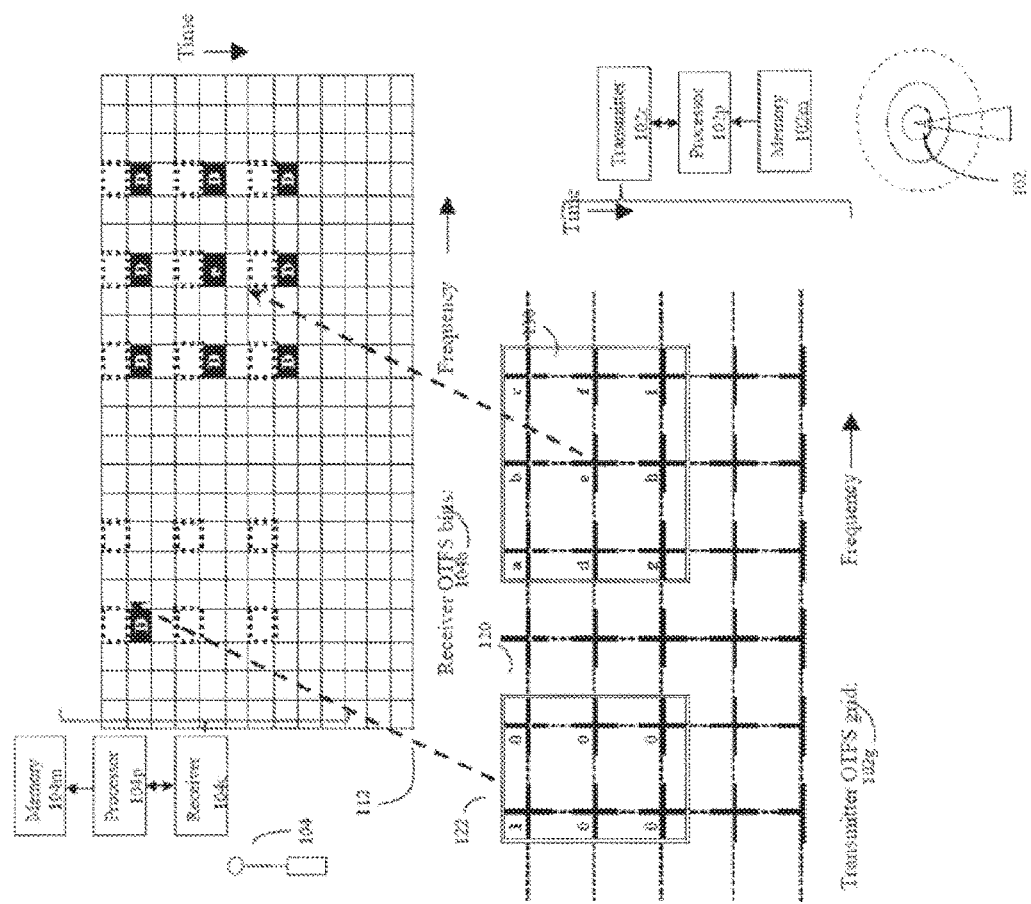
Figure 17C:
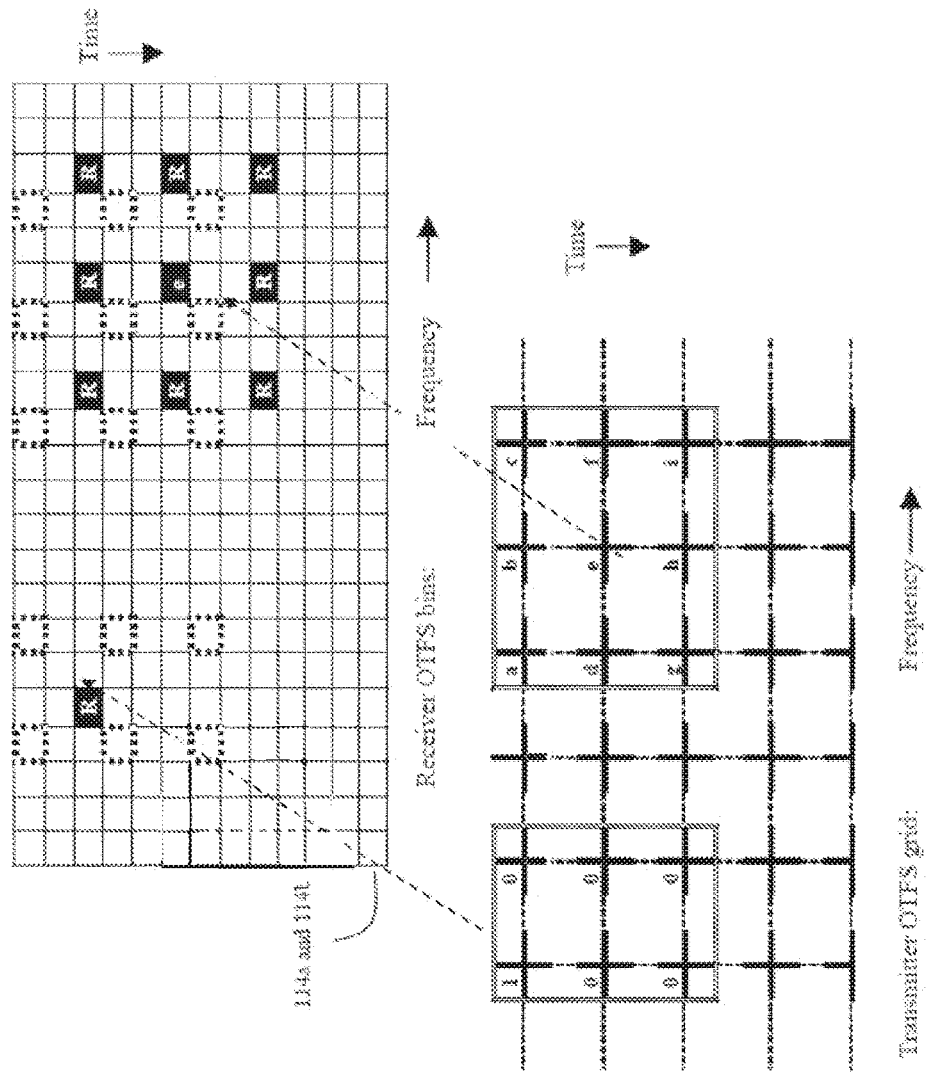
Figure 17D:
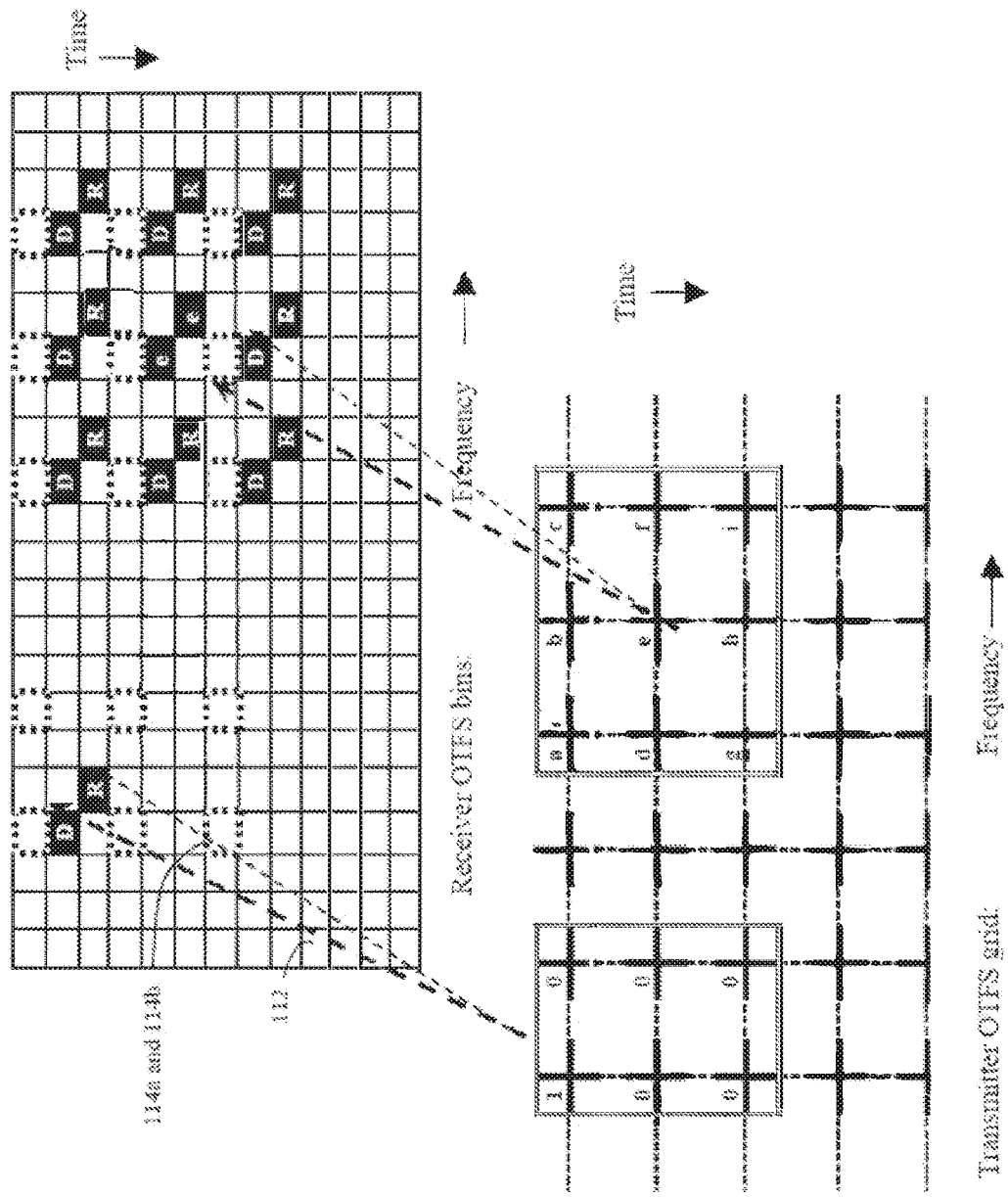

Attention is now directed to FIGS. 17A-17D, which depict an OTFS transmitter 102 and receiver 104 to which reference will be made in describing the transmission and reception of OTFS waveforms. More specifically, FIGS. 17B-17D illustrate the transmission and reception of OTFS waveforms relative to a time-frequency transmitter grid or series of bins and a corresponding time-frequency receiver grid or series of bins. As will be discussed below, the receiver 104 will generally operate with respect to a time-frequency receive grid of a finer mesh than that of the time-frequency transmit grid associated with the transmitter 102.

Turning now to FIG. 17A, the transmitter 102 and receiver 104 are separated by an impaired wireless data channel 100 including one or more reflectors 106. As shown, the reflectors 106 may reflect or otherwise impair waveforms (112, 114a, 114b) as they travel through the data channel 100. These reflectors may be inherently represented by the two-dimensional (2D) channel state of the channel 100 (see, e.g., the finite channel $h_{eqv,f}$ of FIG. 18).

FIGS. 18A and 18B illustratively represent OTFS communication over a communication channel characterized by a two-dimensional delay-Doppler impulse response. The set of bar diagrams of FIGS. 18A and 18B may represent a two-dimensional impulse response realizing a finite modulation equivalent channel, a transmitted information vector x comprised of OTFS QAM symbols and a received information vector y comprised of received OTFS symbols. One advantage of embodiments of OTFS communication systems suggested by FIGS. 18a and 18B is that the two-dimensional channel model is stationary and all symbols experience the same distortion. As a consequence of being stationary for the necessary time duration, the OTFS channel model is non-fading and every symbol may be spread across the full duration and bandwidth and experiences all diversity branches of the channel. The deterministic nature of the two-dimensional OTFS channel reflects the geometry of the channel reflectors (distance and velocity).

In one embodiment the transmitter 102 includes a transmitter processor 102p to package input data into at least one N×M array of data symbols. An encoding process is then used to transmit this array of data symbols in accordance with the OTFS modulation techniques described herein. The transmitted OTFS waveforms are received by a receiver 104, which includes a receiver processor 104p. In one embodiment the receiver processor 104p utilizes information pertaining to the 2D state of the channel 100 to enable these OTFS waveforms to be decoded and recover the transmitted data symbols. Specifically, the receiver processor 104p may use an inverse of the OTFS encoding process to decode and extract this plurality of data symbols. Alternatively the correction of signals for data channel impairments can be done after the receiver has decoded and extracted the plurality of data symbols.

In some embodiments OTFS data transmission may be implemented by transforming the input N×M array of data symbols into at least one block or array of filtered OFDM symbols. This can be done, for example, using one dimensional Fourier transforms and a filtering process or algorithm. This block or array of filtered OFDM symbols may then be transformed into at least one block or array of OTFS symbols using various types of two dimensional Fourier transforms. These results will typically be stored in transmitter memory 102m. The stored results can then be communicated over wireless frequency sub-bands by various methods. For example, in one embodiment a transmitter 102c that employs a series of M narrow-band filter banks may be utilized. In this implementation the transmitter 102c produces a series of M mutually orthogonal waveforms transmitted over at least N time intervals.

In one embodiment gaps or "guard bands" in both time and frequency may be imposed to minimize the possibility of inadvertent cross talk between the various narrow-band filters and time intervals prior to transmission. Depending on the characteristics of the data channel, any such gaps or guard bands can be increased or decreased or set to zero as situations warrant.

Alternatively, the OTFS encoding process may encode the N×M array of data symbols onto a manifold compatible with symplectic analysis. The symbols may be distributed over a column time axis of length T and row frequency axis of length F, thereby producing at least one information manifold for storage in transmitter memory 102m.

The information manifold effectively holds information corresponding to the input data symbols in a form enabling them to be subsequently transformed in accordance with the desired OTFS transformation operation such as, for example, a symplectic 2D Fourier transform, a discrete symplectic 2D Fourier transform, a finite symplectic Fourier transform, and the like. In certain embodiments the data symbols may also be spread prior to being held within an information manifold.

The OTFS processor 102p may then transform the information manifold according to a 2D symplectic Fourier transform. This transformation may be effected using any of the previously discussed symplectic 2D Fourier transforms, discrete symplectic 2D Fourier transforms, and finite symplectic Fourier transforms. This operation produces at least one 2D Fourier transformed information manifold, which may be stored in transmitter memory 102m.

The OTFS transmitter 102c will typically transmit this at least one 2D Fourier transformed information manifold as a series of "M" simultaneous narrow band waveforms, each series over consecutive time intervals, until the entire 2D Fourier transformed information manifold has been transmitted. For example, the transmitter processor 102p can operate, often on a one column at a time basis, over all frequencies and times of this 2D Fourier transformed information manifold. The transmitter processor 102p can select a given column at location n (where n can vary from 1 to N) and transmit a column with a width according to a time slice of duration proportional to Tμ, where μ=1/N. Those frequencies in the column slice of this 2D Fourier transformed information manifold (e.g. frequencies corresponding to this transmitting time slice) may then be passed through a bank of at least M different, nonoverlapping, narrow-band frequency filters. This produces M mutually orthogonal waveforms. The processor 102p can then cause these resulting filtered waveforms to be transmitted, over different transmitted time intervals (e.g. one column at a time), as a plurality of at least M mutually orthogonal waveforms until an entire 2D Fourier transformed information manifold has been transmitted.

In one embodiment gaps or "guard bands" in both time and frequency may be imposed to minimize the possibility of inadvertent cross talk between the various narrow-band filters and time intervals prior to transmission. Depending on the characteristics of the data channel, any such gaps or guard bands can be increased or decreased or set to zero as situations warrant.

Each OTFS receiver 104 may then receive a channel-convoluted version of the 2D Fourier transformed information manifold transmitted by the transmitter 102. Due to distortions introduced by the channel 100, the M narrow band waveforms originally transmitted at M original frequencies may now comprise more than M narrow band waveforms at a different range of frequencies. Moreover, due to transmitted OTFS waveforms impinging various reflectors 106, the originally transmitted signals and reflections thereof may be received at different times. As a consequence, each receiver 104 will generally supersample or oversample the various received waveforms on a time-frequency grid having a finer mesh than that associated with the transmitter 102. This oversampling process is represented by FIGS. 17B-17D, which depict a receiver time-frequency grid having smaller time and frequency increments than the transmitter OTFS grid.

Each OTFS receiver 104 operates to receive the transmitted 2D Fourier transformed information manifold over time slices having durations that are generally less than or equal to the transmission time intervals employed by the transmitter 102. In one embodiment the receiver 104 analyzes the received waveforms using a receiving bank of at least M different, non-overlapping, narrow-band frequency filters. The receiver will then generally store the resoling approximation (channel convoluted version) of the originally transmitted 2D Fourier transformed information manifold in receiver memory 104m.

Once the waveforms transmitted by the transmitter 102 have been received, the receiver 104 then corrects for the convolution effect of the channel 100 in order to facilitate recovery of an estimate of the originally transmitted data symbols. The receiver 104 may effect these corrections in a number of ways.

For example, the receiver 104 may use an inverse of the 2D symplectic Fourier transform used by the transmitter 102 to transform the received waveforms into an initial approximation of the information manifold originally transmitted. Alternatively, the receiver 104 may first use information pertaining to the 2D channel state to correct the channel-convoluted approximation of the transmitted 2D Fourier transformed information manifold (stored in receiver memory). Following this correction the receiver 104 may then use the inverse of the 2D symplectic Fourier transform employed at the transmitter 102 to generate a received information manifold and subsequently extract estimated data symbols.

Although the OTFS methods described herein inherently spread any given data symbol over the entire time-frequency plane associated with a transmitter, in some embodiments it may be useful to implement an additional spreading operation to insure that the transmitted data symbols are uniformly distributed. This spreading operation may be carried out by the transmitter processor 102$p$ either prior to or after encoding the input N×M 2D array of data symbols onto the symplectic analysis compatible manifold. A number of spreading functions such as, for example, a 2D chirp operation, may be used for this purpose. In the event such a spreading operation is implemented at the transmitter 102, the receiver 104 will utilize an inverse of this spreading operation in order to decode and extract the data symbols from the various received information manifolds.

FIG. 19 illustrates transmission of a 2D Fourier transformed information manifold represented by an N×M structure over M frequency bands during N time periods of duration T$\mu$. In this example, each of the M frequency bands is represented by a given row and each different time period is represented by a given column. In the embodiment of FIG. 19 it is assumed that the OTFS transmitter is configured to transmit OTFS signals during without guard intervals over the allocated bandwidth, which encompasses the M frequency bands. The bandwidth ($\omega_0$) of each of the M frequency bands is, is 1/T$\mu$. Accordingly, if it is desired to transmit all N columns of information over a minimum time interval of N*T$\mu$, then M must have a bandwidth no larger than 1/T$\mu$ and the bandwidth used by all M filtered OTFS frequency bands cannot exceed M/T, where T is the total amount of time used to transmit all N columns of the 2D Fourier transformed information manifold.

At the receiver 104, the various 2D Fourier transformed information manifolds may be received using banks of different, nonoverlapping, narrow-band frequency filters that are generally similar to those used by the transmitter 102. Again, the receiver time slices and receiving banks of filters will generally operate with finer granularity; that is, the receiver will typically operate over smaller frequency bandwidths, and shorter time slices, but over a typically broader total range of frequencies and times. Thus the receiver bin structure will preferably oversample the corresponding transmitting time slices and transmitting banks of different, non-overlapping, narrow-band frequency filters previously used by the transmitter.

As may be appreciated with reference to FIG. 19, the OTFS transmitter will typically transmit the resulting filtered waveforms (in this example over all rows and successive columns), until the entire 2D Fourier transformed information manifold has been transmitted. However the transmitter can either transmit the successive columns (time slices) continuously and contiguously—that is without any time gaps in-between, as more of a series of continuous longer duration waveforms, or alternatively the transmitter can put some time spacing between the various successive columns, thus creating a more obvious series of waveform bursts.

Stated differently, the transmitter can transmit the resulting filtered waveforms as either: 1) a plurality of at least M simultaneously transmitted mutually orthogonal waveforms over either different consecutive transmitted time intervals; or 2) a plurality OTFS data or OTFS pilot bursts comprising at least M simultaneously transmitted mutually orthogonal waveform bursts over different transmitted intervals separated by at least one spacer time interval.

FIG. 20 shows an example of the M filtered OTFS frequency bands being simultaneously transmitted according to various smaller time slices T$\mu$. The repeating curved shapes show the center frequency for each filtered band according to $g(t \cdot e^{jk\omega_0})$. One of the transmitted bins of frequency bandwidth, which is of size 1/T and time duration T*$\mu$, is shown in more detail. Again, as previously discussed, in a preferred embodiment the OTFS receiver will use oversampling, and thus use finer granularity bins that nonetheless may extend over a broader range of times and frequencies so as to catch signals with high degrees of delay or Doppler frequency shift.

Stated differently, in some embodiments, the non-overlapping, narrow-band frequency filters used at the transmitter may be configured to pass frequencies from the various 2D Fourier transformed Information manifolds that are proportional to a filter function $g(t \cdot e^{jk\omega_0})$, where j is the square root of −1, t corresponds to a given time slice of duration T$\mu$ chosen from a 2D Fourier transformed information manifold, and k corresponds to a given row position in a given 2D Fourier transformed information manifold, where k varies between 1 and M. In this example, the bandwidth, $\omega_0$, in frequency units Hz, can be proportional to 1/T, and T=M/(allowed wireless bandwidth).

As may be appreciated from FIGS. 19 and 20, the various 2D Fourier transformed information manifolds can have overall dimensions NT$\mu$ according to a time axis and M/T according to a frequency axis, and each "cell" or "bin" in the various 2D Fourier transformed information manifold may have overall dimensions proportional to T$\mu$ according to a time axis and 1/T according to a frequency axis.

FIG. 21 provides another example of OTFS waveforms being transmitted according to various smaller time slices T$\mu$. In the illustration of FIG. 21 the amplitude or extent of modulation of the various waveforms as a function of time is also shown.

In some embodiments it may be useful to modulate the transmitted wireless OTFS waveforms using an underlying modulation signal that allows the receiver to distinguish where, on the original 2D time and frequency grid, a given received signal originated. This may, for example, assist an OTFS receiver in distinguishing the various types of received signals, and in distinguishing direct signals from various time delayed and/or frequency shifted reflected signals. In these embodiments grid, bin, or lattice locations of the originally transmitted OTFS waveforms may be distinguished by determining time and frequency related parameters of the received waveforms. For example, in the presently discussed "symplectic" implementations, where each "row" of the 2D Fourier transformed information manifold is passed through a narrow band filter that operates according to parameters such as $g(t \cdot e^{jk\omega_0})$, the "$k\omega_0$" term may enable the receiver to distinguish any given incoming OTFS waveform by its originating "column" location "t". In this case the receiver should also be able to determine the bin (grid, lattice) location of the various received waveforms by determining both the t (time related) and k (frequency related) values of the various received waveforms. These values may then be used during subsequent deconvolution of the received signals.

If further distinguishability of the bin (grid lattice) originating time and frequency origins of the received OTFS signals is desired, then an additional time and/or frequency varying modulation scheme may also be imposed on the OTFS signals, prior to transmission, to allow the OTFS receiver to further distinguish the bin (grid, lattice) origin of the various received signals.

In alternative embodiments either the information manifold or the 2D Fourier transformed information manifolds may be sampled and modulated using Dirac comb methods. The Dirac combs utilized by these methods may be, for example, a periodic tempered distribution constructed from Dirac delta functions.

Attention is now directed to FIG. 22, which provides a block diagrammatic representation of an exemplary process 2200 of OTFS transmission and reception in accordance with the present disclosure. The process 2200 begins with the packaging of data for transmission and its optional precoding to correct for known channel impairments (stage 2210). This material is then processed by a 2D Fourier Transform (such as a symplectic Fourier transform, discrete symplectic Fourier transform, or finite symplectic Fourier transform) (stage 2220). Following this processing the results are then passed through a filter bank (FB) and transmitted over a series of time intervals Tµ (stage 2230). The transmitted wireless OTFS waveforms then pass through the communications or data channel (C), where they are subject to various distortions and signal impairments (stage 2240). At the receiver, the received waveforms are received according to a filter bank at various time intervals (stage 2250). The receiver filter bank (FB*) may be an oversampled filter bank (FB*) operating according to oversampled time durations that may be a fraction of the original time intervals Tµ. This oversampling enables the received signals to be better analyzed for channel caused time delays and frequency shifts at a high degree of resolution. At a stage 2260 the received material is analyzed by an inverse 2D Fourier Transform (2D-FT$_s$) (which again may be an inverse symplectic Fourier transform, inverse discrete symplectic Fourier transform, or inverse finite symplectic Fourier transform). The results may then be further corrected for channel distortions using, for example, 2D channel state information (stage 2270). In other embodiments stage 2270 may precede stage 2260.

Further Mathematical Characterization of OTFS Modulation and Derivation of the Two-Dimensional (2D) Channel Model In what follows we further develop the OTFS communication paradigm focusing on the central role played by the Heisenberg representation and the two dimensional symplectic Fourier transform. A principal technical result of this development is a rigorous derivation of the OTFS two-dimensional channel model.

0. Introduction

Orthogonal time frequency space is a novel modulation scheme capable of being implemented by communication transceivers that converts the dynamic one dimensional wireless medium into a static two dimensional local ISI channel by putting the time and frequency dimensions on an equal footing. Among the primary benefits of an OTFS transceiver relative to a conventional transceiver are the following:

1. Fading. Elimination of fading both time and frequency selective.
2. Diversity. Extraction of all diversity branches in the channel.
3. Stationarity. All symbols experience the same distortion.
4. CSI. Perfect and efficient channel state information (CSI).

In a sense, the OTFS transceiver establishes a virtual wire through a communication medium, thus allowing the application of conventional wired DSP technologies in the wireless domain. Embodiments of the OTFS transceiver are based on principles from representation theory, generalizing constructions from classical Fourier theory. On the operational level, OTFS may be roughly characterized as an application of the two dimensional Fourier transform to a block of filtered OFDM symbols. OTFS is a true two dimensional time-frequency modulation, and may incorporate both two dimensional time-frequency filtering and two dimensional equalization techniques. In what follows we provide a formal mathematical development of the OTFS transceiver, focusing on a rigorous derivation of the two dimensional channel model.

OTFS and Lattices

We first choose an undersampled time-frequency lattice, that is, a two dimensional lattice of density smaller or equal than 1. The undersampling condition is essential for perfect reconstruction, however, it seems to limit the delay-Doppler resolution of the channel acquisition. In contrast, radar theory amounts to choosing an oversampled time frequency lattice of density greater or equal than 1 where the oversampling condition is essential for maximizing the delay-Doppler resolution of target measurement. As it turns out, the symplectic (two dimensional) Fourier transform intertwines between communication and radar lattices. The OTFS communication paradigm is to multiplex information symbols on an oversampled high resolution radar lattice and use the symplectic Fourier transform together with two dimensional filtering to convert back to communication coordinates. This allows OTFS to reap the benefits of both worlds—high resolution delay-Doppler channel state measurement without sacrificing spectral efficiency. In particular, the OTFS channel model may be thought of as a high resolution delay-Doppler radar image of the wireless medium.

The Wireless Channel

In order to understand OTFS, it is beneficial to understand the wireless channel as a mathematical object. Let H=L$^2$(R) denote the vector space of "physical" waveforms defined on the time domain. The physics of the wireless medium is governed by the phenomena of multipath reflection, that is, the transmitted signal is propagating through the atmosphere and reflected from various objects in the surrounding. Some of the objects, possibly including the transmitter and the receiver, are moving at a non-zero velocity. Consequently, (under some mild "narrow band" assumption) the received signal is a superposition of time delays and Doppler shifts of the transmitted signal where the delay in time is caused by the excess distance transversed by the reflected waveform and the Doppler shift is caused by the relative velocity between the reflector and the transmitting and/or receiving antennas. Mathematically, this amounts to the fact that the wireless channel can be expressed as a linear transformation C:H→H realized as a weighted superposition of multitude of time delays and Doppler shifts, namely:

$$C(\varphi)(t) = \int_{t,v}\int h(\tau, v)e^{2\pi i v(t-\tau)}\varphi(t-\tau)d\tau dv, \quad (0.1)$$

for every transmit waveform φ∈H. From Equation (0.1) one can see that the channel C is determined by the function h that depends on two variables τ and ν, referred to as delay and Doppler. The pair (τ,ν) can be viewed as a point in the plane V=R$^2$, referred to as the delay Doppler plane. Consequently, h is a kind of a two dimensional (delay Doppler) impulse response characterizing the wireless channel. However, one should keep in mind that this terminology is misleading since the action of h given by (0.1) is not a convolution action.

Fading

One basic physical phenomena characteristic to the wireless channel is fading. The phenomena of fading corresponds to local attenuation in the energy profile of the received signal as measured over a specific dimension. It is customary to consider two kind of fadings: time selective fading and frequency selective fading. The first is caused by destructive superposition of Doppler shifts and the second is caused by destructive superposition of time delays. Since the wireless channel consists of combination of both time delays and Doppler shifts it exhibits both types of fading. Mitigating the fading phenomena is a significant motivation behind the development of the OTFS transceiver.

The Heisenberg Representation

One key observation is that the delay Doppler channel representation given in Equation (0.1) is the application of a fundamental mathematical transform, called the Heisenberg representation, transforming between functions on the delay Doppler plane V and linear operators on the signal space H. To see this, let us denote by $L_\tau$ and $M_\nu$ are the operations of time delay by τ and Doppler shift by ν respectively, that is:

$L_\tau(\varphi)(t)=\varphi(t-\tau)$, $M_\nu(\varphi)(t)=e^{2\pi i \nu t}\varphi(t)$, for every φ∈H. Using this terminology, we can rewrite channel equation (0.1) in the following form:

$$C(\varphi)(t) = \int_{t,v}\int h(\tau, v)L_\tau M_v(\varphi)d\tau dv \quad (0.2)$$
$$= \left(\int_{t,v}\int h(\tau, v)L_\tau M_v d\tau dv\right)(\varphi).$$

Let us define the Heisenberg representation to be the transform taking a function a:V→C to the linear operator Π(a):H→H, given by:

$$\prod(a) = \int_{t,v}\int a(\tau, v)L_\tau M_v d\tau dv. \quad (0.3)$$

We refer to the function a as the delay Doppler impulse response of the operator H(a). Taking this perspective, we see that the wireless channel is an application of the Heisenberg representation to a specific function h on the delay Doppler plane. This higher level of abstraction establishes the map Π as the fundamental object underlying wireless communication. In fact, the correspondence a↔Π(a) generalizes the classical correspondence between a stationary linear system and a one dimensional impulse response to the case of arbitrary time varying systems (also known as linear operators). In this regard, the main property of the Heisenberg representation is that it translates between composition of linear operators and an operation of twisted convolution between the corresponding impulse responses. In more details, if:

A=Π(a),

B=Π(b), then we have:

$A \circ B = \Pi(a *_t b)$, (0.4)

where $*_t$ is a non commutative twist of two dimensional convolution. Equation (0.4) is key to the derivation of the two dimensional channel model—the characteristic property of the OTFS transceiver.

The OTFS Transceiver and the 2D Channel Model

The OTFS transceiver provides a mathematical transformation having the effect of converting the fading wireless channel into a stationary two dimensional convolution channel. We refer to this property as the two dimensional channel model.

Formally, the OTFS transceiver may be characterized as a pair of linear transformations (M,D) where M is termed a modulation map and D is termed a demodulation map and is the inverse of M. According to the OTFS paradigm the information bits are encoded as a complex valued function on V which periodic with respect to a lattice $\Lambda^\perp \subset V$ called the reciprocal communication lattice. Note that the term "reciprocal" is used to suggest a type of duality relation between $\Lambda^\perp$ and a more conventional lattice Λ, called the primal communication lattice. If we denote by $C(V)_{\Lambda^\perp}$ the vector space of $\Lambda^\perp$-periodic functions on V then the OTFS modulation is a linear transformation:

$M:C(V)_{\Lambda^\perp} \to H$. (0.5)

Geometrically, one can think of the information as a function on a two dimensional periodic domain (a donut) obtained by folding V with respect to the lattice $\Lambda^\perp$. Respectively, the demodulation map is a linear transformation acting in the opposite direction, namely:

$D:H \to C(V)_{\Lambda^\perp}$. (0.6)

The precise mathematical meaning of the two dimensional channel model is that given an information function $x \in C(V)_{\Lambda^\perp}$, we have:

$D \circ C \circ M(x) = c * x$, (0.7)

where * stands for periodic convolution on the torus and the function c is a periodization with respect to the reciprocal lattice $\Lambda^\perp$ of the delay Doppler impulse response h of the wireless channel, that is:

$c = \text{per}_{\Lambda^\perp}(h)$. (0.8)

Equations (0.7) and (0.8) encodes the precise manner of interaction between the OTFS transceiver and the wireless channel.

The remainder of this explanation of OTFS method and the OTFS transceiver is organized as follows:

Section 1 discusses several basic mathematical structures associated with the delay Doppler plane V. We begin by introducing the symplectic form on V which is an antisymmetric variant of the more familiar Euclidean form used in classical signal processing. We than discuss lattices which are two dimensional discrete subdomains of V. We focus our attention to the construction of the reciprocal lattice. The reciprocal lattice plays a pivotal role in the definition of the OTFS transceiver. We than proceed to discuss the dual object of a lattice, called a torus, which is a two dimensional periodic domain obtained by folding the plain with respect to a lattice.

Section 2 discusses the symplectic Fourier transform, which is a variant of the two dimensional Fourier transform defined in terms of the symplectic form on V. We discuss three variants of the symplectic Fourier transform: the continuos, the discrete and the finite. We explain the relationships between these variants.

Section 3 discusses the Heisenberg representation and its inverse—the Wigner transform. In a nutshell, the Heisenberg representation is the structure that encodes the precise algebraic relations between the operations of time delay and Doppler shifts. We relate the Wigner transform to the more familiar notions of the ambiguity function and the cross ambiguity function. We conclude with a formulation of the fundamental channel equation.

Section 4 discusses the continuos variant of the OTFS transceiver. We begin by specifying the parameters defining the OTFS transceiver. Then we proceed to define the modulation and demodulation maps. We conclude the section with a derivation of the two dimensional channel model from first principles.

Section 5 discusses the finite variant of the OTFS transceiver. In a nutshell, the finite variant is obtained from the continuos variant by sampling the reciprocal torus along finite uniformly distributed subtorus. We define the finite OTFS modulation and demodulation maps. We then formulate the finite version of the two dimensional channel model, explaining the finite two dimensional impulse response is the restriction of the continuos one to the finite subtorus. We conclude this section with an explicit interpretation of the modulation formula in terms of classical DSP operations.

1. The Delay-Doppler Plane
   1.1 the Symplectic Plane

The delay Doppler plane is a two dimensional vector space over the real numbers. Concretely, we take $V=\mathbb{R}^2$ where the first coordinate is delay, denoted by $\tau$ and the second coordinate is Doppler, denoted by $\nu$. The delay Doppler plane is equipped with an intrinsic geometric structure encoded by a symplectic form (also called symplectic inner product or symplectic pairing). The symplectic form is a pairing $\omega: V \times V \to \mathbb{R}$ defined by the determinant formula:

$$\omega(v', v) = -\det \begin{bmatrix} \tau & \tau' \\ \nu & \nu' \end{bmatrix} = \nu\tau' - \tau\nu', \quad (1.1)$$

where $v=(\tau,\nu)$ and $v'=(\tau',\nu')$. Note that the symplectic form, in contrast to its Euclidean counterpart, is anti-symmetric, namely $\omega(v,v')=-\omega(v',v)$ for every $v,v' \in V$. Consequently, the symplectic product of a vector with itself is always equal zero, that is $\omega(v,v)=0$, for every $v \in V$. As it turns out, the fabric of time and frequency is governed by a symplectic structure.

1.1.1 Functions on the Plane.

We denote by $C(V)$ the vector space of complex valued functions on V. We denote by * the operation of linear convolution of functions on V. Given a pair of functions $f, g \in C(V)$, their convolution is defined by:

$$f * g(v) = \int_{v_1+v_2=v} f(v_1)g(v_2) \quad (1.2)$$

$$= \int_{v' \in V} f(v')g(v-v')dv',$$

for every $v \in V$.

1.2 Lattices

A lattice $\Lambda \subset V$ is a commutative subgroup isomorphic to $\mathbb{Z}^2$ defined as follows:

$$\Lambda = \mathbb{Z}v_1 \oplus \mathbb{Z}v_2$$
$$= \{av_1 + bv_2 : a, b \in \mathbb{Z}\},$$

where $v_1, v_2 \in V$ are linear independent vectors. In words, $\Lambda$ consists of all integral linear combinations of the vectors $v_1$ and $v_2$. See FIG. 23. The vectors $v_1$ and $v_2$ are called generators of the lattice. The volume of $\Lambda$ is, by definition, the volume of a fundamental domain. One can show that:

$$\text{vol}(\Lambda)=|\omega(v_1,v_2)|. \quad (1.3)$$

when $\text{vol}(\Lambda) \geq 1$ the lattice is called undersampled and when $\text{vol}(\Lambda) \leq 1$ the lattice is called oversampled. Finally, in case $\text{vol}(\Lambda)=1$ the lattice is called critically sampled.

Example 1.1 (Standard communication lattice). Fix parameters $T \geq 0$ and $\mu \geq 1$.
Let:

$$\Lambda_{T,\mu} = \mathbb{Z}T\mu \oplus \mathbb{Z}1/T \quad (1.4)$$

$$= \{(K \cdot T\mu + L \cdot 1/T): K, L \in \mathbb{Z}\}.$$

We have that $\text{vol}(\Lambda_{T,\mu})=\mu$. We refer to $\Lambda_{T,\mu}$ as the standard communication lattice.

1.2.1 Reciprocal lattice. Given a lattice $\Lambda \subset V$, its orthogonal complement lattice is defined by:

$$\Lambda^{\perp} = \{v \in V : \omega(v,\lambda) \in \mathbb{Z} \text{ for every } \lambda \in \Lambda\}. \quad (1.5)$$

In words, $\Lambda^{\perp}$ consists of all vectors in V such that their symplectic pairing with every vector in $\Lambda$ is integral. One can show that $\Lambda^{\perp}$ is indeed a lattice. We refer to $\Lambda^{\perp}$ as the reciprocal lattice of $\Lambda$. One can show that:

$$\text{vol}(\Lambda^{\perp})=1/\text{vol}(\Lambda), \quad (1.6)$$

which implies that $\Lambda$ is undersampled if and only if $\Lambda^{\perp}$ is oversampled. This means that reciprocity interchanges between coarse (undersampled) lattices and fine (oversampled) lattices. Another attribute concerns how lattice inclusion behaves under reciprocity. Given a pair consisting of a lattice $\Lambda \subset V$ and a sublattice $\Lambda_0 \in \Lambda$, one can show that the inclusion between the reciprocals is reversed, that is:

$$\Lambda^{\perp} \subset \Lambda_0^{\perp}. \quad (1.7)$$

Example 1.2 Consider the standard communication lattice $\Lambda_{T,\mu}$. Its reciprocal is given by:

$$(\Lambda_{T,\mu})^{\perp} = \mathbb{Z}T \oplus \mathbb{Z}1/T\mu. \quad (1.8)$$

See FIGS. 24A and 24B, which respectively illustrate a standard communication lattice and the reciprocal of the standard communication lattice. Indeed, we have that:

$$\omega\left(\begin{bmatrix} KT \\ L/T\mu \end{bmatrix}, \begin{bmatrix} K'T\mu \\ L'/T \end{bmatrix}\right) = LK' - KL' \in Z.$$

Note that $\text{vol}(\Lambda_{T,\mu})^{-1} = 1/\mu$ which means that as the primal lattice becomes sparser, the reciprocal lattice becomes denser.

1.2.2 Functions on a lattice. We denote by $C(\Lambda)$ the vector space of complex valued functions on the lattice. We denote by $R^\Lambda : C(V) \to C(\Lambda)$ the canonical restriction map, given by:

$$R^\Lambda(f)(\lambda) = f(\lambda),$$

for every $f \in C(V)$ and $\lambda \in \Lambda$. We denote by * the convolution operations between functions on $\Lambda$. Given $f, g \in C(\Lambda)$, their convolutions is defined by:

$$f * g(\lambda) = \sum_{\lambda_1 + \lambda_2 = \lambda} f(\lambda_1) g(\lambda_2) \qquad (1.9)$$
$$= \sum_{\lambda' \in \Lambda} f(\lambda') g(\lambda - \lambda'),$$

for every $\lambda \in \Lambda$.

1.3 Tori A torus $Z$ is a two dimensional periodic domain that constitutes the geometric dual of a lattice $\Lambda$. Formally, $Z$ is the continuos group obtained as the quotient of the vector space $V$ by the lattice $\Lambda$, namely:

$$Z = V/\Lambda. \qquad (1.10)$$

In particular, a point $z \in Z$ is by definition a $\Lambda$-coset in $V$, namely:

$$z = v + \Lambda, \qquad (1.11)$$

for some $v \in V$. An alternative, albeit less canonical, way to construct $Z$ is to glue opposite faces of a fundamental domain of $\Lambda$. Geometrically, $Z$ has the shape of a "donut" obtained by folding the plane $V$ with respect to the lattice $\Lambda$. We refer to $Z$ as the torus associated with $\Lambda$ or sometimes also as the dual of $\Lambda$. Note that a torus is the two dimensional counterpart of a circle, where the second is obtained by folding the line R with respect to a one dimensional lattice $ZT \subset R$.

Example 1.3 (standard communication torus). As shown in FIG. 25, the torus associated with the standard communication lattice $\Lambda_{T,\mu}$ is given by:

$$Z_{T,\mu} = V/\Lambda_{T,\mu} \qquad (1.12)$$
$$= R/ZT\mu \oplus R/Z1/T; [0, T\mu) \times 0, 1/T).$$

Geometrically, $Z_{T,\mu}$ is the Cartesian product of two circles; one of diameter $T\mu$ and the other of diameter $1/T$. We refer to $Z_{T,\mu}$ as the standard communication torus.

1.3.1 Functions on tori. We denote by $C(Z)$ the vector space of complex valued functions on a torus $Z = V/\Lambda$. A function on $Z$ is naturally equivalent to a function $f : V \to C$ periodic with respect to translations by elements of the lattice $\Lambda$, that is:

$$f(v + \lambda) = f(v), \qquad (1.13)$$

for every $v \in V$ and $\lambda \in \Lambda$. Hence, the vector space of functions on $Z$ coincides with the subspace of $\Lambda$ periodic functions on $V$, that is, $C(Z) = C(V)_\Lambda$. Consequently, we have a natural periodization map $R_\Lambda : C(V) \to C(Z)$, given by:

$$R_\Lambda(f)(v) = \sum_{\lambda \in \Lambda} f(v + \lambda), \qquad (1.14)$$

for every $f \in C(V)$ and $v \in V$. We denote by * the operation of cyclic convolution of functions on $Z$. Given a pair of functions $f, g \in C(Z)$, their convolution is defined by:

$$f * g(v) = \int_{v_1 + v_2 = v} f(v_1) g(v_2) \qquad (1.15)$$
$$= \int_{v' \in Z} f(v') g(v - v') dv',$$

for every $v \in V$. Note that integration over the torus $Z$ amounts to integration over a fundamental domain of the lattice $\Lambda$.

1.4 Finite Tori A finite torus $Z_0$ is a domain associated with a pair consisting of a lattice $\Lambda \subset V$ and a sublattice $\Lambda_0 \subset \Lambda$. Formally, $Z_0$ is the finite group defined by the quotient of the lattice $\Lambda$ by the sublattice $\Lambda_0$, that is:

$$Z_0 = \Lambda/\Lambda_0. \qquad (1.16)$$

In particular, a point $z \in Z_0$ is a $\Lambda_0$-coset in $\Lambda$, namely:

$$z = \lambda + \Lambda_0, \qquad (1.17)$$

for some $\lambda \in \Lambda$. Geometrically, $Z_0$ is a finite uniform sampling of the continuos torus $Z = V/\Lambda_0$ as we have a natural inclusion:

$$\Lambda/\Lambda_0 \circ V/\Lambda_0. \qquad (1.18)$$

Example 1.4 (The standard communication finite torus). Consider the standard communication lattice $\Lambda_{T,\mu}$. Fix positive integers $n, m \in N^{\geq 1}$. Let $(\Lambda_{T,\mu})_{n,m}$ be the sublattice defined by:

$$(\Lambda_{T,\mu})_{n,m} = ZnT\mu \oplus Zm/T. \qquad (1.19)$$

The finite torus associated with $(\Lambda_{T,\mu})_{n,m} \subset \Lambda_{T,\mu}$ is given by (see FIG. 26):

$$Z_{T,\mu}^{m,n} = \Lambda_{T,\mu}/(\Lambda_{T,\mu})_{n,m} \qquad (1.20)$$
$$= ZT\mu/ZnT\mu \times Z1/T/Zm/T;$$
$$Z/nZ \times Z/mZ.$$

Concluding, the finite torus $Z_{T,\mu}^{m,n}$ is isomorphic to the Cartesian product of two cyclic groups; one of order n and the other of order m. We refer to $Z_{T,\mu}^{m,n}$ as the standard communication finite torus.

1.4.1 Functions on finite tori. We denote by $C(Z_0)$ the vector space of complex valued functions on a finite torus $Z_0 = \Lambda/\Lambda_0$. A function on $Z_0$ is naturally equivalent to a function $f : \Lambda \to C$ that is periodic with respect to translations by the sublattice $\Lambda_0$, that is:

$$f(\lambda + \lambda_0) = f(\lambda), \qquad (1.21)$$

for every $\lambda \in \Lambda$ and $\lambda_0 \in \Lambda_0$. Hence, the vector space $C(Z_0)$ coincides with the subspace of $\Lambda_0$ periodic functions on $\Lambda$, that is, $C(Z_0)=C(\Lambda)_{\Lambda_0}$. Consequently, we have a natural periodization map $R_{\Lambda_0}:C(\Lambda) \to C(Z_0)$ given by:

$$R_{\Lambda_0}(f)(\lambda) = \sum_{\lambda_0 \in \Lambda_0} f(\lambda+\lambda_0), \quad (1.22)$$

for every $f \in C(\Lambda)$ and $\lambda \in \Lambda$. We denote by $*$ the operation of finite cyclic convolution of functions on $Z_0$. Given a pair of functions $f, g \in C(Z_0)$, their convolution is defined by:

$$f*g(\lambda) = \sum_{\lambda_1+\lambda_2=\lambda} f(\lambda_1)g(\lambda_2) \quad (1.23)$$
$$= \sum_{\lambda' \in Z} f(\lambda')g(\lambda-\lambda')$$

for every $v \in V$. Note that summation over the finite torus $Z_0$ amounts to summation over a fundamental domain of the sublattice $\Lambda_0$ in the superlattice $\Lambda$.

1.4.2 Reciprocity between finite tori. Given a finite torus $Z_0 = \Lambda/\Lambda_0$, we denote by $Z^\perp$ the finite torus associated with the reciprocal pair $\Lambda^\perp \subset \Lambda_0^\perp$, that is:

$$Z_0^\perp = \Lambda_0^\perp/\Lambda^\perp. \quad (1.24)$$

We refer to $Z_0^\perp$ as the reciprocal finite torus. Although different as sets, one can show that, in fact, $Z_0$ and $Z_0^\perp$ are isomorphic as finite groups.

Example 1.5 Consider the pair consisting of the standard communication lattice $\Lambda_{T,\mu}$, and the sublattice $(\Lambda_{T,\mu})_{m,n} \in \Lambda_{T,\mu}$. As shown above, the finite torus associated with $(\lambda_{T,\mu})_{n,m} \in \Lambda_{T,\mu}$ is isomorphic to:

$$Z_0; Z/Zn \times Z/Zm.$$

The reciprocal lattices are given by:

$$(\Lambda_{T,\mu})^\perp = ZT \oplus Zl/T\mu,$$

$$(\Lambda_{T,\mu})_{m,n}^\perp = ZT/m \oplus Zl/nT\mu.$$

Consequently, the reciprocal finite torus is given by:

$$Z_0^\perp = (\lambda_{T,\mu})_{m,n}^\perp / (\Lambda_{T,\mu})^\perp$$
$$= Z(T/m)/ZT \times Z(1/nT\mu)/Z(1/T\mu);$$
$$Z/mZ \times Z/nZ$$

We see that $Z_0$ and $Z_0^\perp$ are isomorphic as finite groups as both groups are isomorphic to the Cartesian product (albeit in different order) of two cyclic groups, one of order n and the other of order m.

2 The Symplectic Fourier Transform

In this section we introduce a variant of the two dimensional Fourier transform, associated with the symplectic form, called the symplectic Fourier transform. Let $\psi:R \to C^x$ denote the standard complex exponential function:

$$\psi(z)=e^{2\pi i z}, \quad (2.1)$$

for every $z \in R$.

2.1 Properties of the Symplectic Fourier Transform

The symplectic Fourier transform is a variant of the two dimensional Fourier transform that is associated with the symplectic form $\omega$. Formally, the symplectic Fourier transform is the linear transformation $SF:C(V) \to C(V)$ defined by the rule:

$$SF(f)(u) = \int_{v \in V} \psi(-\omega(u,v))f(v)dv \quad (2.2)$$
$$= \int_{\tau,v \in R} \psi(tv-f\tau)f(\tau,v)d\tau dv,$$

for every $f \in C(V)$ and $u=(t,f)$. We refer to the coordinates $(t,f)$ of the transformed domain as time and frequency, respectively.

In general, the inverse transform of (2.2) is given by the formula:

$$SF^{-1}(f)(v) = \int_{u \in V} \psi(+\omega(u,v))f(u)du \quad (2.3)$$
$$= \int_{\tau,f \in R} \psi(\tau f - vt)f(t,f)dtdf$$

However, since $\omega$ is anti-symmetric, we have that $SF^{-1}=SF$. Namely, the symplectic Fourier transform is equal to its inverse.

2.1.1 Interchanging property. The symplectic Fourier transform interchanges between function multiplication and function convolution as formulated in the following proposition.

Proposition 2.1 (Interchanging property). The following conditions hold:

$$SF(f \cdot g)=SF(f)*SF(g),$$

$$SF(f*g)=SF(f) \cdot SF(g), \quad (2.4)$$

for every $f,g \in C(V)$.

In fact, the interchanging property follows from a more fundamental property that concerns the operations of two dimensional translation and symplectic modulation.

Translation: given a vector $v_0 \in V$, define translation by $v_0$ to be the linear transformation $L_{v_0}:C(V) \to C(V)$, given by:

$$L_{v_0}(f)(v)=f(v-v_0), \quad (2.5)$$

for every $f \in C(V)$.

Modulation: given a vector $v_0 \in V$, define symplectic modulation by $v_0$ to be the linear transformation $M_{v_0}:C(V) \to C(V)$, given by:

$$M_{v_0}(f)(v)=\psi(\omega(v_0,v))f(v), \quad (2.6)$$

for every $f \in C(V)$.

Perhaps the most fundamental property of the symplectic Fourier transform is that it interchanges between translation and symplectic modulation. This property is formulated in the following proposition.

Proposition 2.2 (Interchanging translation with symplectic modulation). The following conditions hold:

$$SF \circ L_{v_0} = M_{v_0} \circ SF,$$

$$SF \circ M_{v_0} = L_{v_0} \circ SF,$$

for every $v_0 \in V$.

2.2 the Discrete Symplectic Fourier Transform

The discrete symplectic Fourier transform relates between functions of two discrete variables and functions of two continuos periodic variables. The formal definition assumes a choice of a lattice $\Lambda \subset V$. Let $\Lambda^\perp \subset V$ be the reciprocal lattice and let $Z^\perp$ denote the torus associated with $\Lambda^\perp$, that is:

$$Z^\perp = V/\Lambda^\perp.$$

We refer to $Z^\perp$ as the reciprocal torus. The discrete symplectic Fourier transform is the linear transformation $SF_\Lambda:C(\Lambda) \to C(Z^\perp)$ given by:

$$SF_\Lambda(f)(\lambda) = c \cdot \int_{\lambda \in \Lambda} \psi(-\omega(u,\lambda))f(\lambda), \qquad (2.7)$$

for every $f \in C(\Lambda)$ and $u \in V$ where c is a normalization coefficient taken to be $c = vol(\Lambda)$. Note, that fixing the value of $\lambda \in \Lambda$, the function $\psi(-\omega(u,\lambda))f(\lambda)$ is periodic with respect to the reciprocal lattice hence is a function on the reciprocal torus. The inverse transform $SF_\Lambda^{-1}:C(Z^\perp) \to C(\Lambda)$ is given by:

$$SF_\Lambda^{-1}(f)(\lambda) = \int_{u \in Z^\perp} \psi(-\omega(\lambda, u))f(u)du, \qquad (2.8)$$

for every $f \in C(\Lambda)$. Note that taking the integral over the torus $Z^\perp$ is equivalent to integrating over a fundamental domain of the lattice $\Lambda^\perp$.

2.2.1 Discrete interchanging property. The discrete symplectic Fourier transform interchanges between function multiplication and function convolution as formulated in the following proposition.

Proposition 2.3 (Discrete interchanging property). The following conditions hold:

$$SF_\Lambda(f \cdot g) = SF_\Lambda(f) * SF_\Lambda(g), \qquad (2.9)$$

$$\frac{1}{\sqrt{c}}SF_\Lambda(f * g) = \frac{1}{\sqrt{c}}SF_\Lambda(f) \cdot \frac{1}{\sqrt{c}}SF_\Lambda(g), \qquad (2.10)$$

for every $f,g \in C(\Lambda)$ where * stands for periodic convolution.

2.2.2 COMpatibility with the continuous transform. The continuos and discrete symplectic Fourier transforms are compatible. The compatibility relation is formulated in the following Theorem.

Theorem 2.4 (discrete-continuos compatibility relation). We have:

$$SF_\Lambda \circ R^\Lambda = R_\Lambda \perp \circ SF, \qquad (2.11)$$

$$SF_\Lambda^{-1} \circ R_\Lambda \perp = R^\Lambda \circ SF^{-1}, \qquad (2.12)$$

Stated differently, Equation (2.11) provides that taking the continuos Fourier transform of a function $f$ and than periodizing with respect to translations by the reciprocal lattice $\Lambda^\perp$ is the same as first restricting $f$ to the lattice $\Lambda$ and then taking the discrete Fourier transform.

2.3 the Finite Symplectic Fourier Transform

The finite symplectic Fourier transform relates functions of two finite periodic variables. The formal definition assumes a pair consisting of a lattice $\Lambda \subset V$ and a sublattice $\Lambda_0 \in \Lambda$. We denote by $Z_0$ the finite torus associated with this pair, that is:

$Z_0 = \Lambda/\Lambda_0$.

Let $\Lambda^\perp$ and $\Lambda_0^\perp$ be the corresponding reciprocal lattices. We denote by $Z^\perp$ the finite torus associated with the reciprocal pair, that is:

$Z_0^\perp = \Lambda_0^\perp/\Lambda^\perp$.

The finite symplectic Fourier transform is the linear transformation $SF_{Z_0}:C(Z_0) \to C(Z_0^\perp)$ defined by the rule:

$$SF_{Z_0}(f)(\mu) = c \cdot \sum_{\lambda \in Z_0} \psi(-\omega(\mu,\lambda))f(\lambda), \qquad (2.13)$$

for every $f \in C(Z_0)$ and $\mu \in \Lambda_0^\perp$ where c is a normalization coefficient taken to be $c = vol(\Lambda)$. The inverse transform $SF_{Z_0}^{-1}:C(Z_0) \to C(Z_0)$ is given by:

$$SF_{Z_0}^{-1}(f)(\lambda) = \frac{1}{c_0} \cdot \sum_{\mu \in Z_0^\perp} \psi(-\omega(\lambda, \mu))f(\mu), \qquad (2.14)$$

for every $f \in C(Z_0)$ and $\lambda \in \Lambda$ where $c_0$ is a normalization coefficient taken to be $c_0 = vol(\Lambda_0)$.

2.3.1 Finite interchanging property. The finite symplectic Fourier transform interchanges between function multiplication and function cyclic convolution as formulated in the following proposition.

Proposition 2.5 (Discrete interchanging property). The following conditions hold:

$$\frac{c}{c_0}SF_{Z_0}(f \cdot g) = \frac{c}{c_0}SF_{Z_0}(f) * \frac{c}{c_0}SF_{Z_0}(g), \qquad (2.15)$$

$$\frac{1}{c}SF_{Z_0}(f * g) = \frac{1}{c}SF_{Z_0}(f) \cdot \frac{1}{c}SF_{Z_0}(g), \qquad (2.16)$$

for every $f,g \in C(Z_0)$ where * stands for finite cyclic convolution.

Note that the normalization coefficient $c/c_0$ in equation (2.15) is equal the number of points in the finite torus $Z_0$.

2.3.2 Compatibility with the discrete transform. The discrete and finite symplectic Fourier transforms are compatible. The compatibility relation is formulated in the following Theorem.

Theorem 2.6. We have:

$$SF_{Z_0} \circ R_{\Lambda_0} = R^{\Lambda_0 \perp} \circ SF_\Lambda, \qquad (2.17)$$

$$SF_{Z_0}^{-1} \circ R^{\Lambda_0 \perp} = R_{\Lambda_0} \circ SF_\Lambda^{-1}, \qquad (2.18)$$

In plain language, Equation (2.17) states that taking the discrete symplectic Fourier transform of a function $f$ on a lattice $\Lambda$ and than restricting to the reciprocal lattice $\Lambda_0^\perp$ is the same as first periodizing $f$ with respect to translations by the sublattice $\Lambda_0$ and than taking the finite Fourier transform.

Example 2.7. Consider the standard communication lattice $\Lambda_{T,\mu}$ and the sublattice $(\Lambda_{T,\mu})_{n,m}$. We have the following isomorphisms:

$Z_0; Z/nZ \times Z/mZ$, $Z_0^\perp; Z/mZ \times Z/nZ$.

In terms of these realizations the finite symplectic Fourier transform and its inverse take the following concrete forms:

$$SF_{Z_0}(f)(k, l) = \mu \sum_{K=0}^{n-1}\sum_{L=0}^{m-1} \psi(kL - lK)f(K, L), \qquad (2.19)$$

$$SF_{Z_0}^{-1}(f)(K, L) = \frac{1}{mn\mu} \sum_{k=0}^{m-1}\sum_{l=0}^{n-1} \psi(Kl - Lk)f(k, l), \qquad (2.20)$$

where in the first equation $k \in [0,m-1]$, $l \in [0,n-1]$ and in the second equation $K \in [0,n-1]$, $L \in [0,m-1]$. Note the minus sign in the Fourier exponent due to the symplectic pairing.

3 Heisenberg Theory

Let H denote the Hilbert space of square integrable complex functions on the real line R. We denote the parameter of the line by t and refer to it as time. The inner product on H is given by the standard formula:

$$\langle f,g \rangle = \int_{x \in R} \overline{f(x)} g(x) dx, \quad (3.1)$$

We refer to H as the signal space and to functions in the signal space as waveforms. Heisenberg theory concerns the mathematical structures underlying the intricate interaction between the time and frequency dimensions. In a nutshell, the theory study the algebraic relations between two basic operations on functions: time delay and Doppler shift.

3.1 Time Delay and Doppler Shift

The operations of time delay and Doppler shift establish two one parametric families of Unitary transformations on H.

3.1.1 Time delay. Given a real parameter $\tau \in R$ the operation of time delay by $\tau$ is a linear transformation $L_\tau : H \to H$ given by $$L_\tau(f)(t) = f(t-\tau), \quad (3.2)$$

for every $f \in H$ and $t \in R$. One can show that $L_\tau$ is a Unitary transformation, namely it preserves the inner product:

$$\langle L_\tau f, L_\tau g \rangle = \langle f,g \rangle,$$

for every $f, g \in H$. More over, the family of transformation $\{L_\tau : \tau \in R\}$ satisfies:

$$L_{\tau_1 + \tau_2} = L_{\tau_1} \circ L_{\tau_2},$$

for every $\tau_1, \tau_2 \in R$. In particular, the operations of time delay commute with one another, that is, $L_{\tau_1} \circ L_{\tau_2} = L_{\tau_2} \circ L_{\tau_1}$.

3.1.2 Doppler shift. Given a real parameter $v \in R$ the operation of Doppler shift by $v$ is a linear transformation $M_v : H \to H$ given by $$M_v(f)(t) = \psi(vt)f(t), \quad (3.3)$$

for every $f \in H$ and $t \in R$. Recall that $\psi$ stands for the standard complex exponential function $\psi(z) = e^{2\pi i z}$. One can show that $M_v$ is a Unitary transformation, namely it preserves the inner product:

$$\langle M_v f, M_v g \rangle = \langle f,g \rangle,$$

for every $f, g \in H$. More over, the family of transformation $\{M_v : v \in R\}$ satisfies:

$$M_{v_1 + v_2} = M_{v_1} \circ M_{v_2},$$

for every $v_1, v_2 \in R$. In particular, the operations of time delay commute with one another, that is, $M_{v_1} \circ M_{v_2} = M_{v_2} \circ M_{v_1}$.

3.2 the Heisenberg Representation

The Heisenberg representation is a mathematical structure unifying the two operations of time delay and Doppler shift. The main difficulty is that these operations do not commute with one another, instead they satisfy the following condition:

$$L_\tau M_v = \psi(-\tau v) M_v L_\tau. \quad (3.4)$$

The starting point is to consider the unified delay-Doppler linear transformation:

$$\pi(\tau, v) = L_\tau M_v, \quad (3.5)$$

for every pair of real parameters $\tau, v \in R$. In this representation, the ordered pair $(\tau, v)$ is considered as a point in the delay Doppler plane V. One can show that $\pi(\tau, v)$ is a Unitary transformation as composition of such. The two dimensional family of transformations $\{\pi(v) : v \in V\}$ defines a linear transformation $\Pi : C(V) \to Hom(H,H)$, given by:

$$\Pi(f) = \int_{v \in V} f(v) \pi(v) dv, \quad (3.6)$$

for every $f \in C(V)$, where the range of $\Pi$ is the vector space of linear transformations from H to itself which we denote by Hom(H,H). In words, the map $\Pi$ takes a function on the delay Doppler plane and send it to the linear transformation given by weighted superposition of delay-Doppler transformations where the weights are specified by the values of the function. The map $\Pi$ is called the Heisenberg representation. A fundamental fact which we will not prove is that the map $\Pi$ is essentially an isomorphism of vector spaces. Hence it admits an inverse $\Pi^{-1} : Hom(H,H) \to C(V)$ called the Wigner transform. The Wigner transform is given by:

$$\Pi^{-1}(A)(v) = Tr(\pi(v)^H A). \quad (3.7)$$

for every $A \in Hom(H,H)$ and $v \in V$. The Heisenberg representation and the Wigner transform should be thought of as a "change of coordinates" converting between functions on the delay Doppler plane and linear transformations on the signal space (which may be represented using matrices). To summarize, a linear transformation $A \in Hom(H,H)$ admits a unique expansion as a superposition of delay-Doppler transformations. The coefficients in this expansion are given by the function $a = \Pi^{-1}(A)$. The function $a$ is refereed to as the delay-Doppler impulse response of the transformation A. The Heisenberg formalism generalizes the classical framework of time invariant linear systems to time varying linear systems. Note that in the former, a time invariant linear transformation admits a unique expansion as a superposition of time delays and the coefficients in the expansion constitute the classical impulse response.

3.2.1 Ambiguity function. The formula of the Wigner transform of a general linear transformation, Equation (3.7), is quite abstract. Fortunately, for specific type of linear transformations the Wigner transform takes a more explicit form. Say we are given a waveform $g \in H$, of unit norm $\|g\| = 1$. Let $P_g$ denote the orthogonal projection on the one dimensional subspace spanned by g, given by:

$$P_g(\varphi) = g \langle g, \varphi \rangle, \quad (3.8)$$

for every $\varphi \in H$.

Proposition. The Wigner transform of $P_g$ admits the following formula:

$$\Pi^{-1}(P_g)(v) = \langle \pi(v) g, g \rangle, \quad (3.9)$$

for every $v \in V$.

Denote $A_g = \Pi^{-1}(P_g)$ and refer to this function as the ambiguity function of g. We have:

$$\Pi(A_g) = P_g. \quad (3.10)$$

The above equation means that $A_g$ is the coefficients in the delay-Doppler expansion of the operator $P_g$— this is the Heisenberg interpretation of the ambiguity function.

3.2.2 Cross ambiguity function. The cross ambiguity function is a generalization of the ambiguity function to the case of two waveforms $g_1, g_2 \in H$ where $g_1$ is assumed to be of unit norm. Let $P_{g_1, g_2}$ denote the following rank one linear transformation on H:

$$P_{g_1, g_2}(\varphi) = g_2 \langle g_1, \varphi \rangle, \quad (3.11)$$

for every $\varphi \in H$.

Proposition. The Wigner transform of $P_{g_1, g_2}$ admits the following formula:

$$\Pi^{-1}(P_{g_1, g_2})(v) = \langle \pi(v) g_1, g_2 \rangle \quad (3.12)$$

for every $v \in V$.

Denote $A_{g_1,g_2} = \Pi^{-1}(P_{g_1,g_2})$ and refer to this function as the cross ambiguity function of $g_1$ and $g_2$. We have:

$$\Pi(A_{g_1,g_2}) = P_{g_1,g_2}. \tag{3.13}$$

Hence, according to the Heisenberg interpretation, the cross-ambiguity function is the coefficients in the delay-Doppler expansion of the operator $P_{g_1,g_2}$.

3.3 Heisenberg Interchanging Property

The main property of the Heisenberg representation is that it interchanges between the operation of composition of linear transformations on H and a twisted version of the convolution operation of functions on V. In order to define the operation of twisted convolution we consider the form $\beta: V \times V \to V$, given by:

$$\beta(\nu, \nu') = \nu\tau', \tag{3.14}$$

where $\nu = (\tau, \nu)$ and $\nu' = (\tau', \nu')$. The form $\beta$ satisfies the "polarization" condition:

$$\beta(\nu, \nu') - \beta(\nu', \nu) = \omega(\nu, \nu'), \tag{3.15}$$

for every $\nu, \nu' \in V$. Given a pair of functions $f, g \in C(V)$ their twisted convolution is defined by the following rule:

$$f *_t g(\nu) = \int_{\nu_1 + \nu_2 = \nu} \psi(\beta(\nu_1, \nu_2)) f(\nu_1) g(\nu_2) \tag{3.16}$$

$$= \int_{\nu' \in V} \psi(\beta(\nu', \nu - \nu')) f(\nu') g(\nu - \nu') d\nu'$$

One can see that the twisted convolution operation differs from the usual convolution operation, Equation (1.2), by the multiplicative factor $\psi(\beta(\nu_1, \nu_2))$. As a consequence of this factor, twisted convolution is a non-commutative operation in contrast with conventional convolution. This non-commutativity is intrinsic to the fabric of time and frequency. The Heisenberg interchanging property is formulated in the following Theorem.

Theorem 3.1 (Heisenberg Interchanging property). We have:

$$\Pi(f *_t g) = \Pi(f) \circ \Pi(g), \tag{3.17}$$

for every $f, g \in C(V)$.

The following example is key to understanding the motivation behind the constructions presented in this section. In a nutshell, it explains why the twist in Formula (3.16) accounts for the phase in the commutation relation between the time delay and Doppler shift operations, see Equation (3.4).

Example 3.2 We verify Equation (3.17) in a concrete case. Let $\nu = (\tau, \nu)$ and $\nu' = (\tau', \nu')$. Consider the delta functions $\delta_\nu$ and $\delta_{\nu'}$. On the one hand, we have:

$$\Pi(\delta_\nu) = L_\tau M_\nu,$$

$$\Pi(\delta_{\nu'}) = L_{\tau'} M_{\nu'},$$

and consequently:

$$\Pi(\delta_\nu) \circ \Pi(\delta_{\nu'}) = L_\tau M_\nu L_{\tau'} M_{\nu'} \tag{3.18}$$

$$= \psi(\nu\tau') L_\tau L_{\tau'} M_\nu M_{\nu'}$$

$$= \psi(\nu\tau') L_{\tau+\tau'} M_{\nu+\nu'}$$

$$= \psi(\nu\tau') \pi(\nu + \nu')$$

$$= \Pi(\psi(\nu\tau') \delta_{\nu+\nu'})$$

On the other hand:

$$\delta_\nu *_t \delta_{\nu'} = \psi(\beta(\nu, \nu')) \delta_\nu * \delta_{\nu'} \tag{3.19}$$

$$= \psi(\nu\tau') \delta_{\nu+\nu'}.$$

Consequently:

$$\Pi(\delta_\nu *_t \delta_{\nu'}) = \psi(\nu\tau') \pi(\nu + \nu') \tag{3.20}$$

Hence we verified that: $\Pi(\delta_\nu *_t \delta_{\nu'}) = \Pi(\delta_\nu) \circ \Pi(\delta_{\nu'})$.

3.4 Fundamental Channel Equation

We conclude this section with formulating a fundamental equation relating the following structures:
1. Cross ambiguity function.
2. Ambiguity function
3. Channel transformation.
4. Twisted convolution.

This fundamental equation is pivotal to the two dimensional channel model that will be discussed in the next section. Let $g \in H$ be a waveform of unit norm. Let $h \in C(V)$. We denote by H the channel transformation:

$$H = \Pi(h). \tag{3.21}$$

Theorem 3.3 (Fundamental channel equation). The following equation holds:

$$A_{g,H(g)} = h *_t A_g. \tag{3.22}$$

In words, the fundamental equation, (3.22), asserts that the cross ambiguity function of g with H(g) is the twisted convolution of h with the ambiguity function of g.

4. The Continuous OTFS Transceiver

In this section we describe a continuos variant of the OTFS transceiver.

4.1 Set-Up

The definition of the continuos OTFS transceiver assumes the following data:

1. Communication lattice. An undersampled lattice:

$$\Lambda \in V,$$

where $\text{vol}(\Lambda) = \mu$, for some $\mu \geq 1$.

2. Generator waveform. A waveform of unit norm:

$$g \in H,$$

satisfying the orthogonality condition $A_g(\lambda) = 0$ for every non-zero element $\lambda \in \times$.

3. 2D filter. A window function:

$$W \in C(\Lambda).$$

We note that, typically, the support of the 2D filter along the delay and Doppler dimensions is bounded by the latency and bandwidth restrictions of the communication packet respectively.

Example 4.1 A typical example of a communication lattice is the standard communication lattice:

$$\Lambda_{T,\mu} = \mathbb{Z}\mu T \oplus \mathbb{Z}1/T.$$

A typical example of a 2D filter is:

$$W[KT\mu, L/T] = \begin{cases} 1 & K \in [0, n-1], L \in [0, m-1] \\ 0 & \text{otherwise} \end{cases},$$

where $m, n \in \mathbb{N}^{\geq 1}$ and $T \in \mathbb{R}$. The parameter T is called the symbol time. The real numbers $n\mu T$ and $m/T$ are the latency and bandwidth of the communication packet respectively. Note that a more sophisticated design of a spectral window will involve some level of tapering around the boundaries in the expense of spectral efficiency. Finally, in case µ=1 (critical sampling) a simple example of an orthogonal waveform is:

$$g=1_{[0,T]}.$$

4.1.1 Generalized set-up. The set-up can be slightly generalized by assuming, instead of a single orthogonal waveform g, a pair consisting of transmit waveform $g_t \in H$ and receive waveform $g_r \in H$ satisfying the following cross orthogonality condition:

$$A_{g_r,g_t}(\lambda)=0 \qquad (4.1)$$

for every $\lambda \in \Lambda^x$. The trade-off in using a pair where $g_r \neq g_t$ is gaining more freedom in the design of the shape of each waveform in expense of lower effective SNR at the receiver. For the sake of simplicity, in what follows we will consider only the case when $g_r = g_t$ with the understanding that all results can be easily extended to the more general case.

4.2 Continuous OTFS Modulation Map. Let $Z^\perp$ denote the torus associated with the lattice $\Lambda^\perp$ reciprocal to the communication lattice. The continuos OTFS modulation map is the linear transformation $M:C(Z^\perp) \to H$, given by:

$$M(x)=\Pi(W \cdot SF_\Lambda^{-1}(x))g, \qquad (4.2)$$

for every $x \in C(Z^\perp)$. Roughly, the continuos OTFS modulation is the composition of the Heisenberg representation with the (inverse) discrete symplectic Fourier transform. In this regard it combines the two intrinsic structures of the delay Doppler plane. Formula (4.2) can be written more explicitly as:

$$M(x) = \sum_{\lambda \in \Lambda} W(\lambda) X(\lambda) \pi(\lambda) g, \qquad (4.3)$$

where $X=SF_\Lambda^{-1}(x)$.

FIG. 27 illustrates an exemplary structure of the OTFS modulation map. Note that FIG. 27 includes an additional spreading transformation given by convolution with a specifically designed function $\alpha \in C(Z^\perp)$. The effect of this convolution is to spread the energy of each information symbol uniformly along the torus $Z^\perp$ achieving a balanced power profile of the transmit waveform depending only on the total energy of the information vector x.

4.3 continuous OTFS Demodulation Map

The continuos OTFS demodulation map is the linear transformation $D:H \to C(Z^\perp)$, given by:

$$D(\varphi)=SF_\Lambda(\overline{W} \cdot R^\Lambda(A_{g,\varphi}) \qquad (4.4)$$

for every $\varphi \in H$. Roughly, the continuos OTFS demodulation map is the composition of the discrete symplectic Fourier transform with the Wigner transform. Formula (4.4) can be written more explicitly as:

$$D(\varphi)(u) = c \cdot \sum_{\lambda \in \Lambda} \psi(-\omega(u,\lambda)) \overline{W}(\lambda) \langle \pi(\lambda)g, \varphi \rangle, \qquad (4.5)$$

for every $\varphi \in H$ and $u \in Z^\perp$.

4.4 Two Dimensional Channel Model

Before describing the technical details of the two-dimensional channel model for the OTFS transceiver, we will provide an overview in simplified terms. Consider first that in the standard one-dimensional physical coordinates of time (or frequency), the wireless channel is a combination of multipath moving reflectors that induce a distortion on the transmitted signal. This distortion arises due to superposition of time delay and Doppler shifts. Such a general distortion appears in standard physical coordinates as a fading non-stationary inter-symbol interference pattern. In contrast, when converted to the coordinates of the OTFS modulation torus, the distortion becomes a static two dimensional local ISI distortion. This is a novel and characteristic attribute of the OTFS transceiver. In what follows we provide a rigorous derivation of this characteristic. To this end, we begin by considering the simplest multipath channel $H:H \to H$ that is already a combination of time delay and Doppler shift. In our terminology, this channel is given by:

$$H=\Pi=(\delta_{\nu_0})=L_{\tau_0}M_{\nu_0}, \qquad (4.6)$$

for some $\nu_0=(\tau_0,\nu_0) \in V$. We assume, in addition, that the vector $\nu_0$ satisfy $\|\nu_0\|=\text{diam}(\Lambda)$ where the diameter of the lattice is by definition the radius of its Voronoi region. Stated differently, we assume that the vector is small compared with the dimensions of the lattice. Note, that this assumption holds for most relevant scenarios in wireless applications. We proceed to derive the structure of the modulation equivalent channel. Let $q:V \to C$ be the quadratic exponential function given by:

$$q(\nu)=\psi(-\beta(\nu,\nu)), \qquad (4.7)$$

for every $\nu \in V$.

Proposition 4.2 The modulation equivalent channel $y=D \circ H \circ M(x)$ is a periodic convolution $y=h_{eqv}*x$, where the impulse response $h_{eqv} \in C(Z^\perp)$ is given by:

$$h_{eqv}=R_{\Lambda^\perp}(q(\nu_0)\delta_{\nu_0})*SF_\Lambda|W|^2, \qquad (4.8)$$

That is, Equation (4.8) states that the modulation equivalent channel is a periodic convolution with a periodic blurred version of $q(\nu_0)\delta_{\nu_0}$ where the blurring pulse is given by the symplectic Fourier transform of the discrete pulse $|W|^2$. This blurring results in a resolution loss which is due to the spectral truncation imposed by the filter W. As a result, the resolution improves as the window size increases (what amounts to longer latency and wider bandwidth). Granting the validity of Equation (4.8), it is straightforward to deduce the modulation equivalent of a general wireless channel:

$$H=\Pi(h), \qquad (4.9)$$

for any function $h \in C(V)$ where we assume that the support of h is much smaller than the diameter of the lattice $\Lambda$. The general two dimensional channel model is formulated in the following theorem.

Theorem (Two dimensional channel model). The modulation equivalent channel $y=D \circ H \circ M(x)$ is a periodic convolution $y=h_{eqv}*x$ with the impulse response $h_{eqv} \in C(Z^\perp)$, given by:

$$h_{eqv}=R_{\Lambda^\perp}(q \cdot h)*SF_\Lambda|W|^2. \qquad (4.10)$$

Stated differently, the modulation equivalent channel is a periodic convolution with a periodic blurred version of $q \cdot h$ where the blurring pulse is given by the discrete symplectic Fourier transform of the discrete pulse $|W|^2$.

4.4.1 Derivation of the two dimensional channel model. We proceed to derive Equation (4.8). Let $x \in C(Z^\perp)$. Let $\varphi_t \in H$ denote the transmitted signal. We have:

$$\varphi_t = M(x) = \Pi(W \cdot X)g, \qquad (4.11)$$

where $X = SF_\Lambda^{-1}(x)$. Let $\varphi_r \in H$ denote the received signal. We have:

$$\varphi_r = H(\varphi_t) = \prod (\delta_{v_0}) \circ \prod (W \cdot X)g \quad (4.12)$$
$$= \prod (\delta_{v_0} *_t (W \cdot X))g,$$

where the third equality follows from the Heisenberg property of the map $\Pi$ (Theorem 3.1). The demodulated vector $y = D(\varphi_r)$ is given by:

$$D(\varphi_r) = SF_\Lambda(\overline{W} \cdot R^\Lambda(A_{g,\varphi_r})). \quad (4.13)$$

We now evaluate the right hand side of (4.13) term by term. Applying the fundamental channel equation (Theorem 3.3) we get:

$$A_{g,\varphi_r} = \delta_{v_0} *_t (W \cdot X)* _t A_g. \quad (4.14)$$

Considering the restriction $R^\Lambda(A_{g,\varphi_r})$ we have the following proposition.

Proposition. We have $$R^\Lambda(A_{g,\varphi_r}); q(v_0) R^\Lambda(\psi_{v_0}) \cdot (WX), \quad (4.15)$$

where $\psi_{v_0}(v) = \psi(\omega(v_0, v))$ for every $v \in V$.

Combining Equations (4.13) and (4.15) we get:

$$D(\varphi_r); q(v_0) SF_\Lambda([R^\Lambda(\psi_{v_0})|W|^2] \cdot X) =$$
$$[R_\Lambda^\perp(q(v_0)\delta_{v_0}) * SF_\Lambda(|W|^2)] *x. \quad (4.16)$$

This concludes the derivation of the two dimensional channel model.

4.5 Explicit Interpretation

We conclude this section by interpreting the continuos OTFS modulation map in terms of classical DSP operations. We use in the calculations the standard communication lattice $\Lambda = \Lambda_{T,\mu}$ from Example 1.1. Recall the definition of the continuous modulation map:

$$M(x) = \sum_{\lambda \in \Lambda} W(\lambda) X(\lambda) \pi(\lambda) g, \quad (4.17)$$

for every $x \in C(Z^\perp)$, where $X = SF_\Lambda^{-1}(x)$. Formula (4.17) can be written more explicitly as:

$$M(x) = \sum_{K,L} W[K\mu T, L/T] X[K\mu T, L/T] L_{KT\mu} M_{L/T}(g) \quad (4.18)$$

$$\sum_K L_{KT\mu} \sum_L W_K[L/T] X_K[L/T] M_{L/T}(g) = \sum_K L_{KT\mu}(\phi_K)$$

where:

$$\phi_K = \sum_L W_K[L/T] X_K[L/T] M_{L/T}(g). \quad (4.19)$$

The waveform $\phi_K$ is called the Kth modulation block.

4.5.1 Frequency domain interpretation. Let G denote the Fourier transform of g. Equation (4.19) can be interpreted as feeding the weighted sequence $W_K X_K$ into a uniform filterbank with each subcarrier shaped by the filter G. See FIG. 28.

4.5.2 Time domain interpretation. Let $w_K$ and $x_K$ denote the inverse discrete Fourier transform of the discrete waveforms $W_K$ and $X_K$ respectively. Both waveforms are periodic with period T. We have:

$$\phi_K \propto (w_K * x_K) \cdot g$$

where * stands for periodic convolution. The waveform $x_K$ can be expressed in terms of the information vector x as follows:

$$x_K(t) \propto \int_v \psi(KT\mu v) x(t, v) dv,$$

In words, $x_K(t)$ is proportional to the Kth component of the inverse discrete Fourier transform of x along the Doppler dimension.

5 The Finite OTFS Transceiver

In this section we describe a finite variant of the OTFS transceiver. This variant is obtained, via uniform sampling, from the continuous variant described previously.

5.1 Set-Up

The definition of the finite OTFS transceiver assumes the following:

1. Communication lattice. An undersampled lattice:

$$\Lambda \in V,$$

where $\text{vol}(\Lambda) = \mu$, for some $\mu \geq 1$.

2. Communication sublattice. A sublattice:

$$\Lambda_0 \subset \Lambda$$

3. Generator waveform. A waveform of unit norm:

$$g \in H,$$

satisfying the orthogonality condition $A_g(\lambda) = 0$ for every $\lambda \in \Lambda^x$.

4. 2D filter. A window function:

$$W \in C(\Lambda).$$

Note that the support of the 2D filter is typically compatible with the configuration of the sublattice, as demonstrated in the following example.

Example 5.1 The standard nested pair of communication lattice and sublattice is:

$$\Lambda = \Lambda_{T,\mu} = Z\mu T \oplus Zl/T,$$

$$\Lambda_0 = (\Lambda_{T,\mu})_{n,m} = Zn\mu T \oplus Zm/T,$$

where $m, n \in \mathbb{N}^{\geq 1}$ and $T \in \mathbb{R}$ is a parameter called the symbol time. The real numbers $n\mu T$ and $m/T$ are the latency and bandwidth of the communication packet respectively. A typical compatible 2D filter is:

$$W[KT\mu, L/T] = \begin{cases} 1 & K \in [0, n-1], L \in [0, m-1] \\ 0 & \text{otherwise} \end{cases},$$

More sophisticated designs of a spectral window may involve, for example, some level of tapering around the boundaries at the expense of spectral efficiency. Finally, in case $\mu = 1$, a simple example of orthogonal waveform is:

$$g = 1_{[0,T]}.$$

5.2 Finite OTFS Modulation Map

Let $\Lambda^\perp \subset \Lambda_0^\perp$ be the reciprocal nested pair. Let $Z_0^\perp \in Z^\perp$ be the finite reciprocal torus. The finite OTFS modulation map is the linear transformation $M_f: C(Z_0^\perp) \to H$, defined by:

$$M_f(x) = \Pi(W \cdot SF_{Z_0}^{-1}(x))g, \quad (5.1)$$

for every information vector $x \in C(Z_0^\perp)$. Formula (5.1) can be written more explicitly as:

$$M_f(x) = \sum_{\lambda \in \Lambda} W(\lambda) X(\lambda) \pi(\lambda) g,$$

where $X = SF_{Z_0}^{-1}(x)$.

5.3 Finite OTFS Demodulation Map

The finite OTFS demodulation map is the linear transformation $D_f : H \to C(Z_0^\perp)$, given by:

$$D_f(\varphi) = SF_{Z_0}(R_{\Lambda_0}(\overline{W} \cdot R^\Lambda A_{g,\varphi})), \quad (5.2)$$

for every $\varphi \in H$. Formula (5.2) can be written more explicitly as:

$$D_f(\varphi)(\mu) = c \sum_{\lambda \in Z_0} \psi(-\omega(\mu, \lambda)) \overline{W}(\lambda) \langle \pi(\lambda) g, \varphi \rangle,$$

for every $\varphi \in H$ and $\lambda \in \Lambda_0^\perp$. Recall that the normalization coefficient $c = \text{vol}(\Lambda)$.

5.4 the Finite Two Dimensional Channel Model

Let $H = \Pi(h)$ be the channel transformation where $h \in C(V)$ is assumed to have small support compared with the dimensions of the communication lattice. Recall the quadratic exponential:

$$q(v) = \psi(-\beta(v,v)).$$

Theorem 5.2 (Finite 2D channel model). The finite modulation equivalent channel $y = D_f \circ H \circ M_f(x)$ is a cyclic convolution $y = h_{eqv,f} * x$ with the impulse response $h_{eqv,f} \in C(Z_0^\perp)$, given by:

$$h_{eqv,f} = R^{\Lambda_0^\perp}(R_\Lambda^\perp(q \cdot h) * SF_\Lambda |W|^2) \quad (5.3)$$

FIG. 18 demonstrates the statement of this theorem. The bar diagram 1810 represents the transmitted information vector x. The bar diagram 1820 represents the received information vector y. The bar diagram 1830 represents the 2D impulse response realizing the finite modulation equivalent channel. The received vector is related to the transmit vector by 2D cyclic convolution with the 2D impulse response. Finally, we see from Equation (5.3) that the finite impulse response $h_{eqv,f}$ is the sampling of the continuos impulse response $h_{eqv}$ on the finite subtorus $Z_0^\perp \subset Z^\perp$

5.5 Explicit Interpretation

We conclude this section by interpreting the finite OTFS modulation map in terms of classical DSP operations. We use in the calculations the nested pair $\Lambda_0 \subset \Lambda$ from example 5.1. Recall the definition of the finite modulation map:

$$M_f(x) = \sum_{\lambda \in \Lambda} W(\lambda) X(\lambda) \pi(\lambda) g, \quad (5.4)$$

for every $x \in C(Z_0^\perp)$, where $X = SF_{Z_0}^{-1}(x)$. Formula (5.4) can be written more explicitly as:

$$M_f(x) = \sum_{K,L} W[K\mu T, L/T] X[K\mu T, L/T] L_{KT\mu} M_{L/T}(g) \quad (5.5)$$

$$\sum_K L_{KT\mu} \sum_L W_K[L/T] X_K[L/T] M_{L/T}(g) = \sum_K L_{KT\mu}(\phi_K).$$

where:

$$\phi_K = \sum_L W_K[L/T] X_K[L/T] M_{L/T}(g) \quad (5.6)$$

The waveform $\phi_K$ is called the Kth modulation block.

5.5.1 Frequency domain interpretation. Let G denote the Fourier transform of g. Equation (5.6) can be interpreted as feeding the sequence $W_K X_K$ into a uniform filterbank with each subcarrier shaped by the filter G.

5.5.2 Time domain interpretation. Let $w_K$ and $x_K$ denote the inverse discrete Fourier transform of the discrete waveforms $W_K$ and $X_K$ respectively. Both waveforms are periodic with period T. We have:

$$\phi_K \propto \left( w_K * \sum_k x_K[kT/m] \delta_{kT/m} \right) \cdot g,$$

where * stands for periodic convolution. The waveform $x_K$ can be expressed in terms of the information vector x as:

$$x_K(kT/m) \propto \sum_{l=0}^{n-1} \psi(Kl) x\left[ \frac{kT}{m}, \frac{l}{nT\mu} \right],$$

In words, $x_K$ is proportional to the inverse finite Fourier transform of x along the Doppler dimension.

Symplectic OTFS, OFDM Compatibility, and Other Features

FIGS. 29A and 29B illustrate one manner in which symplectic OTFS methods can operate in a transmitter and receiver system 2900. Here the data on the information plane (which may be optionally subjected to predistortion 2904) may be then two-dimensionally transformed using an inverse 2D Fourier Transform 2910 (and also usually a 2D spreading function 2920) before passing through a filter bank 2930 (which may be an OFDM compatible filter bank). The various waveforms pass through the channel (C) 2940, where they are received by a filter bank 2950 (which may be an OFDM compatible filter bank), subjected to an inverse spreading function 2960, inverse 2D Fourier Transform 2970 (inverse of the previous IFFT 2910), and then equalized 2980 as needed.

Attention is now directed to FIG. 29C, which illustrates characteristics of OTFS pre-processing enabling compatibility with OFDM modulation systems. As has been discussed herein and as is illustrated in FIG. 29C, OTFS QAM symbols may be defined over a grid in the delay-Doppler domain. During an OTFS pre-processing step, these OTFS QAM symbols are transformed and spread onto a grid in the time-frequency domain, which is the same domain in which OFDM QAM symbols are defined.

FIG. 29D illustrates further details of an OTFS pre-processing operation compatible with OFDM modulation systems. As shown in FIG. 29D, an OTFS QAM symbol may be represented as a multiplication of two linear phases. In this regard frequency in the time domain corresponds to the Doppler parameter of the OTFS QAM symbol. Similarly, frequency in the frequency domain corresponds to the delay parameter of the symbol.

FIG. 30 shows an alternative method of transmitting and receiving data over a channel.

Use with Alternative Forms of Communication

Note that although wireless examples have been used throughout this disclosure, these examples are not intended to be limiting. In alternative embodiments, other medium, such as electrical transmission or RF transmission over wires or cable, optical transmission over optical fibers, and other long distance communication methodology, including acoustic transmission of signals over air or water or solid material, is also contemplated.

Effects of Channel Interference

According to the symplectic OTFS schemes discussed herein, in the symplectic coordinate systems, channel interference such as Doppler effects will distort or transform the symplectic plane along the frequency axis as a function according to the frequency shift due to Doppler effects, while channel interference such as time delays will distort or transform the symplectic plane along the time axis as a function according to the speed of light time delays. The net effect is that on the symplectic OTFS coordinate system, channel interference time delays shows up as phase gradients in one axis, while Doppler shifts show up as amplitude modulation effects along the other axis.

Because symplectic OTFS methods transmit in the transformed domain, channel convolutions are much easier to deal with, because channel convolutions show up as multiplication functions, which are easier to handle. One approach is simply to sample the signals finely enough in time and frequency so as to be able to detect these channel distortion caused phase gradients and amplitude modulation effects. Once these can be detected, they can be corrected for and eliminated.

This helps solve a long felt problem in the area. Prior to the teachings of this disclosure there was a lack of awareness in the field as to how to correct for channel distortions such as Doppler shifts and time delays using conventional OFDM methods. The belief was that because OFDM methods relied on sending information across a plurality of relatively narrow bandwidth bands, it was infeasible to correct for such channel distortions. However, with appropriate sampling intervals to detect channel distortion caused phase gradients and amplitude modulation in the OFDM signals, such corrections are in fact possible.

FIG. 31 shows the impact of channel caused Doppler and time delays on the image domain and transform domain dual grids.

Interleaving, and Compatibility with Legacy OFDM Methods

It is possible to interleave different information planes using symplectic methods. One very useful aspect of the symplectic version of OTFS is that in some embodiments the symplectic OTFS filter banks can be set up to, for example, be compatible with previous OFDM standards such as the popular cellular 4G/LTE standards. At the same time, previous OFDM standards, such as 4G/LTE, also have medium access control (MAC) protocols that allow for control over timing and interleaving.

Here one example of interleaving is for example, only sending a certain column time width of the entire symplectic field over a range of frequency bands during a first time interval, sending something else, and then sending another column time width of the entire symplectic field over a range of frequency bands over a later time interval. Other forms of interleaving, such as interleaving on a frequency basis, are also possible.

FIG. 32 shows one example of interleaving.

FIG. 33 shows another example of interleaving, in which same size frames are interleaved on a frequency staggered basis.

FIG. 34 shows another example of interleaving, in which variable size frames are interleaved on a time basis.

Backward Compatibility with OFDM Methods

In certain embodiments, symplectic OFDM methods can both co-exist with legacy OFDM methods on the same frequencies and times, and indeed may even be used to improve the efficiency of legacy OFDM methods.

In such embodiments, symplectic OTFS methods may be viewed as feeding signals to an OFDM modulator or as otherwise pre-encoding signals which are subsequently provided to an OFDM modulator. With interleaving, this same OFTM modulator may be driven using legacy OFDM symbols during some time intervals, and OTFS signals during other time intervals. In this regard, symplectic OFTS methods may be viewed as being (on the transmitting side) an improved front-end for OFDM modulators. For example, an OFTS transceiver or transmitter may be characterized and implemented as a signal pre-processing module inserted in front of an OFDM modulator within signal transmission system. Within a signal receiving system, an OTFS receiver may be positioned after the OFDM receiver in order to effect signal post-processing.

This approach advantageously enables compatibility with popular legacy OFDM methods such as 4G/LTE to be preserved while simultaneously facilitating the use of OTFS techniques to correct for channel distortion. This makes for an easy transition from, for example a legacy 4G/LTE system to a new higher capability "5G" system based on the OTFS methods described herein.

OTFS is a novel modulation technique with numerous benefits and a strong mathematical foundation. From an implementation standpoint, its added benefit is the compatibility with OFDM and the need for only incremental change in the transmitter and receiver architecture.

More specifically, recall that an embodiment of OTFS consists of two steps. The Heisenberg transform (which takes the time-frequency domain to the waveform domain) is already implemented in today's systems in the form of OFDM/OFDMA. In the formulation used herein, this corresponds to a prototype filter g(t) which is a square pulse. Other filtered OFDM and filter bank variations have been proposed for 5G, which can also be accommodated in this general framework with different choices of g(t).

The second step in this embodiment of OTFS is based upon a two dimensional Fourier transform (SFFT). As is illustrated in FIG. 35, this may be characterized as a pre-processing step within a transmitter module and a post-processing step within a receiver module.

Referring to FIG. 35 and as discussed above, the OTFS pre-processing carried out in the transmitter module may involve performing an inverse symplectic Fourier transform and a windowing operation. Similarly, the OTFS post-processing step implemented at the receiver module may include performing a symplectic Fourier transform and another windowing operation.

Turning now to FIG. 36, there is provided a block diagram of an OTFS transmitter 3600 according to an embodiment. The transmitter 3600 includes a digital processor 3604, which may be a microprocessor, digital signal processor, or other similar device. The digital processor accepts as input a data frame 3608 that is processed by an OTFS pre-processing block 3616 in the manner discussed above in order to yield a matrix of time-frequency modulation symbols. These time-frequency modulation symbols are then provided to an OFDM or MCFB modulator 3620 and the resulting waveform is filtered by a transmitter filter 3624. The filtered results are then accepted by a digital to analog converter (DAC) 3630. The baseband output of the DAC 3630 is upconverted to a radio band within an RF unit 3640 in order to produce an analog radio waveform. This waveform then travels to an OTFS receiver where it is received and demodulated as will be described below with reference to FIG. 37.

Attention is now directed to FIG. 37, which depicts an OTFS receiver 3700 configured to demodulate OTFS-modulated data received over a wireless link. Received signals (not shown) corresponding to channel-impaired versions of radio signals transmitted by the OTFS transmitter 3600 may be received by, for example, an antenna of the OTFS receiver 3700. The received signals will generally not comprise exact copies of the transmitted signals because of the signal artifacts, impairments, or distortions engendered by the communication channel. The received signals are amplified and downconverted from a radio band to baseband by an RF unit 3704. The baseband signals are then digitized within an analog to digital converter (ADC) 3708 and filtered within a receiver filter 3712. The receiver includes a digital processor 3720, which may be a microprocessor, digital signal processor, or other similar device. The digital processor 3720 includes an OFDM or MCFB modulator 3728 which accepts the digitized waveform from the receiver filter 3712 and produces estimated time-frequency modulation symbols. The digital processor 3720 further includes an OTFS post-processing block 3736 operative to generate an estimated data frame 3750 in the manner discussed above.

OTFS Relay

FIG. 38 illustrates an example of one manner in which an active OTFS relay system 3800 may operate between an OTFS transmitter and receiver. As shown, an active OTFS relay 3810 comprised of an OTFS transceiver including and OTFS relay transmitter 3820 and OTFS relay receiver 3822 is in wireless communication between and OTFS transmitter 3830 and an OTFS receiver 3840. During operation, OTFS-modulated signals sent by OTFS transmitter 3830 are received and demodulated by the OTFS relay receiver 3822. The resultant recovered data is then used by the OTFS relay transmitter 3820 to generate OTFS-modulated relay signals received and demodulated by the OTFS receiver 3840.

Selected Benefits of OTFS

As discussed above, OTFS modulation results in wireless signals experiencing stationary, deterministic and non-fading channel interaction. Specifically, all symbols experience the same channel and the two-dimensional channel impulse response reveals a deterministic channel geometry. The permits coherence and assembly of multipath channel energy so as to enable full exploitation of all diversity branches. Importantly, the deterministic nature of the channel is substantially invariant to, and highly tolerant of, mobility of transmitters and receivers within the channel.

In contrast to many conventional modulation techniques, OTFS requires only loose time and frequency synchronization. This is in part because time and/or frequency misalignment is captured from the acquired channel state information and may be compensated for using equalization.

Of particular importance with respect to next-generation 5G communication systems, OTFS systems may be efficient scaled for use with high-order MIMO techniques. This is possible in part because of the timely, precise, and compact nature of the OTFS channel state information and the low overhead required for its acquisition. OTFS is also highly suitable to high frequency (e.g., millimeter wave) spectrum of the type contemplated for use in 5G systems. For example, OTFS is insensitive to the higher relative Doppler spread and frequency offset associated with these higher frequencies.

OTFS also offers interleaved variable latency with adjustable frame sizes and cooperative multipoint arrangements enabled through the acquisition of accurate channel state information. Moreover, interference mitigation may be distributed rather than centralized.

While various embodiments have been described above, it should be understood that they have been presented by way of example only, and not limitation. They are not intended to be exhaustive or to limit the claims to the precise forms disclosed. Indeed, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of transmitting data over a communication channel, the method comprising:
   receiving a plurality of information symbols;
   encoding an N×M array containing the plurality of information symbols into a two-dimensional array of modulation symbols by spreading each of the plurality of information symbols using a set of two-dimensional basis functions that are mutually orthogonal with respect to both time and frequency; and
   transmitting the two-dimensional array of modulation symbols using M mutually orthogonal waveforms included within M frequency sub-bands.

2. A method of transmitting data over a communication channel, the method comprising:
   receiving a plurality of information symbols;
   encoding an N×M array containing the plurality of information symbols into a two-dimensional array of modulation symbols by spreading each of the plurality of information symbols with respect to both time and frequency; and
   transmitting the two-dimensional array of modulation symbols using M mutually orthogonal waveforms included within M frequency sub-bands,
   wherein the encoding includes:
      transforming the N×M array into an array of filtered orthogonal frequency division multiplexing (OFDM) symbols using at least one Fourier transform and a filtering process; and
      transforming the array of filtered OFDM symbols into an array of orthogonal time frequency space (OTFS) symbols using at least one two-dimensional Fourier transform wherein the array of OTFS symbols corresponds to the two-dimensional array of modulation symbols.

3. The method of claim 2, wherein the transmitting includes using a set of M narrow-band filters to produce the M waveforms.

4. The method of claim 1, wherein the encoding includes combining an inverse symplectic transform with a windowing operation.

5. The method of claim 1, wherein the encoding is performed in accordance with the following relationship:

$$X[n, m] = \frac{1}{MN} W_{tr}[n, m] \sum_{k=0}^{N-1} \sum_{l=0}^{M-1} x[l, k] b_{k,l}[n, m]$$

$$b_{k,l}[n, m] = e^{j2\pi \left( \frac{ml}{m} - \frac{nk}{N} \right)}$$

wherein x[l,k], k=0, . . . , N−1, l=0, . . . , M−1 represents the N×M array containing the plurality of information symbols, X[n,m], n=0, . . . , N−1, m=0, . . . , M−1 represents the two-dimensional array of modulation symbols, Wt,[n,m] is a windowing function, and $b_{k,l}$[m, n] represents a set of basis functions.

6. An apparatus for wireless communication over a data channel, comprising:
   a processor configured to:
      receive a plurality of data symbols;
      encode an N×M two-dimensional array containing the plurality of data symbols into a two-dimensional array of modulation symbols by spreading each of the plurality of data symbols using a set of cyclically time-shifted and frequency-shifted basis functions; and
      transmit the two-dimensional array of modulation symbols using M mutually orthogonal wireless waveforms included within M frequency sub-bands.

7. The apparatus of claim 6, wherein the processor is configured, as part of encoding the N×M two-dimensional array, to:
   transform the N×M two-dimensional array of data symbols into an array of filtered OFDM symbols using at least one Fourier transform and a filtering process; and
   transform the array of filtered OFDM symbols into an array of OTFS symbols using at least one two-dimensional Fourier transform wherein the array of OTFS symbols corresponds to the two-dimensional array of modulation symbols.

8. The apparatus of claim 6, wherein the processor is configured, as part of encoding the N×M two-dimensional array, to:
   encode the N×M two-dimensional array containing the plurality of data symbols onto at least one symplectic-like analysis compatible manifold distributed over a column time axis of length T and row frequency axis of length F, thereby producing at least one information manifold; and
   transform the at least one information manifold in accordance with a two-dimensional symplectic-like Fourier transform, thereby producing at least one two-dimensional Fourier transformed information manifold.

9. The apparatus of claim 8, wherein the transmitting includes transmitting each at least one two-dimensional Fourier transformed information manifold by selecting, over all frequencies and times of said two-dimensional Fourier transformed information manifold, a transmitting time slice of duration proportional to Tμ, where μ=1/N, and passing those frequencies in said two-dimensional Fourier transformed information manifold corresponding to said transmitting time slice through a bank of at least M different, non-overlapping, narrow-band frequency filters, and transmitting resulting filtered waveforms as a plurality of at least M simultaneously transmitted mutually orthogonal waveforms, over different transmitted time intervals, until an entire two-dimensional Fourier transformed information manifold has been transmitted.

10. The apparatus of claim 6, wherein the processor is further configured to:
   receive the M mutually orthogonal wireless waveforms;
   determine a two-dimensional channel state; and
   use an inverse of the encoding and the two-dimensional channel state to extract the plurality of data symbols from the M mutually orthogonal wireless waveforms.

11. The apparatus of claim 9, wherein the processor is further configured to:
   receive each said at least one two-dimensional Fourier transformed information manifold by using, over at least all frequencies and times of said two-dimensional Fourier transformed information manifold, at least one receiver processor to select a receiving time slice that is less than or equal to the duration of the transmitted time intervals, and receiving these channel convoluted waveforms on each said receiving time slice through a receiving bank of at least M different, non-overlapping, narrow-band frequency filters, and receiving said channel-convoluted waveforms over every receiving time slice until an approximation of said two-dimensional Fourier transformed information manifold has been received; and perform at least one of:
  a) using an inverse of said two-dimensional symplectic-like Fourier transform to transform said approximation of said two-dimensional Fourier transformed information manifold into an approximation of said at least one received information manifold, and using information pertaining to said two-dimensional channel state to correct said at least one received information manifold for said data channel impairments; or
  b) using information pertaining to said two-dimensional channel state to correct said approximation of said two-dimensional Fourier transformed information manifold for said data channel impairments, and using the inverse of said two-dimensional symplectic-like Fourier transform to in turn produce said at least one received information manifold.

12. An apparatus for wirelessly communicating data over a data channel, comprising:
  a processor configured to:
    encode an N×M two-dimensional array containing a plurality of data symbols onto at least one symplectic analysis compatible manifold distributed over a column time axis of length T and row frequency axis of length F, thereby producing at least one information manifold;
    transform said at least one information manifold according to a two-dimensional symplectic-like Fourier transform, thereby producing at least one two-dimensional Fourier transformed information manifold; and
    transmit each at least one two-dimensional Fourier transformed information manifold by selecting, over all frequencies and times of said two-dimensional Fourier transformed information manifold, a transmitting time slice of duration proportional to $T\mu$, where $\mu=1/N$, and passing those frequencies in said two-dimensional Fourier transformed information manifold corresponding to said transmitting time slice through a bank of at least M different, non-overlapping, narrow-band frequency filters, and transmitting resulting filtered waveforms as a plurality of at least M simultaneously transmitted mutually orthogonal waveforms, over different transmitted time intervals, until an entire two-dimensional Fourier transformed information manifold has been transmitted.

13. The apparatus of claim 12, wherein the data channel includes an impairment impairing said waveforms, said impairment being at least partially describable according to a two-dimensional channel state of said channel, thereby producing channel-convoluted waveforms, and wherein the processor is further configured to:
  receive each said at least one two-dimensional Fourier transformed information manifold by using, over at least all frequencies and times of said two-dimensional Fourier transformed information manifold, at least one receiver processor to select a receiving time slice that is less than or equal to the duration of the transmitted time intervals, and receiving these channel convoluted waveforms on each said receiving time slice through a receiving bank of at least M different, non-overlapping, narrow-band frequency filters, and receiving said channel-convoluted waveforms over every receiving time slice until an approximation of said two-dimensional Fourier transformed information manifold has been received; and
  perform at least one of:
    a) using an inverse of said two-dimensional symplectic-like Fourier transform to transform said approximation of said two-dimensional Fourier transformed information manifold into an approximation of said at least one received information manifold, and using information pertaining to said two-dimensional channel state to correct said at least one received information manifold for said data channel impairments; or
    b) using information pertaining to said two-dimensional channel state to correct said approximation of said two-dimensional Fourier transformed information manifold for said data channel impairments, and using the inverse of said two-dimensional symplectic-like Fourier transform to in turn produce said at least one received information manifold; and
  using said at least one receiver processor to decode and extract said data symbols from said at least one received information manifold.

14. The apparatus of claim 13, wherein the processor is further configured to:
  transform said at least one N×M two-dimensional array of data according to a spreading operation either prior or after encoding said at least one N×M two-dimensional array of data symbols onto at least one symplectic analysis compatible manifold, wherein said receiving processor uses an inverse of said spreading operation to decode and extract said data symbols from said at least one received information manifold.

15. The apparatus of claim 14, wherein said spreading operation is convolution with a two-dimensional chirp operation.

16. The apparatus of claim 13, wherein said non-overlapping, narrow-band frequency filters pass frequencies from said at least one two-dimensional Fourier transformed information manifold proportional to $g(t \cdot e^{jk\omega_0})$, where $j$ is the square root of $-1$, $t$ corresponds to a given time slice of duration $T\mu$ chosen from said at least one two-dimensional Fourier transformed information manifold, and $k$ corresponds to a given row position on said at least one two-dimensional Fourier transformed information manifold, where $k$ varies between 1 and M.

17. The apparatus of claim 16, wherein $\omega_0$ is proportional to $1/T$, and T=M/(allowed wireless bandwidth).

18. The apparatus of claim 12, wherein said at least one two-dimensional Fourier transformed information manifold has overall dimensions $NT_\mu$ according to a time axis and M/T according to a frequency axis, and each cell in said at least one two-dimensional Fourier transformed information manifold has overall dimensions proportional to $T\mu$ according to a time axis and 1/T according to a frequency axis.

19. The apparatus of claim 13, wherein the processor is further configured, as part of receiving each said at least one two-dimensional Fourier transformed information manifold, to:
  receive said at least one two-dimensional Fourier transformed information manifold according to receiving time slices and receiving banks of different, non-overlapping, narrow-band frequency filters that oversamples the corresponding transmitting time slices and transmitting banks of different, non-overlapping, narrow-band frequency filters.

20. The apparatus of claim 12, wherein the processor is further configured, as part of transmitting the two-dimensional Fourier transformed information manifold, to transmit either:
1) a plurality of at least M simultaneously transmitted mutually orthogonal waveforms over either different consecutive transmitted time intervals; or
2) a plurality OTFS data or OTFS pilot bursts comprising at least M simultaneously transmitted mutually orthogonal waveform bursts over different transmitted intervals separated by at least one spacer time interval.

* * * * *

UNITED STATES PATENT AND TRADEMARK OFFICE
CERTIFICATE OF CORRECTION

Page 1 of 1

PATENT NO. : 10,938,613 B2
APPLICATION NO. : 16/559485
DATED : March 2, 2021
INVENTOR(S) : Shlomo Rakib et al.

It is certified that error appears in the above-identified patent and that said Letters Patent is hereby corrected as shown below:

On the Title Page

On Page 2, in Item (60), under "Related U.S. Application Data", in Column 1, Line 4, delete "2015," and insert -- 2015, provisional application No. 62/185,619, filed on Jun. 27, 2015, --, therefor.

In the Specification

In Column 12, Line 58, delete "level the" and insert -- level of the --, therefor.

In the Claims

In Column 63, Line 66, in Claim 5, delete "Wt,[n,m]" and insert -- Wtr[n,m] --, therefor.

In Column 66, Line 56, in Claim 18, delete "$NT_\mu$" and insert -- $NT\mu$ --, therefor.

In Column 67, Line 12, in Claim 20, delete "plurality OTFS" and insert -- plurality of OTFS --, therefor.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*